(12) United States Patent
Hajaj

(10) Patent No.: US 9,165,040 B1
(45) Date of Patent: Oct. 20, 2015

(54) PRODUCING A RANKING FOR PAGES USING DISTANCES IN A WEB-LINK GRAPH

(75) Inventor: Nissan Hajaj, Foster City, CA (US)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 11/546,755

(22) Filed: Oct. 12, 2006

(51) Int. Cl.
  *G06F 7/00* (2006.01)
  *G06F 17/30* (2006.01)

(52) U.S. Cl.
  CPC .................................. *G06F 17/3053* (2013.01)

(58) Field of Classification Search
  USPC .................................................. 707/726, 748
  See application file for complete search history.

(56) References Cited

U.S. PATENT DOCUMENTS

| | | |
|---|---|---|
| 4,752,889 A | 6/1988 | Rappaport et al. |
| 4,817,036 A | 3/1989 | Millett et al. |
| 4,839,853 A | 6/1989 | Deerwester et al. |
| 4,868,733 A | 9/1989 | Fujisawa et al. |
| 4,945,476 A | 7/1990 | Bodick et al. |
| 4,953,106 A | 8/1990 | Gansner et al. |
| 5,047,918 A | 9/1991 | Schwartz et al. |
| 5,122,951 A | 6/1992 | Kamiya |
| 5,157,783 A | 10/1992 | Anderson et al. |
| 5,201,048 A | 4/1993 | Coulter et al. |
| 5,206,949 A | 4/1993 | Cochran et al. |
| 5,241,671 A | 8/1993 | Reed et al. |
| 5,243,655 A | 9/1993 | Wang |
| 5,265,065 A | 11/1993 | Turtle |
| 5,287,493 A | 2/1994 | Jacopi |
| 5,297,249 A | 3/1994 | Bernstein et al. |
| 5,301,109 A | 4/1994 | Landauer et al. |
| 5,325,298 A | 6/1994 | Gallant |
| 5,341,293 A | 8/1994 | Vertelney et al. |
| 5,386,556 A | 1/1995 | Hedin et al. |
| 5,418,948 A | 5/1995 | Turtle |
| 5,446,842 A | 8/1995 | Schaeffer et al. |
| 5,446,891 A | 8/1995 | Kaplan et al. |
| 5,471,611 A | 11/1995 | McGregor |
| 5,530,852 A | 6/1996 | Meske, Jr. et al. |
| 5,535,325 A | 7/1996 | Cattell et al. |

(Continued)

FOREIGN PATENT DOCUMENTS

| | | |
|---|---|---|
| WO | WO 95/00896 | 1/1995 |
| WO | 2007/041120 | 4/2007 |

OTHER PUBLICATIONS

Gyongyi et al., "Combating Web Spam with TrustRank," Proceedings of the 30th VLDB Conference, Toronto, Canada, 2004.*

(Continued)

*Primary Examiner* — Cheyne D Ly

(74) *Attorney, Agent, or Firm* — Fish & Richardson P.C.

(57) ABSTRACT

Methods, systems, and apparatus, including computer programs encoded on a computer storage medium, for producing a ranking for pages on the web. In one aspect, a system receives a set of pages to be ranked, wherein the set of pages are interconnected with links. The system also receives a set of seed pages which include outgoing links to the set of pages. The system then assigns lengths to the links based on properties of the links and properties of the pages attached to the links. The system next computes shortest distances from the set of seed pages to each page in the set of pages based on the lengths of the links between the pages. Next, the system determines a ranking score for each page in the set of pages based on the computed shortest distances. The system then produces a ranking for the set of pages based on the ranking scores for the set of pages.

34 Claims, 3 Drawing Sheets

(56) References Cited

U.S. PATENT DOCUMENTS

| | | | |
|---|---|---|---|
| 5,542,024 | A | 7/1996 | Balint et al. |
| 5,544,352 | A | 8/1996 | Egger |
| 5,546,517 | A | 8/1996 | Marks et al. |
| 5,586,311 | A | 12/1996 | Davies et al. |
| 5,594,897 | A | 1/1997 | Goffman |
| 5,617,565 | A | 4/1997 | Augenbraun et al. |
| 5,619,709 | A | 4/1997 | Caid et al. |
| 5,630,120 | A | 5/1997 | Vachey |
| 5,634,062 | A | 5/1997 | Shimizu et al. |
| 5,640,558 | A | 6/1997 | Li |
| 5,649,186 | A | 7/1997 | Ferguson |
| 5,649,193 | A | 7/1997 | Sumita et al. |
| 5,652,880 | A | 7/1997 | Seagraves |
| 5,659,742 | A | 8/1997 | Beattie et al. |
| 5,694,594 | A | 12/1997 | Chang |
| 5,737,507 | A | 4/1998 | Smith |
| 5,748,954 | A | 5/1998 | Mauldin |
| 5,749,785 | A | 5/1998 | Rossides |
| 5,787,417 | A | 7/1998 | Hargrove |
| 5,794,001 | A | 8/1998 | Malone et al. |
| 5,832,494 | A | 11/1998 | Egger et al. |
| 5,838,906 | A | 11/1998 | Doyle et al. |
| 5,855,015 | A | 12/1998 | Shoham |
| 5,864,863 | A | 1/1999 | Burrows |
| 5,898,434 | A | 4/1999 | Small et al. |
| 5,974,455 | A | 10/1999 | Monier |
| 6,035,330 | A | 3/2000 | Astiz et al. |
| 6,098,081 | A | 8/2000 | Heidorn et al. |
| 6,233,571 | B1 | 5/2001 | Egger et al. |
| 6,584,468 | B1* | 6/2003 | Gabriel et al. ................ 1/1 |
| 6,948,116 | B2* | 9/2005 | Hailpern et al. ............. 715/206 |
| 7,571,121 | B2* | 8/2009 | Bezos et al. ................. 705/26.7 |
| 7,761,448 | B2 | 7/2010 | Meyerzon et al. |
| 7,774,340 | B2* | 8/2010 | Zhang et al. ................. 707/726 |
| 2005/0262050 | A1* | 11/2005 | Fagin et al. .................... 707/3 |
| 2008/0075014 | A1* | 3/2008 | Jiang ............................ 370/252 |
| 2010/0114862 | A1* | 5/2010 | Young et al. ................. 707/709 |

OTHER PUBLICATIONS

Gyongyi et al., "Combating Web Spam with TrustRank," Proceedings of the 30th VLDB Conference, 2004.*

Candan et al., Using Random Walks for Mining Web Document Associations, PAKDD 2000, LNAI 1805, pp. 294-305, 2000.*

Wu et al., Topical TrustRank: Using Topicality to Combat Web Spam, WWW 2006, May 23-26, Edinburgh, Scotland, pp. 63-732.*

Chalmers, M. et al., "Bead: Explorations in Information Visualization", *Proceedings of the 15th Annual International ACM SIGIR Conference on Research and Development in Information Retrieval*, Copenhagen, Denmark, 1992, ACM, pp. 330-337.

Botafogo, R.A. et al., "Structural Analysis of Hypertexts: Identifying Hierarchies and Useful Metrics", *ACM Transactions on Information Systems*, vol. 10, No. 2 (Apr. 1992), pp. 142-180.

Kaplan, C. et al., "Adaptive Hypertext Navigation Based on User Goals and Context", *User Modeling and User-Adapted Interaction*, vol. 3 (1993), pp. 193-220.

Spoerri, A., "InfoCrystal: A visual tool for information retrieval & management", *Proceedings of the Second International Conference on Information and Knowledge Management*, Washington, D.C., 1993, ACM, pp. 11-20.

Mauldin, M.L. et al., "Web Agent Related Research at the Center for Machine Translation", SIGNIDR Meeting, McLean, Virginia, Aug. 4, 1994, [online], Aug. 1994 [retrieved on Apr. 29, 2008]. Retrieved from the Internet: <URL: http://robot-club.com/lti/pub/signidr94.html>, 5 pages.

McKee, D., "Towards Better Integration of Dynamic Search Technology and the World-Wide Web", *Proceedings of the First International Conference on the World Wide Web*, 1994, pp. 129-135.

McBryan, OA., "GENV and WWWW: Tools for Taming the Web", *Proceedings of the First International World Wide Web Conference*, ed. O. Nierstrasz, CERN, Geneva, May 1994, pp. 1-10.

Hearst, MA, "TileBars: Visualization of Term Distribution Information in Full Text Information Access", *Proceedings of the ACM SIGCHI Conference on Human Factors in Computing Systems*, Denver, CO, May 1995, ACM, 14 pages.

Articles from IAC.

Hubbell, C.H., "An Input-Output Approach to Clique Identification", *Sociometry A Journal of Research in Social Psychology*, vol. 28, No. 4 (Dec. 1965), pp. 377-399.

Garfield, E. "'Science Citation Index'—A New Dimension in Indexing", *Essays of an Information Scientist*, vol. 7 (1984)., pp. 525-535.

Michelson, D. et al., "An Experiment in the Use of Bibliographic Data as a Source of Relevance Feedback in Information Retrieval", *The SMART Retrieval System: Experiments in Automatic Document Processing*, G. Salton, Ed., Prentice Hall, Eaglewood Cliffs, NJ, 1971, pp. 430-443.

Goffman, W., "An Indirect Method of Information Retrieval", *Inform. Stor. Retr.*, vol. 4 (1969), pp. 361-373.

Jones, K.S., "A Statistical Interpretation of Term Specificity and Its Application in Retrieval", *Journal of Documentation*, vol. 28, No. 1 (Mar. 1972), pp. 11-21.

Garfield, E. "Citation Frequency and Citation Impact; and the Role They Play in Journal Selection for Current Contents and Other ISI Services", *Essay of an Information Scientist*, vol. 1 (Feb. 7, 1973), pp. 409-410.

Small, H., "Co-citation in the Scientific Literature: A New Measure of the Relationship Between Two Documents", *Journal of the American Society of Information Science*, Jul.-Aug. 1973, pp. 265-269.

Bichteler, J. et al., "Comparing Two Algorithms of Document Retrieval using Citation Links", *Journal of the American Society for Information Science*, vol. 28, No. 4(Jul. 1977), pp. 192-195.

Bichteler, J. et al., "Document Retrieval by Means of an Automatic Classification Algorithm for Citations", *Inform. Retr.*, vol. 10 (1974), vol. 10, pp. 267-278.

Rocchio, Jr, J.J., "Chapter 14: Relevance Feedback in Information Retrieval", *The SMART Retrieval System: Experiments in Automatic Document Processing*, Gerard Salton, Ed., Prentice Hall, Eaglewood Cliffs, New Jersey, 1971, pp. 313-323.

Hodges, T.L., *Citation Indexing: Its Potential for Bibliographical Control*, Dissertation for Doctor of Philosophy in Librarianship for University of California, Berkeley, 1922, 666 pages.

Brookes, B.C., "Numerical Methods of Bibliographic Analysis", *Library Trends*, vol. 22, No. 22 (Jul. 1973), pp. 18-43.

de Solla Price, D., "A General Theory of Bibliometric and Other Cumulative Advantage Processes", *Journal of the American Society for Information Science*, vol. 27, No. 5-6 (1976), pp. 292-306.

Tapper, C.F.H., "Citation Patterns in Legal Information Retrieval", *Daten verarbeitung im Recht*, Verlag, Berlin, 1976, pp. 249-275, ISSN 0301-2980.

Phillips, R.L., "A Query Language for a Network Data Base with Graphical Entities", *ACM SIGGRAPH Computer Graphics*, vol. 11, Issue 2 (1977), pp. 179-185.

Hafner, C., *An Information Retrieval System Based on a Computer Model of Legal Knowledge*, UMI Research Press, Ann Arbor, MI, 1981, 1978, 188 pages.

Richards, W.D. and Rice, R.E., "The NEGOPY Network Analysis Program", *Social Networks*, vol. 3 (1981), pp. 215-223.

Maron, M.E., "Opinion Paper Associate Search Techniques versus Probabilistic Retrieval Models", *Journal of the American Society for Information Science*, vol. 33, No. 5 (1982), pp. 308-310.

Tapper, C., *An Experiment in the Use of Citation Vectors in the Area of Legal Data*, Univeritetsforlaget, Oslo, Norway, 1982, 62 pages.

Liebowitz, S.J. and Palmer, J.P., "Assessing the Relative Impacts of Economic Journals", *Journal of Economic Literature*, vol. XXII (Mar. 1984), pp. 77-88.

Rice, R.E. and Richards, Jr, W.D., *Progress in Communication Sciences*, vol. VI, Brenda Dervin and Melvin J. Voigt, Eds., Ablex Publishing Corporation, Norwood, NJ, 1985, pp. 105-165.

Richards, Jr., W.D., "Chapter 4: Data, Models, and Assumptions in Network Analysis", *Organizational Communication: Traditional Themes and New Directions*, vol. 13, Robert D. McPhee and Phillip K. Tompkins, Eds., Sage Publications, Inc., Beverly Hills, CA, 1985, pp. 109-128.

(56) References Cited

OTHER PUBLICATIONS

Mizruchi, M.S. et al., "Techniques for Disaggregating Centrality Scores in Social Networks", *Sociological Methodology*, vol. 16, Nancy Brandon Tuma et al., Eds., Alibris, UK, pp. 26-48.

Mackinlay, J., "Automating the Design of Graphical Presentations of Relational Information", *ACM Transactions on Graphics*, vol. 5, No. 2 (Apr. 1986), pp. 110-141.

Kibler, D. and Aha, D.W., "Learning Representative Exemplars of Concepts: An Initial Case Study", *Proceedings of the 4th International Workshop on Machine Learning*, Jun. 22-25, 1987, University of California, Irvine, pp. 24-30.

Smith, J.B. et al., "Microarras: An Advanced Full-Text Retrieval and Analysis System", *Proceedings of the 10th Annual International ACM SIGIR Conference on Research and Development in Information Retrieval*, New Orleans, LA, 1987, pp. 187-195.

Chiaramella, Y. and Defude, B., "A Prototype of an Intelligent System for Information Retrieval: IOTA", *Information processing & Management*, vol. 23, No. 4 (1987), pp. 285-303.

Spoerri, A., "InfoCrystal: A visual tool for information retrieval & management", *Proceedings of the IEEE Conference on Visualization '93*, San Jose, CA, Oct. 25-29, IEEE, 1993, pp. 150-157.

Pitkow, JE and Bharat, KA, "Webviz: A Tool for World-Wide Web Access Log Analysis", *Proceedings of the First International World-Wide Web Conference*, Geneva Switzerland, May 1994, 7 pages.

Wasserman, S. and Faust, K., *Social Network Analysis*, Cambridge University Press, New York, NY, 1994, 431 pages.

De Bra, PME and Post, RDJ, "Information retrieval in the World-Wide Web: Making client-based searching feasible", *Computer Networks and ISDN Systems*, vol. 27, No. 2 (Nov. 1994), pp. 183-192.

Emanuel, SL, *Emanuel Law Outlines, A law student's guide to using Lexis-Nexis*, 1995-1996 Edition 106 pages.

NetCarta's WebMapper, CyberPilot applications ease Web surfing, Online Computing, *PC Week*, Dec. 25, 1995/Jan. 1996, p. 42.

Wood, A. et al., "HyperSpace: Web Browsing with Visualisation", *Third International World-Wide Web Conference Poster Proceedings*, Darmstadt, Germany, Apr. 10-14, 1995, 5 pages.

Furner, J. et al., "The Representation and Comparison of Hypertext Structures Using Graphs", *Information Retrieval and Hypertext*, Maristella Agosti and Alan F. Smeaton, Eds, Kluwer Academic Publishers, Norwell MA, 1996, pp. 75-96.

Pirolli, P. et al., "Silk from a Sow's Ear: Extracting Usable Structures from the Web", *Proceedings of the SIGCHI Conference on Human Factors in Computing Systems: Common Ground*, Apr. 13-18, 1996, Vancouver, British Columbia, Canada, ACM, 8 pages.

Mauldin, M., Lycos4.perl, May 1994, 8 pages.

Mauldin, M., Lycos4.perl, May 1994, 1703 pages.

"Document relationships at a glance", *Electronic Documents*, vol. 3, No. 12, p. 3.

Factiva, Libertech to release V-Search for Folio VIEWS; Offers dramatic enhancements to electronic document research, *Business Wire*, Mar. 21, 1995, 1 page.

Kaplan, K., "New Ways to Find Needle in Data Haystack", Los Angeles Times, Article Collections, Mar. 29, 1995, 2 pages.

Factiva, Libertech Announces Major Equity Financing: Will Market New Products for On-Line and Internet Publishing, *Business Wire*, Apr. 24, 1995, 1 page.

Schwerin, R., "NetCarta CyberPilot Pro Mapping Cyberspace", *PC Computing*, 1996, 3 pages.

Phillips, K., "Tech View: Untangling the Web", *PC Week*, Apr. 1, 1996, pages.

Moeller, M., "Web management tools come of age", *PC Week*, pp. 33-34.

Net Jumper Software, L.L.C. and Google Inc., Declaration of Randall Stark, Civil Action No. 04-70366-CV, United States District Court Eastern District of Michigan, Southern Division, Hon. Judge Abele Cook, p. 56-95 (30 pages).

Kessler, MM, *Tip User's Manual*, Massachusetts Institute of Technology, First Edition Dec. 1965, Revised Oct. 1967, pp. 1-22.

Khan, M.R., *Support Routines for the CODER System*, Project for Master of Science in Computer Science Application, Virginia Polytechnic Institute and State University, Blacksburg, VA, Jun. 27, 1988, 152 pages.

Venables, B. and Smith, D., *Notes on S_PLUS: A Programming Environment for Data Analysis and Graphics*, Version 2.2, Sep. 1992, Department of Statistics, The University of Adelaide, W. Venables, 1990, 1992, 91 pages.

Saad, RA, *Query Log Analysis on MARIAN*, Updated Version (Feb. 1997) to CS5604 Project (Fall 1996), 130 pages.

France, R.K., *An Artificial Intelligence Environment for Information Retrieval Research*, Thesis for Masters of Science in Computer Science, Virginia Polytechnic Institute and State University, Blacksburg, VA, Jul. 1986, 167 pages.

Sahle, E., *Development of a UserInterface for MARIAN and CODER Systems*, Report for Masters of Information Systems, Virginia Polytechnic Institute and State University, Blacksburg, VA, Jan. 1993, 97 pages.

France, R.K. and Fox, EA, "Knowledge Structures for Information Retrieval: Representation in the CODER Project", Department of Computer Science, Virginia Tech, Blacksburg, VA, 19 pages.

Shah, S.M., *User Interface and Dictionary Support*, Report for Master of Science in Computer Science and Applications, Virginia Polytechnic Institute and State University, Blacksburg, VA, Feb. 1988, 87 pages.

Apte, SC, *Communication in the CODER System*, Report for Master of Science in Computer Science and Applications, Virginia Polytechnic Institute and State University, Blacksburg, VA, Jun. 1987, 92 pages.

Drake, Jr., F.L., *odb/Tools Reference Manual Version 1.0*, Department of Computer Science, Virginia Polytechnic Institute and State University, Aug. 13, 1995, 76 pages.

Ghazi, N.K., *Development of a User Interface for the MARIAN System and a Server for the SMART System*, Report submitted to Virginia Polytechnic Institute and State University for the degree of Master of Science, Blacksburg, VA, Sep. 1991, 92 pages.

Drake, Jr., F.L., *odb/Tools Reference Manual Release B*, Department of Computer Science, Virginia Polytechnic Institute and State University, Blacksburg, Jul. 27, 1995, 29 pages.

Cline, B, "MARIAN Status: Raw Internal Document", Jan. 28, 1992, 3 pages.

Chen, Q.F., *Release Notes for LEND*, HaL Computer Systems, Inc., Austin, TX, Feb. 1, 1993, 6 pages.

Wake, B, *Envision Protocol Design Specification*, Dec. 4, 1992, 12 pages.

Wake, B, *Envision Protocol Interface Specification*, Mar. 3, 1993, 13 pages.

Snavely, C., *Implementation of a Cover Coefficient-Based Incremental Clustering Algorithm for Very Large Document Database, An Independent Study Project Report Presented for SAN Departmental Honors Program*, Dec. 16, 1992, 39 pages.

Heath, L.S., *Layout Algorithm for the ENVISION Graphic View*, Dec. 31, 1993, 14 pages.

Chen, Q.F. and Fox, EA, *LEND System Component Description*, Virginia Polytechnic Institute & State University, Oct. 17, 1991, 36 pages.

France, R, *Use Interface Objects for CODER, INCARD, and MARIAN v.2.5*, Aug. 27, 1992, 68 pages.

Baase, S., *Computer Algorithms: Introduction to Design and Analysis*, Michael A. Harris, Ed., Addison Wesley Publishing Company, Inc., Reading, MA, 1978, pp. 115-285.

Baase, S., "Chapter 4: Graphs and Digraphs", *Computer Algorithms: Introduction to Design and Analysis*, Second Edition, Michael A. Harris, Ed., Addison Wesley Publishing Company, Inc., Reading, MA, 1988, pp. 144-207.

Cleveland, D., "An n-Dimensional Retrieval Model,", *Journal of American Society Information Science*, vol. 27, Issue 5 (1976), pp. 342-347.

Horowitz, E. and Sahni, S., *Fundamentals of Data Structures*, Computer Science Press, Inc., Rockville, MD, 1976 and 1982, pp. 282-334.

(56) References Cited

OTHER PUBLICATIONS

Ex A 34, Invalidity Claim Chart for U.S. Patent No. 5,544,352 Based on Nielsen, J., "The Art of Navigating Through Hypertext," in Communications of the ACM, vol. 33, No. 3, pp. 296-310 (Mar. 1990). ("Nielsen, 1990"), pp. 52.

Ex A 35, Invalidity Claim Chart for U.S. Patent No. 5,544,352 Based on "Hypertext & Hypermedia", J. Nielsen, 1990 ("Nielsen, 1990B"), pp. 102.

Ex A 36, Invalidity Claim Chart for U.S. Patent No. 5,544,352 Based on Shepherd, M., Watters, C., &Cai, Y., "Transient Hypergraphs for Citation Networks," In Information Processing &Management, vol. 26, No. 3, pp. 395-412 (1990) (Shepherd, 1990), pp. 86.

Ex A 37, Invalidity Claim Chart for U.S. Patent No. 5,544,352 Based on "Hypertext/Hypermedia Handbook", E. Berk, J. Devlin 1991 ("Berk, 1991"), pp. 28.

Ex A 38, Invalidity Claim Chart for U.S. Patent No. 5,544,352 Based on Burt, Ronald, Structure Version 4.2, Reference Manual, Columbia University, 1991 (Burt, 1991), pp. 58.

Ex A 39, Invalidity Claim Chart for U.S. Patent No. 5,544,352 Based on M.D. Dunlop &C.J. Van Rijsbergen, "Hypermedia and Free Text Retrieval" ("Dunlop,1991"), pp. 26.

Ex A 40, Invalidity Claim Chart for U.S. Patent No. 5,544,352 Based on Gelbart, D., Smith, J.C., "Beyond Boolean Search: Flexicon, A Legal Text-Based Intelligent System." ACM, pp. 225-234 (1991). ("Gelbart, 1991"), pp. 44.

Ex A 41, Invalidity Claim Chart for U.S. Patent No. 5,544,352 Based on Roy Rada, "Hypertext—From Text to Expertext," (1991) ("Rada, 1991"), pp. 14.

Ex A 42, Invalidity Claim Chart for U.S. Patent No. 5,544,352 Based on Rose, D.E., "A Symbolic and Connectionist Approach to Legal Information Retrieval" (1991). ("Rose, 1991"), pp. 108.

Ex A 43, Invalidity Claim Chart for U.S. Patent No. 5,544,352 Based on "Subject and Citation Indexing Part I: The Clustering Structure of Composite Representations in the Cystic Fibrosis Document Collection," W.M. Shaw, 1991 ("Shar/Part I, 1991"), pp. 16.

Ex A 44, Invalidity Claim Chart for U.S. Patent No. 5,544,352 Based on Subject and Citation Indexing. Part II: The Optimal Cluster-Based Retrieval Performance of.

Ex A 45, Invalidity Claim Chart for U.S. Patent No. 5,544,352 Based on Turtle, "Inference Networks for Document Retrieval" (1991) ("Turtle, 1991"), pp. 143.

Ex A 46, Invalidity Claim Chart for U.S. Patent No. 5,544,352 Based on Turtle and Croft "Evaluation of An Inference Network-Based Retrieval Model" (1991) (Turtle &Croft, 1991), pp. 17.

Ex A 47, Invalidity Claim Chart for U.S. Patent No. 5,544,352 Based on Alain, L. and Claire, F., "Hypertext Paradigm in the Field of Information Retrieval: A Neural Approach," ACM ECHT Conference, pp. 112-121 (1992). ("Alain, 1992"), pp. 48.

Ex A 48, Invalidity Claim Chart for U.S. Patent No. 5,544,352 Based on "Making Use of Hypertext Links When Retrieving Information," H.P. Frei and D. Stieger (1992) ("Frei &Stieger, 1992"), pp. 26.

Ex A 49, Invalidity Claim Chart for U.S. Patent No. 5,544,352 Based on Botafogo, R.A., et al. "Structural Analysis of Hypertexts: Identifying Hierarchies and Useful Metrics," ACM Trans. Inf. Sys., vol. 10, 142-180 (Apr. 1992). ("Botafogo, 1992"), pp. 39.

Ex A 50, Invalidity Claim Chart for U.S. Patent No. 5,544,352 Based on Qifan Chen, "An Object-Oriented Database System for Efficient Information Retrieval Applications," (Mar. 1992) ("Chen/Thesis, 1992"), pp. 10.

Ex A 51, Invalidity Claim Chart for U.S. Patent No. 5,544,352 Based on Guinan, C., Smeaton, A., "Information Retrieval From Hypertext Using Dynamically Planned Guided Tours," From ACM ECHT Conference, pp. 122-130 (1992). ("Guinan, 1992"), pp. 60.

Ex A 52, Invalidity Claim Chart for U.S. Patent No. 5,544,352 Based on UciNet IV: Network Analysis Software (Product Description) ("UciNet, 1992"), pp. 24.

Ex A 53, Invalidity Claim Chart for U.S. Patent No. 5,544,352 Based on "A Query Language for Information Graphs", S. Betrabet, E. Fox &Q. Chen, 1993 ("Betrabet, 1993"), pp. 37.

Ex A 54, Invalidity Claim Chart for U.S. Patent No. 5,544,352 Based on Brueni, D. et al., "What If There Were Desktop Access to the Computer Science Literature?," (Feb. 16-18, 1993) ("Brueni, 1993"), pp. 22.

Ex A 55, Invalidity Claim Chart for U.S. Patent No. 5,544,352 Based on Croft, B., Turtle, H., "Retrieval Strategies for Hypertext," In Information Processing & Management, vol. 29, No. 3, pp. 313-324 (1993). ("Croft, 1993"), pp. 52.

Ex A 56, Invalidity Claim Chart for U.S. Patent No. 5,544,352 Based on U.S. Patent No. 5,446,891 (Kaplan) ("U.S. Pat. No. 5,446,891"), pp. 44.

Ex A 57, Invalidity Claim Chart for U.S. Patent No. 5,544,352 Based on Salton, G., Wong, A., Yang, C.S., "A Vector Space Model for Automatic Indexing," In Communications of the ACM, vol. 18, No. 11, pp. 613-620 (Nov. 1975). ("Salton, 1975"), pp. 31.

Ex A 58, Invalidity Claim Chart for U.S. Patent No. 5,544,352 Based on Conklin, J., "Hypertext: An Introduction and Survey," IEEE, 17-40, 1987 ("Conklin, 1987"), pp. 5.

Ex A 59, Invalidity Claim Chart for U.S. Patent No. 5,544,352 Based on Conklin, J., Begeman, M., "GIBIS: A Hypertext Tool for Exploratory Policy Discussion," ACM, pp. 140-152 (1988). ("Conklin, 1988"), pp. 8.

Ex B 01, Invalidity Claim Chart for U.S. Patent No. 5,544,352 Based on Tip, pp. 17.

Ex B 02, Invalidity Claim Chart for U.S. Patent No. 5,544,352 Based on Envision, pp. 15.

Ex B 03, Invalidity Claim Chart for U.S. Patent No. 5,544,352 Based on Smart, pp. 9.

Ex B 04, Invalidity Claim Chart for U.S. Patent No. 5,544,352 Based on Intermedia, pp. 10.

Ex C 01, Invalidity Claim Chart for U.S. Patent No. 5,544,352 of Certain Exemplary Combinations, pp. 17.

Ex C 02, Invalidity Claim Chart for U.S. Patent No. 5,544,352 Based on "Hypertext & Hypermedia", J. Nielsen, 1990 ("Nielsen,1990B") &Frisse, M., "Searching for Information in a Hypertext Medical Handbook" In Communications of the ACM, vol. 31, No. 7, pp. 880-886 (Jul. 1988) ("Frisse, 1988"), pp. 172.

Ex C 03, Invalidity Claim Chart for U.S. Patent No. 5,544,352 Based on Salton, G., "Associative Document Retrieval Techniques Using Bibliographic Information," pp. 440-457 (1963) ("Salton, 1963") &Pinski, G. and Narin, F., "Citation Influence for Journal Aggregates of Scientific Publications: Theory, With Application to the Literature of Physics," Inf. Proc.&Management, V. 12, pp. 297-312 (1976) ("Pinski, 1976"), pp. 146.

Ex C 04, Invalidity Claim Chart for U.S. Patent No. 5,544,352 Based on "Introduction to Modern Information Retrieval," Gerard Salton &Michael McGill (1983) ("Salton &McGill, 1983")&Tapper, C., "The Use of Citation Vectors for Legal Information Retrieval" In Journal of Law and Information Science, vol. 1, No. 2, pp. 131-161 (1982) ("Tapper, 1982"), pp. 163.

Ex C 05, Invalidity Claim Chart for U.S. Patent No. 5,544,352 Based on "Extending the Boolean and Vector Space Models of Information Retrieval With P-Norm Queries and Multiple Concept Types," Edward Alan Fox ("Fox Thesis, 1983") & "Hypertext/Hypermedia Handbook," E. Berk, J. Devlin ("Berk, 1991"), pp. 107.

Ex C 06, Invalidity Claim Chart for U.S. Patent No. 5,544,352 Based on Belew, Richard K., Adaptive Information Retrieval: Machine Learning in Associative Networks (1986) ("Belew, 1986")&Rose, D.E., "A Symbolic and Connectionist Approach to Legal Information Retrieval" (1991) ("Rose, 1991"), pp. 173.

Ex D 01, Invalidity Claim Chart for US Patent No. 5,832,494 Based on Salton, G., "Associative Document Retrieval Techniques Using Bibliographic Information," pp. 440-457 (1963). ("Salton, 1963"), pp. 59.

Ex D 02, Invalidity Claim Chart for US Patent No. 5,832,494 Based on Garner, R., "A Computer-Oriented Graph Theoretic Analysis of Citation Index Structures" In Three Drexel Infromation Science Research Studies, Ed. Flood, B., Drexel Press (1967). ("Garner, 1967"), pp. 62.

Ex D 03, Invalidity Claim Chart for U.S. Patent No. 5,832,494 Based on "Automatic Information Organization and Retrieval," Gerard Salton (1968) ("Salton, 1968"), pp. 28.

(56) References Cited

OTHER PUBLICATIONS

Ex D 67, Invalidity Claim Chart for U.S. Patent No. 5,832,494 Based on Kaplan, K., "New Ways to Find Needle in Data Haystack," Los Angeles Times, p. D4, Mar. 29, 1995, pp. 8.

Ex D 68, Invalidity Claim Chart for U.S. Patent No. 5,832,494 Based on "The Use of Semantic Links in Hypertext Information Retrieval," H.P. Frei and D. Stieger (1995) ("Frei &Stieger, 1995"), pp. 30.

Ex D 69, Invalidity Claim Chart for U.S. Patent No. 5,832,494 Based on Libertech, "Libertech to Release V-Search for Folio Views; Offers Dramatic Enhancements to Electronic Document Research," Business Wire,Mar. 21, 1995, pp. 8.

Ex D 71, Invalidity Claim Chart for US Patent No. 5,832,494 Based on Cyberpilot Pro Tutorial, by Netcarta (1996) ("Netcarta, 1996"), pp. 65.

Ex D 72, Invalidity Claim Chart for U.S. Patent No. 5,832,494 Based on Pirolli, P, Pitkow, J, and Rao, R., "Silk From a Sow'S Ear: Extract Usable Structures From the Web," In Conference on Human Factors in Computing Systems, CHI-96, 1996 ("Pirolli, 1996"), pp. 10.

Ex D 73, Invalidity Claim Chart for US Patent No. 5,832,494 Based on U.S. Patent No. 4,953,106 (Gansner et al.) ("U.S. Pat. No. 4,953,106"), pp. 26.

Ex D 74, Invalidity Claim Chart for US Patent No. 5,832,494 Based on U.S. Patent No. 5,446,891 (Kaplan) ("U.S. Pat. No. 5,446,891"), pp. 39.

Ex D 75, Invalidity Claim Chart for U.S. Patent No. 5,832,494 Based on U.S. Patent No. 5,748,954 ("Maudlin"), pp. 71.

Ex D 76, Invalidity Claim Chart for US Patent No. 5,832,494 Based on U.S. Patent No. 5,855,015 (Shoham) ("U.S. Pat. No. 5,855,015"), pp. 50.

Ex D 77, Invalidity Claim Chart for U.S. Patent No. 5,832,494 Based on U.S. Patent No. 5,838,906 (Doyle) ("U.S. Pat. No. 5,838,906"), pp. 8.

Ex D 78, Invalidity Claim Chart for US Patent No. 5,832,494 Based on Weiss R. et al, "Hypursuit: A Hierarchical Network Search Engine That Exploits Content-Link Hypertext Clustering," ACM, pp. 180-193 (1996). ("Weiss, 1996"), pp. 66.

Ex D 79, Invalidity Claim Chart for U.S. Patent No. 5,832,494 Based on "Marian Design," R. France, B. Cline &E. Fox, 1995 ("France, 1995"), pp. 11.

Ex D 80, Invalidity Claim Chart for U.S. Patent No. 5,832,494 Based on Pitkow,J. and Bharat, K.A., "Webviz: A Tool for World-Wide Web Access Log Analysis" In Proceedings of the First International WWWconference, Oct. 1994, and GVU Technical Report: GIT-GVU-94-20 ("Pitkow, 1994"), pp. 8.

Ex E 01 Invalidity Claim Chart for U.S. Patent No. 5,832,494 Based on: The "V-Search" Product Itself and Contemporaneous Documents Describing It and Related Matter as Evidenced by the Following Documents, Each Individually and Collectively Libertech, A Document Titled: "Libertech V-Search™ for Folio Views™: Infobase 95 Demonstration Disks" (STI_0011254-56); Libertech, A Document Titled: "Business Plan: Spring 1995," Mar. 1995, (EGG_0004956-99); Libertech, "Libertech to Release V-Search for Folio Views: Offers Dramatic Enhancements to Electronics Document Research," Mar. 21, 1995 (Business Wire); and Karen Kaplan, "New Ways to Find Need in Data Haystack," Los Angeles Times, p. D4, Mar. 29, 1995, pp. 8.

Ex E 02 Invalidity Claim Chart for U.S. Patent No. 5,832,494 Based on Envision, pp. 15.

Ex E 03 Invalidity Claim Chart for U.S. Patent No. 5,832,494 Based on Smart, pp. 8.

Ex E 04 Invalidity Claim Chart for U.S. Patent No. 5,832,494 Based on Intermedia, pp. 9.

Ex E 05 Invalidity Claim Chart for U.S. Patent No. 5,832,494 Based on Tip, pp. 16.

Ex F 01 Invalidity Claim Chart for US Patent No. 5,832,494 of Certain Exemplary Combinations, pp. 19.

Ex F 02, Invalidity Claim Chart for US Patent No. 5,832,494 Based on "Hypertext &Hypermedia", J. Nielsen, 1990 ("Nielsen, 1990B") &Frisse, M., "Searching for Information in a Hypertext Medical Handbook" In Communications of the ACM, vol. 31, No. 7, pp. 880-886 (Jul. 1988). ("Frisse, 1988"), pp. 126.

Ex F 03, Invalidity Claim Chart for US Patent No. 5,832,494 Based on Salton, G., "Associative Document Retrieval Techniques Using Bibliographic Information," pp. 440-457 (1963) ("Salton, 1963") &Pinski, G. and Narin, F., "Citation Influence for Journal Aggregates of Scientific Publications: Theory,With Application to the Literature of Physics," Inf. Proc. & Management, V. 12, pp. 297-312 (1976) ("Pinski, 1976"), pp. 121.

Ex F 04, Invalidity Claim Chart for US Patent No. 5,832,494 Based on "Introduction to Modern Information Retrieval," Gerard Salton &Michael McGill (1983) ("Salton &McGill, 1983")&Tapper, C., "The Use of Citation Vectors for Legal Information Retrieval" In Journal of Law and Information Science, vol. 1, No. 2, pp. 131-161 (1982) ("Tapper, 1982"), pp. 128.

Ex F 05, Invalidity Claim Chart for US Patent No. 5,832,494 Based on "Extending the Boolean and Vector Space Models of Information Retrieval With P-Norm Queries and Multiple Concept Types," Edward Alan Fox ("Fox Thesis, 1983") &"Hypertext/Hypermedia Handbook," E. Berk, J. Devlin ("Berk, 1991"), pp. 133.

Ex G 23 Invalidity Claim Chart for U.S. Patent No. 6,233,571 Based on Salton, G., Buckley, C., "On the Use of Spreading Activation Methods in Automatic Information Retrieval," From Proceedings of the 11th Annual International ACM SIGIR Conference, pp. 147-160 (1988). (Salton, 1988), pp. 26.

Ex G 24 Invalidity Claim Chart for U.S. Patent No. 6,233,571 Based on Edward Alan Fox et al., "Coefficients for Combining Concept Classes in a Collection" ("Fox, 1988"), pp. 44.

Ex G 25 Invalidity Claim Chart for U.S. Patent No. 6,233,571 Based on Berners-Lee, Tim, "Information Management: A Proposal," Cern, http://www.w3.org/history/1989/proposal.html. ("Berners-Lee, 1989"), pp. 95.

Ex G 26 Invalidity Claim Chart for U.S. Patent No. 6,233,571 Based on Croft and Turtle, "A Retrieval Model for Incorporating Hypertext Links" ("Croft and Turtle"), pp. 9.

Ex G 27 Invalidity Claim Chart for U.S. Patent No. 6,233,571 Based on Frisse, M., Cousins, S., "Information Retrieval From Hypertext: Update on the Dynamic Medical Handbook Project," (Nov. 1989) ("Frisse/Cousins, 1989"), pp. 56.

Ex G 28 Invalidity Claim Chart for U.S. Patent No. 6,233,571 Based on Roger Howard Thompson, "The Design and Implementation of an Intelligent Interface for Information Retrieval" ("Thompson, 1989"), pp. 58.

Ex G 29 Invalidity Claim Chart for U.S. Patent No. 6,233,571 Based on Rose, D.E.&Belew, R.K., "Legal Information Retrieval: A Hybrid Approach" ACM, pp. 138-146 (1989). ("Rose, 1989"), pp. 32.

Ex G 30 Invalidity Claim Chart for U.S. Patent No. 6,233,571 Based on "Designing Hypermedia for Learning," Piet Kommers, 1990 ("Kommers, 1990"), pp. 24.

Ex G 31 Invalidity Claim Chart for U.S. Patent No. 6,233,571 Based on Lucarella, D., "Amodel for Hypertext-Based Information Retrieval," In Proceedings of the ECHT'90. Inria, Cambridge University Press, N. Streitz, A. Rizk, and J. Andre, Eds., pp. 81-94 (Nov. 1990). ("Lucarella, 1990"), pp. 28.

Ex G 32 Invalidity Claim Chart for U.S. Patent No. 6,233,571 Based on Nielsen, J., "The Art of Navigating Through Hypertext," In Communications of the ACM, Vol. 33, No. 3, pp. 296-310 (Mar. 1990). ("Nielsen, 1990"), pp. 81.

Ex G 33 Invalidity Claim Chart for U.S. Patent No. 6,233,571 Based on "Hypertext & Hypermedia", J. Nielsen, 1990 ("Nielsen, 1990B"), pp. 96.

Ex G 34 Invalidity Claim Chart for U.S. Patent No. 6,233,571Based on Shepherd, M.,Watters, C.,&Cai, Y., "Transient Hypergraphs for Citation Networks," In Information Processing &Management, vol. 26, No. 3, pp. 395-412 (1990) (Shepherd, 1990), pp. 104.

Ex G 35 Invalidity Claim Chart for U.S. Patent No. 6,233,571 Based on Turtle, "Inference Networks for Document Retrieval" ("Turtle, 1991"), pp. 55.

Ex G 36 Invalidity Claim Chart for U.S. Patent 6,233,571 Based on Turtle and Croft, "Evaluation of an Inference Networkbased Retrieval Model" (1991) (Turtle &Croft, 1991), pp. 18.

(56) References Cited

OTHER PUBLICATIONS

Ex G 37 Invalidity Claim Chart for U.S. Patent No. 6,233,571 Based on Brueni, D. et al., "What If There Were Desktop Access to the Computer Science Literature?," (Feb. 16-18, 1993) ("Brueni, 1993"), pp. 28.
Ex G 38 Invalidity Claim Chart for U.S. Patent No. 6,233,571 Based on Gelbart, D., Smith, J.C., "Beyond Boolean Search: Flexicon, A Legal Text-Based Intelligent System." ACM, pp. 225-234 (1991). ("Gelbart, 1991"), pp. 39.
Ex G 39 Invalidity Claim Chart for U.S. Patent No. 6,233,571 Based on "Hypertext/Hypermedia Handbook", E. Berk, J. Devlin 1991 ("Berk, 1991"), pp. 25
Ex G 40 Invalidity Claim Chart for U.S. Patent No. 6,233,571Based on M.D. Dunlop &C.J. Van Rijsbergen, "Hypermedia and Free Text Retrieval" ("Dunlop"), pp. 34.
Ex G 41 Invalidity Claim Chart for U.S. Patent No. 6,233,571 Based on Roy Rada, "Hypertext—From Text to Expertext," (1991) ("Rada, 1991"), pp. 12.
Ex G 42 Invalidity Claim Chart for U.S. Patent No. 6,233,571 Based on Rose, D.E., "A Symbolic and Connectionist Approach to Legal Information Retrieval" (1991). ("Rose, 1991"), pp. 125.
Ex G 43 Invalidity Claim Chart for U.S. Patent No. 6,233,571 Based on "Making Use of Hypertext Links When Retrieving Information," H.P. Frei and D. Stieger (1992) ("Frei &Stieger, 1992"), pp. 20.
Ex G 44 Invalidity Claim Chart for U.S. Patent No. 6,233,571 Based on Botafogo, R.A., et al. "Structural Analysis of Hypertexts: Identifying Hierarchies and Useful Metrics," ACM Trans. Inf. Sys., vol. 10, 142-180 (Apr. 1992). ("Botafogo, 1992"), pp. 30.
Ex G 45 Invalidity Claim Chart for U.S. Patent No. 6,233,571 Based on Alain, L. and Claire, F., "Hypertext Paradigm in the Field of Information Retrieval: A Neural Approach," ACM ECHT Conference, pp. 112-121 (1992). ("Alain, 1992"), pp. 51.
Ex G 46 Invalidity Claim Chart for U.S. Patent No. 6,233,571 Based on Guinan, C., Smeaton, A., "Information Retrieval From Hypertext Using Dynamically Planned Guided Tours," From ACM ECHT Conference, pp. 122-130 (1992). ("Guinan, 1992"), pp. 49.
Ex G 47 Invalidity Claim Chart for U.S. Patent No. 6,233,571 Based on Qifan Chen, "An Object-Oriented Database System for Efficient Information Retrieval Applications," (Mar. 1992) ("Chen/Thesis, 1992"), pp. 9.
Ex G 48 Invalidity Claim Chart for U.S. Patent No. 6,233,571 Based on ,"Lend Pattern Language Syntax Specification: Ver 1.3," Q. Chen &S. Betrabet, 1992 ("Chen, 1992"), pp. 16.
Ex G 63 Invalidity Claim Chart for U.S. Patent No. 6,233,571 Based on U.S. Patent No. 5,855,015 (Shoham) ("U.S. Pat. No. 5,855,015"), pp. 55.
Ex G 64 Invalidity Claim Chart for U.S. Patent No. 6,233,571 Based on U.S. Patent No. 5,446,891 (Kaplan) ("U.S. Pat. No. 5,446,891"), pp. 43.
Ex G 65 Invalidity Claim Chart for U.S. Patent No. 6,233,571 Based on "Comparing Two Algorithms for Document Retrieval Using Citation Links," Julie Bichteler and Edward Eaton (1977) (Bichteler &Eaton, 1977), pp. 11.
Ex G 66 Invalidity Claim Chart for U.S. Patent No. 6,233,571 Based on "A System for Discovering Relationships by Feature Extraction From Text Databases," Jack Conrad and Mary Utt (1994) ("Conrad &Utt, 1994"), pp. 11.
Ex G 67 Invalidity Claim Chart for U.S. Patent No. 6,233,571 Based on U.S. Patent No. 5,748,954 ("Maudlin"), pp. 88.
Ex G 68 Invalidity Claim Chart for U.S. Patent No. 6,233,571 Based on Qifan Chen, "An Object-Oriented Database System for Efficient Information Retrieval Applications," (Mar. 1992) ("Chen/Thesis, 1992"), pp. 9.
Ex G 69 Invalidity Claim Chart for U.S. Patent No. 6,233,571 Based on Tip, pp. 17.
Ex G 70 Invalidity Claim Chart for U.S. Patent No. 6,233,571 Based on Smart, pp. 8.
Ex G 71 Invalidity Claim Chart for U.S. Patent No. 6,233,571 Based on Garfield, E., "Citation Indexing: Its Theory and Application in Science, Technology, and Humanities," (1979) ("Garfield, 1979"), pp. 50.
Ex G 72 Invalidity Claim Chart for U.S. Patent No. 6,233,571 Based on "Manual of Online Search Strategies" (C.J. Armstrong &J.A. Large, Eds.) (1988) ("Armstrong, 1988"), pp. 21.
Ex G 73 Invalidity Claim Chart for U.S. Patent No. 6,233,571 Based on "Subject and Citation Indexing Part I: The Clustering Structure of Composite Representations in the Cystic Fibrosis Document Collection," W.M. Shaw, 1991 ("Shaw/Part I, 1991"), pp. 13.
Ex G 74 Invalidity Claim Chart for U.S. Patent No. 6,233,571 Based on "Subject and Citation Indexing. Part II: The Optimal Cluster-Based Retrieval Performance of Composite Representations," W.M. Shaw, 1991 ("Shaw/Part II, 1991"), pp. 29.
Ex G 75 Invalidity Claim Chart for U.S. Patent No. 6,233,571 Based on "Marian Design," R. France, B. Cline &E. Fox, 1995 (France, 1995), pp. 10.
Ex G 76 Invalidity Claim Chart for U.S. Patent No. 6,233,571 Based on Weiss, R. et al, "Hypursuit: A Hierarchical Network Search Engine That Exploits Content-Link Hypertext Clustering," ACM, pp. 180-193 (1996) ("Weiss, 1996"), pp. 64.
Ex G 77 Invalidity Claim Chart for U.S. Patent No. 6,233,571 Based on Burt, Ronald, Structure Version 4.2, Reference Manual, Columbia University, 1991 (Burt, 1991), pp. 35.
Ex G 78 Invalidity Claim Chart for U.S. Patent No. 6,233,571 Based on Salton, G., "Associative Document Retrieval Techniques Using Bibliographic Information," pp. 440-457 (1963). ("Salton, 1963"), pp. 35.
Ex G 79 Invalidity Claim Chart for U.S. Patent No. 6,233,571 Based on Pitkow,J. and Bharat, K.A., "Webviz: A Tool for World-Wide Web Access Log Analysis" In Proceedings of the First International WWWConference, Oct. 1994, and GVU Technical Report: GIT-GVU-94-20 ("Pitkow, 1994"), pp. 12.
Ex G 80 Invalidity Claim Chart for U.S. Patent No. 6,233,571 Based on U.S. Patent No. 5,838,906 (Doyle) ("U.S. Pat. No. 5,838,906"), pp. 19.
Ex G 81 Invalidity Claim Chart for U.S. Patent No. 6,233,571 Based on De Bra, P. and Post, R.D.J., "Information Retrieval in the World-Wide Web:Making Client-Based Searching Feasible." In Computer Networks and ISDN Systems vol. 27, pp. 183-192 (1994) ("Debra, 1994"), pp. 31.
Ex H 01 Invalidity Claim Chart for U.S. Patent No. 6,233,571 Based on: The "V-Search" Product Itself and Contemporaneous Documents Describing It and Related Matter as Evidenced by the Following Documents, Each Individually and Collectively Libertech, A Document Titled: "Libertech V-Search™ for Folio Views™: Infobase 95 Demonstration Disks" (STI_0011254-56); Libertech, A Document Titled: "Business Plan: Spring 1995," Mar. 1995 (EGG_0004956-99); Libertech, "Libertech to Release V-Search for Folio Views: Offers Dramatic Enhancements to Electronics Document Research," Mar. 21, 1995 (Business Wire); and Karen Kaplan, "New Ways to Find Need in Data Haystack," Los Angeles Times, p. D4, Mar. 29, 1995, pp. 8.
Ex H 02 Invalidity Claim Chart for U.S. Patent No. 6,233,571 Based on Envision, pp. 12.
Ex H 03 Invalidity Claim Chart for U.S. Patent No. 6,233,571 Based on Intermedia, pp. 8.
Ex I 01 Invalidity Claim Chart for U.S. Patent No. 6,233,571 of Certain Exemplary Combinations, pp. 15.
Ex I 02 Invalidity Claim Chart for U.S. Patent No. 6,233,571 Based on "Hypertext & Hypermedia", J. Nielsen, 1990 ("Nielsen, 1990B") &Frisse, M., "Searching for Information in a Hypertext Medical Handbook" In Communications of the ACM, vol. 31, No. 7, pp. 880-886 (Jul. 1988). ("Frisse, 1988"), pp. 167.
Ex I 03 Invalidity Claim Chart for U.S. Patent No. 6,233,571 Based on Salton, G., "Associative Document Retrieval Techniques Using Bibliographic Information," pp. 440-457 (1963). ("Salton, 1963") &Pinski, G. and Narin, F., "Citation Influence for Journal Aggregates of Scientific Publications: Theory,With Application to the Literature of Physics," Inf. Proc.&Management, V. 12, pp. 297-312 (1976) ("Pinski, 1976"), pp. 72.

(56) References Cited

OTHER PUBLICATIONS

Ex I 04 Invalidity Claim Chart for U.S. Patent No. 6,233,571 Based on "Introduction to Modern Information Retrieval," Gerard Salton &Michael McGill (1983) ("Salton &McGill, 1983")&Tapper, C., "The Use of Citation Vectors for Legal Information Retrieval" In Journal of Law and Information Science, vol. 1, No. 2, pp. 131-161 (1982) ("Tapper, 1982"), pp. 95.
Ex I 05 Invalidity Claim Chart for U.S. Patent No. 6,233,571 Based on "Extending the Boolean and Vector Space Models of Information Retrieval With P-Norm Queries and Multiple Concept Types," Edward Alan Fox ("Fox Thesis, 1983") & "Hypertext/Hypermedia Handbook," E. Berk, J. Devlin ("Berk, 1991"), pp. 60.
Ex I 06 Invalidity Claim Chart for U.S. Patent No. 6,233,571 Based on Belew, Richard K., Adaptive Information Retrieval: Machine Learning in Associative Networks (1986) ("Belew, 1986")&Rose, D.E., "A Symbolic and Connectionist Approach to Legal Information Retrieval" (1991) ("Rose, 1991"), pp. 162.
Ex I 07 Invalidity Claim Chart for U.S. Patent No. 6,233,571 Based on Libertech, Business Wire, Mar. 21, 1995. Libertech, Business Wire, Apr. 24, 1995 Kaplan, K., "New Ways to Find Needle in Data Haystack," Los Angeles Times, p. D4,Mar. 29, 1995 Folio Infobase '95 Conference, San Diego (Mar. 29, 1995) PCTWO95/00895 (Published Jan. 5, 1995), pp. 29.
Documentation Accompanying UCInet Software, 1991.
France, Robert A., File/Database Creation in LEND Resulting from MARC Tape Processing, Nov. 2001 Note: Markup on document in author's handwriting made no later than Nov. 2001; unknown if document is published—Author is now deceased.
Fox, et al., "Development of a Modern OPAC: From REVTOLC to MARIAN", Department of Computer Science and Computing Center, Virginia Polytechnic Institute and State University, pp. 248-258.
Kessler, "An Experimental Study of Bibliographic Coupling Between Technical Papers", 1963, pp. 49-51 DEF0019243.
Lancaster, et al., "Information Retrieval On-Line", A Wiley-Becker & Hayes Series Book, Melville Publishing Company, Los Angeles, California, copyright 1973, 12 pgs.—DEF0019232.
Brandhorst, et al., "Document Retrieval and Dissemination Systems", 7 Annual Review of Information Science and Technology, Chapter 10, 1972, 61 pgs. DEF0019231.
Alt, et al., "Citation Searching and Bibliographic Coupling With Remote On-line Computer Access", Institute for Basic Standards, National Bureau of Standards, Washington, D.C., Jan. 30, 1968, 18 pgs. DEF0019226.
Keenan, et. al., "Retrieval of the 1964 Laser Literature Using MIT's Project Tip", American Institute of Physics, New York, NY, Pub Date 1968, Gant-NSF-GN-549, 15 pgs. DEF0019205.
Mathews, William D., "TIP Reference Manual", TIP-TM-104, Aug. 5, 1968, 46 pgs. DEF0019203.
Mathews, William D., "TIP Program Description", Technical Information Project, Jan. 1, 1966, 13 pgs. DEF0019201.
Kessler, M. M., "TIP User's Manual, A guide for on-line search and retrieval of the current literature in physics", First Edition, Dec. 1, 1965, 27 pgs. DEF0019147.
Kessler, M. M., "TIP System Applications, a description of TIP operations and a preliminary analysis of system experience," Oct. 1967, 28 pgs. DEF0019145.
National Technical Information Service, "Evaluation of On-Line Information Retrieval System Techniques", Naval Ship Research and Development Center, Washington, D.C., Dec. 1970, 66 pgs. DEF0019228.
National Technical Information Service, "TIP System Report," Massachusetts Institute of Technology, Cambridge, Oct. 1967, 152 pgs. DEF0019152 and DEF0019153.
Kessler, M. M., "An Experimental Communication Center for Scientific and Technical Information," MIT, Mar. 1960, 22 pgs. DEF0019162.
Various ReadMe Files, 44 pgs. DEF0020883.
Defendants' P.R. 3-3 Disclosure in *Software Rights Archive, LLC* v. *Google Inc., et al.*, Dated Jan. 23, 2009, 88 Pages.

Ex A-01, Invalidity Claim Chart for U.S. Patent No. 5,544,352 Based on Salton, G., "Associative Document Retrieval Techniques Using Bibliographic Information," pp. 440-457 (1963), 100 Pgs.
Ex A-02, Invalidity Claim Chart for U.S. Patent No. 5,544,352 Based on "Lend Pattern Language Syntax Specification: Ver 1.3," Q. Chen &S. Betrabet, 1992 ("Chen, 1992"), 17 Pgs.
Ex A-03, Invalidity Claim Chart for U.S. Patent No. 5,544,352 Based on Garner, R., "A Computer-Oriented Graph Theoretic Analysis of Citation Index Structures" In Three Drexel Infromation Science Research Studies, Ed. Flood, B., Drexel Press (1967). ("Garner, 1967"), 73 Pgs.
Ex A-04, Invalidity Claim Chart for U.S. Patent No. 5,544,352 Based on "Automatic Information Organization and Retrieval," Gerard Salton (1968) ("Salton, 1968"), 35 Pgs.
Ex A-05, Invalidity Claim Chart for U.S. Patent No. 5,544,352 Based on Goffman, W., "An Indirect Method of Information Retrieval," In Information Storage Retrieval, vol. 4, pp. 361-373 (1969). ("Goffman, 1969"), 65 Pgs.
Ex A-06, Invalidity Claim Chart for U.S. Patent No. 5,544,352 Based on "Automatic Indexing Using Bibliographic Citations," Gerard Salton, (1970) ("Salton, 1970"), 14 Pgs.
Ex A-07, Invalidity Claim Chart for U.S. Patent No. 5,544,352 Based on "The Smart Retrieval System: Experiments in Automatic Document Processing," Gerard Salton, Ed., 1971 ("Salton, 1971"), 53 Pgs.
Ex A-08, Invalidity Claim Chart for U.S. Patent No. 5,544,352 Based on Schiminovich, S., "Automatic Classification and Retrieval of Documents by Means of a Bibliographic Pattern Discovery Algorithm," In Inform. Stor. Retr., vol. 6, pp. 417-435 (1971). ("Schiminovich, 1971"), 69 Pgs.
Ex A-09, Invalidity Claim Chart for U.S. Patent No. 5,544,352 Based on "Documents Retrieval by Means of An Automatic Classification Algorithm for Citations," Julie Bichteler and Ronald Parsons (1974) ("Bichteler & Parsons,1974") 42 Pgs.
Ex A-10, Invalidity Claim Chart for U.S. Patent No. 5,544,352 Based on "An Experiment With Semantics and Goffman's Indirect Method," Ann Shimko (1974) ("Shimko, 1974"), 16 Pgs.
Ex A-11, Invalidity Claim Chart for U.S. Patent No. 5,544,352 Based on Pinski, G. and Narin, F., "Citation Influence for Journal Aggregates of Scientific Publications: Theory,With Application to the Literature of Physics," Inf. Proc.&Management, V. 12, pp. 297-312 (1976). ("Pinski, 1976"), 91 Pgs.
Ex A-12, Invalidity Claim Chart for U.S. Patent No. 5,544,352 Based on "Comparing Two Algorithms for Document Retrieval Using Citation Links," Julie Bichteler and Edward Eaton (1977) (Bichteler &Eaton, 1977), 13 Pgs.
Ex A-13, Invalidity Claim Chart for U.S. Patent No. 5,544,352 Based on Garfield, E., "Citation Indexing: Its Theory and Application in Science, Technology, and Humanities," (1979) ("Garfield, 1979"), 58 Pgs.
Ex A-14, Invalidity Claim Chart for U.S. Patent No. 5,544,352 Based on Tapper, C., "The Use of Citation Vectors for Legal Information Retrieval" In Journal of Law and Information Science, vol. 1, No. 2, pp. 131-161 (1982). (Tapper, 1982), 104 Pgs.
Ex A-15, Invalidity Claim Chart for U.S. Patent No. 5,544,352 Based on Kochtanek, T., "Bibliographic Compilation Using Reference and Citation Links," In Information Processing &Management, vol. 18, No. 1, pp. 33-39 (1982). ("Kochtanek, 1982"), 42 Pgs.
Ex A-16, Invalidity Claim Chart for U.S. Patent No. 5,544,352 Based on Fox, E., "Some Considerations for Implementing the Smart Information Retrieval System Under Unix," (1983) ("Fox/Smart, 1983"), 26 Pgs.
Ex A-17, Invalidity Claim Chart for U.S. Patent No. 5,544,352 Based on Edward Alan Fox, "Extending the Boolean and Vector Space Models of Information Retrieval With Pnorm Queries and Multiple Concept Types" ("Fox Thesis, 1983"), 79 Pgs.
Ex A-18, Invalidity Claim Chart for U.S. Patent No. 5,544,352 Based on "Characterization of Two New Experimental Collections in Computer and Information Science Containing Textual and Bibliographic Concepts," E. Fox, 1983 ("Fox/Collections, 1983"), 19 Pgs.
Ex A-19, Invalidity Claim Chart for U.S. Patent No. 5,544,352 Based on "Introduction to Modern Information Retrieval," Gerard Salton & Michael McGill (1983) ("Salton &McGill, 1983"), 52 Pgs.

(56) References Cited

OTHER PUBLICATIONS

Ex A-20, Invalidity Claim Chart for U.S. Patent No. 5,544,352 Based on "Combining Information in an Extended Automatic Information Retrieval System for Agriculture", E. Fox 1984 ("Fox, 1984"), 13 Pgs.

Ex A-21, Invalidity Claim Chart for U.S. Patent No. 5,544,352 Based on "Composite Document Extended Retrieval," E. Fox, 1985 ("Fox, 1985"), pp. 49.

Ex A-22, Invalidity Claim Chart for U.S. Patent No. 5,544,352 Based on Belew, Richard K., Adaptive Information Retrieval: Machine Learning in Associative Networks (1986). ("Belew, 1986"), pp. 121.

Ex A-23, Invalidity Claim Chart for U.S. Patent No. 5,544,352 Based on "Manual of Online Search Strategies" (C.J. Armstrong &J.A. Large, Eds.) (1988) ("Armstrong, 1988"), 31 Pgs.

Ex A-24, Invalidity Claim Chart for U.S. Patent No. 5,544,352 Based on Croft, Lucia and Cohen, "Retrieving Documents by Plausible Inference: A Preliminary Study" ("Croft, Lucia, 1989"), pp. 14.

Ex A-25, Invalidity Claim Chart for U.S. Patent No. 5,544,352 Based on Frisse, M., "Searching for Information in a Hypertext Medical Handbook" In Communications of the ACM, vol. 31, No. 7, pp. 880-886 (Jul. 1988). ("Frisse, 1988"), pp. 49.

Ex A-26, Invalidity Claim Chart for U.S. Patent No. 5,544,352 Based on Frisse, M., "Searching for Information in a Hypertext Medical Handbook" In Communications of the ACM, vol. 31, No. 7, pp. 880-886 (Jul. 1988). ("Frisse, 1988"), pp. 45.

Ex A-27, Invalidity Claim Chart for U.S. Patent No. 5,544,352 Based on Edward A. Fox et al., "Coefficients for Combining Concept Classes in a Collection" ("Fox, 1988"), pp. 41.

Ex A-28, Invalidity Claim Chart for U.S. Patent No. 5,544,352 Based on Croft and Turtle, "A Retrieval Model for Incorporating Hypertext Links" ("Croft, 1989"), pp. 11.

Ex A-29, Invalidity Claim Chart for U.S. Patent No. 5,544,352 Based on Frisse, M., Cousins, S., "Information Retrieval From Hypertext: Update on the Dynamic Medical Handbook Project," (Nov. 1989) ("Frisse/Cousins, 1989"), pp. 53.

Ex A-30, Invalidity Claim Chart for U.S. Patent No. 5,544,352 Based on Rose, D.E.&Belew, R.K., "Legal Information Retrieval: A Hybrid Approach" ACM, pp. 138-146 (1989). ("Rose, 1989"), pp. 40.

Ex A 31, Invalidity Claim Chart for U.S. Patent No. 5,544,352 Based on Roger Howard Thompson, "The Design and Implementation of An Intelligent Interface for Information Retrieval" ("Thompson, 1989"), pp. 61.

Ex A 32, Invalidity Claim Chart for U.S. Patent No. 5,544,352 Based on "Designing Hypermedia for Learning," Piet Kommers, 1990 ("Kommers, 1990"), pp. 28.

Ex A 33, Invalidity Claim Chart for U.S. Patent No. 5,544,352 Based on Lucarella, D., "Amodel for Hypertext-Based Information Retrieval," In Proceedings of the ECHT'90. Inria, Cambridge University Press, N. Streitz, A. Rizk, and J. Andre, Eds., pp. 81-94 (Nov. 1990). ("Lucarella, 1990"), pp. 40.

Ex D 04, Invalidity Claim Chart for US Patent No. 5,832,494 Based on Goffman, W., "An Indirect Method of Information Retrieval," In Information Storage Retrieval, vol. 4, pp. 361-373 (1969). ("Goffman, 1969"), pp. 71.

Ex D 05, Invalidity Claim Chart for U.S. Patent No. 5,832,494 Based on "Automatic Indexing Using Bibliographic Citations," Gerard Salton, (1970) ("Salton, 1970"), pp. 14.

Ex D 06, Invalidity Claim Chart for U.S. Patent No. 5,832,494 Based on "The Smart Retrieval System: Experiments in Automatic Document Processing," Gerard Salton, Ed., 1971 ("Salton, 1971"), pp. 37.

Ex D 07, Invalidity Claim Chart for US Patent No. 5,832,494 Based on Schiminovich, S., "Automatic Classification and Retrieval of Documents by Means of a Bibliographic Pattern Discovery Algorithm," In Inform. Stor. Retr., vol. 6, pp. 417-435 (1971). ("Schiminovich, 1971"), pp. 65.

Ex D 08, Invalidity Claim Chart for U.S. Patent No. 5,832,494 Based on "Documents Retrieval by Means of an Automatic Classification Algorithm for Citations," Julie Bichteler and Ronald Parsons (1974) ("Bichteler &Parsons, 1974"), pp. 34.

Ex D 09, Invalidity Claim Chart for U.S. Patent No. 5,832,494 Based on "An Experiment With Semantics and Goffman's Indirect Method," Ann Shimko (1974) ("Shimko, 1974"), pp. 13.

Ex D 10, Invalidity Claim Chart for U.S. Patent No. 5,832,494 Based on "Lend Pattern Language Syntax Specification: Ver 1.3," Q. Chen &S. Betrabet, 1992 ("Chen, 1992"), pp. 11.

Ex D 11, Invalidity Claim Chart for US Patent No. 5,832,494 Based on Pinski, G. and Narin, F., "Citation Influence for Journal Aggregates of Scientific Publications: Theory,With Application to the Literature of Physics," Inf. Proc.&Management, V. 12, pp. 297-312 (1976). ("Pinski, 1976"), pp. 86.

Ex D 12, Invalidity Claim Chart for U.S. Patent No. 5,832,494 Based on "Comparing Two Algorithms for Document Retrieval Using Citation Links," Julie Bichteler and Edward Eaton (1977) (Bichteler &Eaton, 1977), pp. 13.

Ex D 13, Invalidity Claim Chart for U.S. Patent No. 5,832,494 Based on Garfield, E., "Citation Indexing: Its Theory and Application in Science, Technology, and Humanities," (1979) ("Garfield, 1979"), pp. 46.

Ex D 14, Invalidity Claim Chart for U.S. Patent No. 5,832,494 Based on Tapper, C., "The Use of Citation Vectors for Legal Information Retrieval" In Journal of Law and Information Science, vol. 1, No. 2, pp. 131-161 (1982). (Tapper, 1982), pp. 76.

Ex D 15, Invalidity Claim Chart for US Patent No. 5,832,494 Based on Kochtanek, T., "Bibliographic Compilation Using Reference and Citation Links," In Information Processing &Management, vol. 18, No. 1, pp. 33-39 (1982). ("Kochtanek, 1982"), pp. 41.

Ex D 16, Invalidity Claim Chart for U.S. Patent No. 5,832,494 Based on Fox, E., "Some Considerations for Implementing the Smart Information Retrieval System Under Unix," (1983) ("Fox/Smart, 1983"), pp. 31.

Ex D 17, Invalidity Claim Chart for U.S. Patent No. 5,832,494 Based on Edward Alan Fox, "Extending the Boolean and Vector Space Models of Information Retrieval With Pnorm Queries and Multiple Concept Types" ("Fox Thesis, 1983"), pp. 57.

Ex D 18, Invalidity Claim Chart for U.S. Patent No. 5,832,494 Based on "Characterization of Two New Experimental Collections in Computer and Information Science Containing Textual and Bibliographic Concepts," E. Fox, 1983 ("Fox/Collections, 1983"), pp. 17.

Ex D 19, Invalidity Claim Chart for U.S. Patent No. 5,832,494 Based on "Introduction to Modern Retrieval," Gerard Salton &Michael McGill (1983) ("Salton &McGill, 1983"), pp. 50.

Ex D 20, Invalidity Claim Chart for U.S. Patent No. 5,832,494 Based on "Combining Information in an Extended Automatic Information Retrieval System for Agriculture", E. Fox 1984 ("Fox, 1984" ), pp. 24.

Ex D 21, Invalidity Claim Chart for U.S. Patent No. 5,832,494 Based on "Composite Document Extended Retrieval," E. Fox, 1985 ("Fox, 1985"), pp. 52.

Ex D 22, Invalidity Claim Chart for US Patent No. 5,832,494 Based on Belew, Richard K., Adaptive Information Retrieval: Machine Learning in Associative Networks(1986). ("Belew, 1986"), pp. 121.

Ex D 23, Invalidity Claim Chart for U.S. Patent No. 5,832,494 Based on Conklin, J., "Hypertext: An Introduction and Survey," IEEE, 17-40, 1987 ("Conklin, 1987"), pp. 11.

Ex D 24, Invalidity Claim Chart for US Patent No. 5,832,494 Based on Conklin, J., Begeman, M., "GIBIS: A Hypertext Tool for Exploratory Policy Discussion," ACM, pp. 140-152 (1988). ("Conklin, 1988"), pp. 19.

Ex D 25, Invalidity Claim Chart for U.S. Patent No. 5,832,494 Based on "Retrieving Documents by Plausible Inference: A Preliminary Study"("Croft, Lucia, 1989"), pp. 17.

Ex D 26, Invalidity Claim Chart for U.S. Patent No. 5,832,494 Based on "Manual of Online Search Strategies" (C.J. Armstrong &J.A. Large, Eds.) (1988) ("Armstrong, 1988"), pp. 45.

Ex D 27, Invalidity Claim Chart for US Patent No. 5,832,494 Based on Frisse, M., "Searching for Information in a Hypertext Medical Handbook" In Communications of the ACM, vol. 31, No. 7, pp. 880-886 (Jul. 1988). ("Frisse, 1988"), pp. 59.

Ex D 28, Invalidity Claim Chart for US Patent No. 5,832,494 Based on Salton, G., Buckley, C., "On the Use of Spreading Activation

(56) References Cited

OTHER PUBLICATIONS

Methods in Automatic Information Retrieval," From Proceedings of the 11th Annual International ACM SIGIR Conference, pp. 147-160 (1988). (Salton, 1988), pp. 43.

Ex D 29, Invalidity Claim Chart for U.S. Patent No. 5,832,494 Based on Edward Alan Fox et al., "Coefficients for Combining Concept Classes in a Collection" ("Fox, 1988"), pp. 53.

Ex D 30, Invalidity Claim Chart for US Patent No. 5,832,494 Based on Berners-Lee, Tim, "Information Management: A Proposal," Cern, http://www.w3.org/history/1989/proposal.html. ("Berners-Lee, 1989"), pp. 75.

Ex D 31 Invalidity Claim Chart for U.S. Patent No. 5,832,494 Based on Croft and Turtle, "A Retrieval Model for Incorporating Hypertext Links" ("Croft, 1989"), pp. 12.

Ex D 32, Invalidity Claim Chart for U.S. Patent No. 5,832,494 Based on Frisse, M., Cousins, S., "Information Retrieval From Hypertext: Update on the Dynamic Medical Handbook Project," (Nov. 1989) ("Frisse/Cousins, 1989"), pp. 42.

Ex D 33, Invalidity Claim Chart for US Patent No. 5,832,494 Based on Lucarella, D., "Amodel for Hypertext-Based Information Retrieval," In Proceedings of the ECHT'90. Inria, Cambridge University Press, N. Streitz, A. Rizk, and J. Andre, Eds., pp. 81-94 (Nov. 1990). ("Lucarella, 1990"), pp. 40.

Ex D 34, Invalidity Claim Chart for U.S. Patent No. 5,832,494 Based on Roger Howard Thompson, "The Design and Implementation of an Intelligent Interface for Information Retrieval" ("Thompson, 1989"), pp. 84.

Ex D 35, Invalidity Claim Chart for US Patent No. 5,832,494 Based on Rose, D.E.&Belew, R.K., "Legal Information Retrieval: A Hybrid Approach" ACM, pp. 138-146 (1989). ("Rose, 1989"), pp. 35.

Ex D 36, Invalidity Claim Chart for U.S. Patent No. 5,832,494 Based on "Designing Hypermedia for Learning," Piet Kommers, 1990 ("Kommers, 1990"), pp. 34.

Ex D 38, Invalidity Claim Chart for US Patent No. 5,832,494 Based on Nielsen, J., "The Art of Navigating Through Hypertext," In Communications of the ACM, vol. 33, No. 3, pp. 296-310 (Mar. 1990). ("Nielsen, 1990"), pp. 54.

Ex D 39, Invalidity Claim Chart for U.S. Patent No. 5,832,494 Based on "Hypertext & Hypermedia", J. Nielsen, 1990 ("Nielsen, 1990B"), pp. 60.

Ex D 40, Invalidity Claim Chart for US Patent No. 5,832,494 Based on Shepherd, M.,Watters, C.,&Cai, Y., "Transient Hypergraphs for Citation Networks," In Information Processing &Management, vol. 26, No. 3, pp. 395-412 (1990) (Shepherd, 1990), pp. 82.

Ex D 41, Invalidity Claim Chart for U.S. Patent No. 5,832,494 Based on "Hypertext/Hypermedia Handbook", E. Berk, J. Devlin 1991 ("Berk, 1991"), pp. 16.

Ex D 42, Invalidity Claim Chart for US Patent No. 5,832,494 Based on Burt, Ronald, Structure Version 4.2, Reference Manual, Columbia University, 1991 (Burt, 1991), pp. 55.

Ex D 43, Invalidity Claim Chart for U.S. Patent No. 5,832,494 Based on M.D. Dunlop &C.J. Van Rijsbergen, "Hypermedia and Free Text Retrieval" ("Dunlop, 1991A"), pp. 30.

Ex D 44, Invalidity Claim Chart for US Patent No. 5,832,494 Based on Gelbart, D., Smith, J.C., "Beyond Boolean Search: Flexicon, A Legal Text-Based Intelligent System." ACM, pp. 225-234 (1991). ("Gelbart, 1991"), pp. 45.

Ex D 45, Invalidity Claim Chart for U.S. Patent No. 5,832,494 Based on Roy Rada, "Hypertext—From Text to Expertext," (1991) ("Rada, 1991"), pp. 16.

Ex D 46, Invalidity Claim Chart for US Patent No. 5,832,494 Based on Rose, D.E., "A Symbolic and Connectionist Approach to Legal Information Retrieval" (1991). ("Rose, 1991"), pp. 112.

Ex D 47, Invalidity Claim Chart for US Patent No. 5,832,494 Based on "Subject and Citation Indexing Part I: The Clustering Structure of Composite Representations in the Cystic Fibrosis Document Collection," W.M. Shaw, 1991 ("Shaw/Part I, 1991"), pp. 19.

Ex D 48, Invalidity Claim Chart for U.S. Patent No. 5,832,494 Based on "Subject and Citation Indexing. Part II: The Optimal Cluster-Based Retrieval Performance of Composite Representations," W.M. Shaw, 1991 ("Shaw/Part II, 1992"), pp. 38.

Ex D 49, Invalidity Claim Chart for U.S. Patent No. 5,832,494 Based on Turtle and Croft, "Evaluation of an Inference Network-Based Retrieval Model" (1991) (Turtle &Croft, 1991), pp. 12.

Ex D 50, Invalidity Claim Chart for U.S. Patent No. 5,832,494 Based on Turtle, "Inference Networks for Document Retrieval" ("Turtle, 1991"), pp. 60.

Ex D 51, Invalidity Claim Chart for US Patent No. 5,832,494 Based on Alain, L. and Claire, F., "Hypertext Paradigm in the Field of Information Retrieval: A Neural Approach," ACM ECHT Conference, pp. 112-121 (1992). ("Alain, 1992"), pp. 43.

Ex D 52, Invalidity Claim Chart for US Patent No. 5,832,494 Based on Botafogo, R.A., et al. "Structural Analysis of Hypertexts: Identifying Hierarchies and Useful Metrics," ACM Trans. Inf. Sys., vol. 10, 142-180 (Apr. 1992). ("Botafogo, 1992"), pp. 40.

Ex D 53, Invalidity Claim Chart for U.S. Patent No. 5,832,494 Based on Qifan Chen, "An Object-Oriented Database System for Efficient Information Retrieval Applications," (Mar. 1992) ("Chen/Thesis, 1992"), pp. 8.

Ex D 54, Invalidity Claim Chart for U.S. Patent No. 5,832,494 Based on "Making Use of Hypertext Links When Retrieving Information," H.P. Frei. and D. Stieger (1992) ("Frei &Stieger, 1992"), pp. 22.

Ex D 55, Invalidity Claim Chart for US Patent No. 5,832,494 Based on Guinan, C., Smeaton, A., "Information Retrieval From Hypertext Using Dynamically Planned Guided Tours," From ACM ECHT Conference, pp. 122-130 (1992). ("Guinan, 1992"), pp. 55.

Ex D 56, Invalidity Claim Chart for US Patent No. 5,832,494 Based on UCINET IV: Network Analysis Software (Product Description) ("UCINET, 1992"), pp. 23.

Ex D 57, Invalidity Claim Chart for U.S. Patent No. 5,832,494 Based on "A Query Language for Information Graphs," S. Betrabet, 1993 ("Betrabet Thesis, 1993"), pp. 30.

Ex D 58, Invalidity Claim Chart for U.S. Patent No. 5,832,494 Based on "A Query Language for Information Graphs", S. Betrabet, E. Fox &Q. Chen, 1993 ("Betrabet, 1993"), pp. 19.

Ex D 59, Invalidity Claim Chart for U.S. Patent No. 5,832,494 Based on Brueni, D. et al., "What If There Were Desktop Access to the Computer Science Literature?," (Feb. 16-18, 1993) ("Brueni, 1993"), pp. 22.

Ex D 60, Invalidity Claim Chart for US Patent No. 5,832,494 Based on Croft, B., Turtle, H., "Retrieval Strategies for Hypertext," In Information Processing & Management, vol. 29, No. 3, pp. 313-324 (1993). ("Croft, 1993"), pp. 50.

Ex D 61, Invalidity Claim Chart for U.S. Patent No. 5,832,494 Based on Fox, E. et al., "Users, User Interfaces, and Objects: Envision, A Digital Library" (Sep. 1993) ("Fox /Envision, 1993"), pp. 23.

Ex D 62, Invalidity Claim Chart for U.S. Patent No. 5,832,494 Based on "A System for Discovering Relationships by Feature Extraction From Text Databases," Jack Conrad and Mary Utt (1994) ("Conrad &Utt, 1994"), pp. 14.

Ex D 63, Invalidity Claim Chart for US Patent No. 5,832,494 Based on De Bra, P. and Post, R.D.J., "Information Retrieval in the World-Wide Web:Making Client-Based Searching Feasible." In Computer Networks and ISDN Systems vol. 27, pp. 183-192 (1994) ("Debra, 1994"), pp. 28.

Ex D 64, Invalidity Claim Chart for U.S. Patent No. 5,832,494 Based on W.Herzner and F.Kappe, "Multimedia/Hypermedia in Open Distributed Environments," (1994) ("Herzner, 1994"), pp. 17.

Ex D 65, Invalidity Claim Chart for US Patent No. 5,832,494 Based on McKee, D., "Towards Better Integration of Dynamic Search Technology and the World-Wide Web," Proc. 1st Int. Conf. on the World Wide Web, pp. 129-135 (1994). ("McKee, 1994"), pp. 38.

Ex D 66, Invalidity Claim Chart for U.S. Patent No. 5,832,494 Based on Brian Pinkerton, "Finding What People Want: Experiences With the Webcrawler," 1994 ("Pinkerton, 1994"), pp. 13.

Ex F 06, Invalidity Claim Chart for US Patent No. 5,832,494 Based on Belew, Richard K., Adaptive Information Retrieval: Machine Learning in Associative Networks (1986) ("Belew, 1986")&Rose, D.E., "A Symbolic and Connectionist Approach to Legal Information Retrieval" (1991) ("Rose, 1991"), pp. 179.

Ex F 07—Invalidity Claim Chart for U.S. Patent No. 5,832,494 Based on: Libertech, Business Wire,Mar. 21, 1995. Libertech, Business

(56) References Cited

OTHER PUBLICATIONS

Wire, Apr. 24, 1995, Kaplan, K., "New Ways to Find Needle in Data Haystack," Los Angeles Times, p. D4,Mar. 29, 1995, Folio Infobase '95 Conference, San Diego (Mar. 29, 1995) PCTWO95/00895 (Published Jan. 5, 1995), pp. 17.

Ex G 01 Invalidity Claim Chart for U.S. Patent No. 6,233,571 Based on Garner, R., "A Computer-Oriented Graph Theoretic Analysis of Citation Index Structures" In Three Drexel Infromation Science Research Studies, Ed. Flood, B., Drexel Press (1967). ("Garner, 1967"), pp. 38.

Ex G 02 Invalidity Claim Chart for U.S. Patent No. 6,233,571 Based on "Automatic Information Organization and Retrieval," Gerard Salton (1968) ("Salton, 1968"), pp. 23.

Ex G 03 Invalidity Claim Chart for U.S. Patent No. 6,233,571 Based on Goffman, W., "An Indirect Method of Information Retrieval," In Information Storage Retrieval, vol. 4, pp. 361-373 (1969). ("Goffman, 1969"), pp. 58.

Ex G 04 Invalidity Claim Chart for U.S. Patent No. 6,233,571 Based on "Automatic Indexing Using Bibliographic Citations," Gerard Salton, (1970) ("Salton, 1970"), pp. 12.

Ex G 05 Invalidity Claim Chart for U.S. Patent No. 6,233,571 Based on "The Smart Retrieval System: Experiments in Automatic Document Processing," Gerard Salton, Ed., 1971 ("Salton, 1971"), pp. 45.

Ex G 06 Invalidity Claim Chart for U.S. Patent No. 6,233,571 Based on Schiminovich, S., "Automatic Classification and Retrieval of Documents by Means of a Bibliographic Pattern Discovery Algorithm," In Inform. Stor. Retr., vol. 6, pp. 417-435 (1971). ("Schiminovich, 1971"), pp. 39.

Ex G 07 Invalidity Claim Chart for U.S. Patent No. 6,233,571 Based on "An Experiment With Semantics and Goffman's Indirect Method," Ann Shimko (1974), pp. 10.

Ex G 08 Invalidity Claim Chart for U.S. Patent No. 6,233,571 Based on "Documents Retrieval by Means of An Automatic Classification Algorithm for Citations," Julie Bichteler and Ronald Parsons (1974) ("Bichteler &Parsons, 1974"), pp. 29.

Ex G 09 Invalidity Claim Chart for U.S. Patent No. 6,233,571 Based on Pinski, G. and Narin, F., "Citation Influence for Journal Aggregates of Scientific Publications: Theory,With Application to the Literature of Physics," Inf. Proc.&Management, V. 12, pp. 297-312 (1976). ("Pinski, 1976"), pp. 50.

Ex G 10 Invalidity Claim Chart for U.S. Patent No. 6,233,571 Based on Tapper, C., "The Use of Citation Vectors for Legal Information Retrieval" In Journal of Law and Information Science, vol. 1, No. 2, pp. 131-161 (1982). (Tapper, 1982), pp. 54.

Ex G 11 Invalidity Claim Chart for U.S. Patent No. 6,233,571 Based on Kochtanek, T., "Bibliographic Compilation Using Reference and Citation Links," In Information Processing &Management, vol. 18, No. 1, pp. 33-39 (1982). ("Kochtanek, 1982"), pp. 34.

Ex G 12 Invalidity Claim Chart for U.S. Patent No. 6,233,571 Based on Fox, E., "Some Considerations for Implementing the Smart Information Retrieval System Under Unix," (1983) ("Fox/Smart, 1983"), pp. 27.

Ex G 13 Invalidity Claim Chart for U.S. Patent No. 6,233,571 Based on Edward Alan Fox, Extending the Boolean and Vector Space Models of Information Retrieval With Pnorm Queries and Multiple Concept Types ("Fox Thesis, 1983"), pp. 43.

Ex G 14 Invalidity Claim Chart for U.S. Patent No. 6,233,571 Based on "Characterization of Two New Experimental Collections in Computer and Information Science Containing Textual and Bibliographic Concepts," E. Fox, 1983 ("Fox/Collections, 1983"), pp. 12.

Ex G 15 Invalidity Claim Chart for U.S. Patent No. 6,233,571 Based on "Introduction to Modern Information Retrieval," Gerard Salton &Michael McGill (1983) ("Salton &McGill, 1983"), pp. 43.

Ex G 16 Invalidity Claim Chart for U.S. Patent No. 6,233,571 Based on "Combining Information in An Extended Automatic Information Retrieval System for Agriculture", E. Fox 1984 ("Fox, 1984"), pp. 22.

Ex G 17 Invalidity Claim Chart for U.S. Patent No. 6,233,571 Based on "Composite Document Extended Retrieval," E. Fox, 1985 ("Fox, 1985"), pp. 37.

Ex G 18 Invalidity Claim Chart for U.S. Patent No. 6,233,571 Based on Belew, Richard K., Adaptive Information Retrieval: Machine Learning in Associative Networks (1986). ("Belew, 1986"), pp. 119.

Ex G 19 Invalidity Claim Chart for U.S. Patent No. 6,233,571 Based on Conklin, J., "Hypertext: An Introduction and Survey," IEEE, 17-40, 1987 ("Conklin, 1987"), pp. 30.

Ex G 20 Invalidity Claim Chart for U.S. Patent No. 6,233,571 Based on Conklin, J., Begeman, M., "GIBIS: A Hypertext Tool for Exploratory Policy Discussion," ACM, pp. 140-152 (1988). ("Conklin, 1988"), pp. 45.

Ex G 21 Invalidity Claim Chart for U.S. Patent No. 6,233,571 Based on "Retrieving Documents by Plausible Inference: A Preliminary Study" ("Croft, Lucia, 1989"), pp. 13.

Ex G 22 Invalidity Claim Chart for U.S. Patent No. 6,233,571 Based on Frisse, M., "Searching for Information in a Hypertext Medical Handbook" In Communications of the ACM, vol. 31, No. 7, pp. 880-886 (Jul. 1988). ("Frisse, 1988"), pp. 55.

Ex G 49 Invalidity Claim Chart for U.S. Patent No. 6,233,571 Based on UCINET IV: Network Analysis Software (Product Description) ("UCINET, 1992"), pp. 17.

Ex G 50 Invalidity Claim Chart for U.S. Patent No. 6,233,571 Based on Fox, E. et al., "Users, User Interfaces, and Objects: Envision, A Digital Library" (Sep. 1993) ("Fox /Envision, 1993"), pp. 23.

Ex G 51 Invalidity Claim Chart for U.S. Patent No. 6,233,571 Based on Croft, B., Turtle, H., "Retrieval Strategies for Hypertext," In Information Processing & Management, vol. 29, No. 3, pp. 313-324 (1993). ("Croft, 1993"), pp. 42.

Ex G 52 Invalidity Claim Chart for U.S. Patent No. 6,233,571 Based on "A Query Language for Information Graphs", S. Betrabet, E. Fox &Q. Chen, 1993 ("Betrabet, 1993"), pp. 32.

Ex G 53 Invalidity Claim Chart for U.S. Patent No. 6,233,571 Based on "Finding What People Want: Experiences With the Webcrawler," Brian Pinkerton, 1994 ("Pinkerton, 1994"), pp. 15.

Ex G 54 Invalidity Claim Chart for U.S. Patent No. 6,233,571 Based on "A Query Language for Information Graphs," S. Betrabet, 1993 ("Betrabet Thesis, 1993"), pp. 26.

Ex G 55 Invalidity Claim Chart for U.S. Patent No. 6,233,571 Based on W.Herzner and F.Kappe, "Multimedia/Hypermedia in Open Distributed Environments," (1994) ("Herzner, 1994"), pp. 22.

Ex G 56 Invalidity Claim Chart for U.S. Patent No. 6,233,571 Based on McKee, D., "Towards Better Integration of Dynamic Search Technology and the World-Wide Web," Proc. 1st Int. Conf. on the World Wide Web, pp. 129-135 (1994). ("McKee, 1994"), pp. 34.

Ex G 57 Invalidity Claim Chart for U.S. Patent No. 6,233,571 Based on Ed Krol, "The Whole Internet," (1994) ("Krol, 1994"), pp. 8.

Ex G 58 Invalidity Claim Chart for U.S. Patent No. 6,233,571 Based on "The Use of Semantic Links in Hypertext Information Retrieval," H.P. Frei and D. Stieger (1995) ("Frei &Stieger, 1995"), pp. 29.

Ex G 59 Invalidity Claim Chart for U.S. Patent No. 6,233,571 Based on Cyberpilot Pro Tutorial, by Netcarta (1996) ("Netcarta, 1996"), pp. 74.

Ex G 60 Invalidity Claim Chart for U.S. Patent No. 6,233,571 Based on Kaplan, K., "New Ways to Find Needle in Data Haystack," Los Angeles Times, p. D4, Mar. 29, 1995, pp. 11.

Ex G 61 Invalidity Claim Chart for U.S. Patent No. 6,233,571Based on Libertech, "Libertech to Release V-Search for Folio Views; Offers Dramatic Enhancements to Electronic Document Research," Business Wire,Mar. 21, 1995, pp. 9.

Ex G 62 Invalidity Claim Chart for U.S. Patent No. 6,233,571 Based on Pirolli, P, Pitkow, J, and Rao, R., "Silk From a Sow's Ear: Extract Usable Structures From the Web," In Conference on Human Factors in Computing Systems, CHI-96, 1996 ("Pirolli, 1996"), pp. 9.

Egger, file history of U.S. Appl. No. 08/076,658, filed Jun. 14, 1993, now Patent No. 5,544,352 issued Aug. 6, 1996, 390 pages.

Egger et al., file history of U.S. Appl. No. 08/649,304, filed May 17, 1996, now Patent No. 5,832,494 issued Nov. 3, 1998.

Egger et al., file history of U.S. Appl. No. 09/071,120, filed May 4, 1998, now Patent No. 6,233,571 issued May 15, 2001.

Egger et al., file history of U.S. Appl. No. 09/854,577, filed May 15, 2001, 772 pages.

Egger, file history of U.S. Appl. No. 11/404,824, filed Apr. 17, 2006, 240 pages.

(56) References Cited

OTHER PUBLICATIONS

Libertech, Inc., file history of EP Application No. 94921295.5, filed Jun. 13, 1994, now Patent No. 0704075B1 first published Sep. 11, 2002, 532 pages.

Smith, S. et al., "Interactive Data Exploration with a Supercomputer", *Proceedings of the 2nd Conference on Visualization '91*, San Diego, CA, Session: Systems, *IEEE*, 1991, pp. 248-254.

Croft, W.B. et al., "A network organization used for document retrieval", *Proceedings of the 6th Annual ACM SIGIR Conference*, Computer and Information Science Department, Amherst, Massachusetts (1983), pp. 178-188.

Knaus, D. et al., "Improving a Basic Retrieval Method by Links and passage Level Evidence", *Overview of the Third Text Retrieval Conference (TREC-3)*, Harman, D.K., Editor, Computer Systems Laboratory National Institute of Standards and Technology, Gaithersburg, MD (Apr. 1995), pp. 241-246.

Gibson, D. et al., "Inferring Web Communities from Link Topology", *Proceedings of The Ninth ACM Conference on Hypertext and Hypermedia: Links, Objects, Time and Space—Structure in Hypermedia Systems*, ACM (1998), pp. 225-234.

Rivlin, E. et al., "Navigating in Hyperspace: Designing A Structure-Based Toolbox", *Communications of the ACM*, vol. 37, Issue 2 (Feb. 1994), pp. 87-96.

Stotts, P.D., "Dynamic Adaptation of Hypertext Structure", *Proceedings of the Third Annual ACM Conference on Hypertext*, San Antonio, Texas, ACM (1991), pp. 219-231.

Salton, G., "Associative Document Retrieval Techniques Using Bibliographic Information", *Journal of the ACM (JACM)*, vol. 10, Issue 4 (Oct. 1963), pp. 440-457.

Borkowski, C., "Structure, Effectiveness, and Uses of the Citation Identifier", *Proceedings of the 1969 Conference on Computational linguistics*, Association for Computational Linguistics, New Jersey (1969), pp. 1-22.

Jardine, N. and Van Rijsbergen, C.J., "The Use of Hierarchic Clustering in Information Retrieval", *Inform. Retr.*, vol. 7 (1971), pp. 217-240.

Choueka, Y. et al., "Full Text Document Retrieval: Hebrew Legal Texts (Report on the first phase of the response retrieval project)", ACM (1971), pp. 61-79.

Salton, G., "Automatic Indexing Using Bibliographic Citations", *Journal of Documentation*, vol. 27, No. 2 (Jun. 1971), pp. 98-110.

Attar, R. and Fraenkel, A.S., "Local Feedback in Full-Text Retrieval Systems", *Journal of the Association for Computing Machinery*, vol. 24, No. 3 (Jul. 1977), pp. 397-417.

Croft, W.B., "A Model of Cluster Searching Based on Classification", *Inform. Systems*, vol. 5 (1980), pp. 189-195.

Tapper, C., "An experiment with citation vectors", *Data Processing and the Law*, Colin Campbell Ed., London, Great Britain, (1984), pp. 90-109.

Fox, E.A., "Composite Document Extended Retrieval: An Overview", *Proceedings of the 8th Annual International ACM SIGIR Conference on Research and Development in Information Retrieval*, Montreal, Quebec, Canada, ACM (1985), pp. 42-53.

Salton, G. and Zhang, Y., "Enhancement of Text Representations Using Related Document Titles", *Information Processing & Management*, vol. 22, No. 5 (1986), pp. 385-394.

Salton, G. and Buckley, C., "On the Use of Spreading Activation Methods in Automatic Information Retrieval", *Proceedings of the 11th Annual International ACM SIGIR Conference on Research and Development in Information Retrieval*, Grenoble, France, ACM (1988), pp. 147-160.

Thompson, R.H. and Croft, W.B., "Support for browsing in an intelligent text retrieval system", *International Journal of Man-Machine Studies*, vol. 30, No. 6 (1989), pp. 639-668.

Croft, W.B. et al., "Retrieving Documents by Plausible Inference: An Experimental Study", *Information Processing & Management*, vol. 25, No. 6 (1989), pp. 599-614.

Crouch, C.J. et al., "The Automatic Generation of Extended Queries", *Proceedings of the 13th Annual International ACM SIGIR Conference on Research and Development in Information Retrieval*, Brussels, Belgium, ACM (1989), pp. 369-383.

Salton, G. et al., "Approaches to Text Retrieval for Structured Documents", TR 90-1083, Department of Computer Science, Cornell University, Ithaca, New York, (Jan. 1990), pp. 1-19.

Salton. G. et al., "Global Text Matching for Information Retrieval", *Science*, vol. 253, No. 5023 (Aug. 1991), pp. 1012-1015.

Gelbart, D. and Smith, J.C., "FLEXICON: An Evaluation of a Statistical Ranking Model Adapted to Intelligent Legal Text Management", *Proceedings of The 4th International Conference on Artificial Intelligence and Law*, Amsterdam, The Netherlands, ACM (1993), pp. 142-151.

Frei, H.P. and Stieger, D., "The Use of Semantic Links in Hypertext Information Retrieval", *Information Processing & Management*, vol. 31, No. 1 (1995), pp. 1-13.

Hawkins, D. et al., "Online Bibliographic Search Strategy Development", *Online*, (May 1892), pp. 12-19.

Bates, M.J., "The Design of Browsing and Berrypicking Techniques for the Online Research Interface", *Online Information Review*, vol. 13; Issue 5 (1993), 4 pages.

Saito, T., "A clustering method using the strength of citation", *Journal of Information Science*, vol. 16 (1990), pp. 175-181.

Chen, H. and Dhar, V., "Cognitive Process as a Basis for Intelligent Retrieval Systems Design", *Information Processing & Management*, vol. 27, No. 5 (1991), pp. 405-432.

Kando, N. et al., "Structure of Information Retrieval Research: Tracking the Specialties and Development of Research Using Co-citation Maps and Citation Diagrams", *Library and Information Science*, No. 29 (1991), pp. 39-65 [in Japanese with English abstract].

McLeod, K. et al., "A Neural Algorithm for Document Clustering", *Information Processing & Management*, vol. 27, No. 4 (1991), pp. 337-346.

Sasaki, M. et al., "Picture Coding for Digital Still Camera", *The Journal of Institute of Television Engineers of Japan*, vol. 46, No. 3, pp (1992), 300-307 [in Japanese with English abstract].

Schubert, A. et al., "Reference Standards for Citation Based Assessments", *Scientometrics*, vol. 26, No. 1 (1993), pp. 21-35.

Harter, S.P., "Colinked Descriptors: An Application of Bibliometrics to Interface Design", *Proceedings of the 56th ASIS Annual Meeting*, Columbus, Ohio, Oct. 24-28, 1993, vol. 30 (1993), pp. 131-134.

Rao, R. et al., "Rich Interaction in the Digital Library", *Communications of the ACM*, vol. 38, No. 4 (Apr. 1995), pp. 29-39.

Katz, L., "A New Status Index Derived from Sociometric Analysis", *Psychometrika*, vol. 18, No. 1 (Mar. 1953), pp. 39-43.

Garfield, E. et al., *The Use of Citation Data in Writing the History of Science*, Institute for Scientific Information Inc., Philadelphia, PA, 1964, pp. 1-60, 74-75.

Garner, R. et al., *Three Drexel Information Science Research Studies*, Barbara Flood, Ed., Drexel Press, Philadelphia, PA, 1967, 194 pages.

Price, N. and Schiminovich, S., "A Clustering Experiment: First Step Towards a Computer-Generated Classification Scheme", *Info. Stor. Retr.*, vol. 4 (1968), pp. 271-280.

Garfield, E., "Citation Indexing for Studying SCience", *Essays of an Information Scientist*, vol. 1 (1962-73), pp. 132, 156-174.

Garfield, E., "Citation Indexing for Studying Science", *Essays of an Information Scientist*, vol. 1 (1962-73), pp. 133-138.

Schiminovich, S., "Automatic Classification and Retrieval of Documents by Means of a Bibliographic Pattern Discovery Algorithm", *Inform. Stor. Retr.*, vol. 6 (1971), pp. 417-435.

Garfield, E., "Citation Analysis as a Tool in Journal Evaluation", *Science*, 1972, pp. 471-479.

Narin, F. et al., "Interrelationships of Scientific Journals", *Journal of the American Society for Information Science*, Sep.-Oct. 1972, vol. 23, No. 5 (1972), pp. 323-331.

Carpenter, M.P. and Narin, F., "Clustering of Scientific Journals", *Journal of the American Society for Information Science*, Nov.-Dec. 1973, vol. 24, No. 6 (1973), pp. 425-436.

Pinski, G. and Narin, F., "Citation Influence for Journal Aggregates of Scientific Publications: Theory, with Application to the Literature of Physics", *Information Processing & Management*, vol. 12 (1976), pp. 279-312.

(56) References Cited

OTHER PUBLICATIONS

White, H.D. and Griffith, B.C., "Author Cocitation: A Literature Measure of Intellectual Structure", *Journal of the American Society for Information Science*, vol. 32, No. 3 (May 1981), pp. 163-171.

Goldfarb, L., "Metric Data Models and Associate Search Strategies", *Summary of the Invited Talk Given at the Workshop on Foundations of Adaptive Information Processing*, Jun. 10-11, 1985, University of Regina, Saskatchewan, Canada, pp. 7-11.

Crouch, D.B., "The Visual Display of Information in an Information Retrieval Environment", *Proceedings of the 9th Annual International ACM SIGIR Conference on Research and Development in Information Retrieval*, Palazzo dei Congressi, Pisa, Italy , (1986), ACM, pp. 58-67.

Small, H. and Garfield, E., "The Geography of Science: Disciplinary and National Mappings", *Essays of an Information Scientist*, vol. 9 (1986), pp. 324-335.

Belew, R.K., "A connectionist approach to conceptual information retrieval", *Proceedings of the 1st International Conference on Artificial Intelligence and Law*, Boston, MA, 1987, ACM, 116-126.

Conklin, J., "Hypertext: An Introduction and Survey", *Computer*, Sep. 1987, pp. 17-41.

Schvaneveldt, R.W. et al., Pathfinder: *Networks from Proximity Data: Memoranda in Computer and Cognitive Science*, New Mexico State University, 1987, 40 pages.

Croft, W.B. and Thompson, R.H., "$I^3R$: A New Approach to the Design of Document Retrieval Systems", *Journal of the American Society for Information Science*, vol. 38, No. 6 (1987), pp. 389-404.

Larson, R.R., "Hypertext and Information Retrieval: Towards the Next Generation of Information Systems", *Proceedings of the $51^{st}$ ASIS Annual Meeting*, Atlanta GA, Oct. 23-27, 1988, vol. 25 (1988), pp. 195-199.

Schvaneveldt, R.W. et al., "Graph Theoretic Foundations of Pathfinder Networks", *Comp. Math. Applic.*, vol. 15, No. 4 (1988), pp. 337-345.

Valdez, F. and Glenn, B., "Browsing Models for Hypermedia Database", *Proceedings of the Human Factor Society, $32^{nd}$ Annual Meeting*, Anaheim, CA, Oct. 24-28, 1998, vol. 1 (1998), pp. 318-322.

Frisse, M.E., "Searching for Information in a Hypertext Medical Handbook", *Communications of the ACM*, vol. 31, No. 7 (Jul. 1988), pp. 880-886.

Rose, DE et al., "Legal Information Retrieval: A Hybrid Approach", *Proceedings of the 2nd International Conference on Artificial Intelligence and Law*, Vancouver, British Columbia, Canada, 1989, ACM, pp. 138-146.

Kommers, P., "Chapter 7: Graph Computation as an Orientation Device in Extended and Cyclic Hypertext Networks", *Designing Hypermedia for Learning*, David H. Jonassen and Heinz Mandl Ed., NATO ASI Series F, Computer and Systems Sciences, Springer-Verlag, London, UK (1990), pp. 117-134.

Botafogo, R.A. et al., "Identifying Aggregates in Hypertext Structures", *Proceedings of the Third Annual ACM Conference on Hypertext*, San Antonio, TX, 1991, ACM, pp. 63-74.

Hara, Y. et al., "Implementing Hypertext Database Relationships through Aggregations and Exceptions", *Proceedings of the Third Annual ACM Conference on Hypertext*, San Antonio, TX, ACM, 1991, pp. 75-90.

Garfield, E., "Contract Research Services at ISI-Citation Analysis for Governmental Industrial, and Academic Clients", *Essays*, vol. 15 (1992), pp. 75-83.

Callan, J.P. et al., "The INQUERY Retrieval System", *Proceedings of the Third International Conference on Database and Expert Systems Applications*, Sep. 1992, 9 pages.

Shimko, AH, "An Experiment with Semantics and Goffman's Indirect Method", *Infor. Stor. Retr.*, vol. 10 (1974), pp. 387-392.

Croft, WB et al., "An Evaluation of Goffman's Indirect Retrieval Method", *Information Processing & Management*, vol. 12 (1976), pp. 327-331.

Geller, N.L., "On the Citation Influence Methodology of Pinski and Narin", *Information Processing & Management*, vol. 14 (1978), pp. 93-95.

Bookstein, A., "Brief Communications: On the Perils of Boolean and Weighted Retrieval Systems", *Journal of the American Society for Information Science*, vol. 29, No. 3 (May 1978), pp. 1-158.

Garfield, Current Comments:—ISI's Online-Systems Makes Searching So Easy Even a Scientist Can Do It: Introducing METADEX Automatic Indexing & ISI/Biomed Search, *Essays of an Information Scientist*, vol. 5, No. 4 (Jan. 26, 1981), pp. 11-14.

Fox, EA, *Characterization of Two New Experimental Collections in Computer and Information Science Containing Textual and Bibliographic Concepts*, Department of Computer Science, Cornell University, Ithaca, New York (Sep. 1983), pp. 1-64.

Fox, EA, *Some Considerations for Implementing the SMART Information Retrieval System Under UNIX*, Department of Computer Science, Cornell University, Ithaca, New York (Sep. 1983), pp. 1-88.

Garfield, E., "Citation Indexes for Science: A New Dimension in Documentation through Association of Ideas", *Reprinted Essays of an Information Scientist*, vol. 6 (1983), pp. 468-471.

Bookstein, A., "Probability and Fuzzy-Set Application to Information Retrieval", *Annual Review of Information Science and Technology (ARIST)*, vol. 20 (1985), pp. 117-151.

Goffman, W., "A Pragmatic Approach to Literature Selection", *Selectivity in Information Systems*, Kenneth S. Warren Ed., Praeger Publishers 1985, New York, New York, pp. 117-143.

Meyer, Jr., CD et al., "Sensitivity of the Stationary Distribution Vector for an Ergodic Markov Chain", *Linear Algebra and Its Applications*, vol. 76 (1986), pp. 1-17.

Griffiths, A. et al., "Using Interdocument Similarity Information in Document Retrieval Systems", *Journal of the American Society for Information Science*, vol. 37, No. 1 (1986), pp. 3-11.

Garfield, E. et al., "The Geography of Science: Disciplinary and National Mappings", *Current Comments*, No. 43 (Oct. 27, 1986, pp. 324-335.

Doreian, P., "Measuring the Relative Standing of Disciplinary Journals", *Information Processing & Management*, vol. 24, No. 1 (1988). pp. 45-56.

Jones, WP, "Pictures of Relevance: A Geometric Analysis of Similarity Measures", *Journal of the American Society for Information Science*, vol. 38, No. 6 (1987), pp. 420-442.

Cleverdon, C., "Optimizing convenient online access to bibliographic databases", *Document Retrieval Systems vol. 3, The Foundation of Information Science*, Peter Willett Ed., Reprinted from *Information Services and Use*, vol. 4, (1984), pp. 37-47, Taylor Graham 1988, pp. 32-41.

Egghe, L., "Mathematical Relations Between Impact Factors and Average Number of Citations", *Information Processing & Management*, vol. 24, No. 5 (1988), pp. 567-576.

Salton, G. et al., "Term-Weighting Approaches in Automatic Text Retrieval", *Information Processing & Management*, vol. 24, No. 5 (1988), pp. 513-523.

Frisse, M., "From Text to Hypertext: Traditional tools like outlined processors already incorporate many of hypertext's lessons", *BYTE*, vol. 13, No. 10 (Oct. 1988), pp. 247-253.

Utting, K. et al., "Context and Orientation in Hypermedia Networks", *ACM Transactions on Information Systems*, vol. 7, No. 1 (Jan. 1989), pp. 58-84.

Thompson, R.H., "The Design and Implementation of an Intelligent Interface for Information Retrieval", A Dissertation Submitted for the Graduate School of the University of Massachusetts for the degree of Doctor of Philosophy, Feb. 1989, 228 pages.

Frisse, M.E. and Cousins, S.B., "Information Retrieval From Hypertext: Update on the Dynamic Medical Handbook Project", *Proceedings of ACM Hypertext*, Nov. 1989, pp. 199-212.

Deerwester, S. et al., "Indexing by Latent Semantic Analysis", *Journal of American Society for Information Science*, vol. 41, No. 6 (1990), pp. 391-407.

Paisley, W., "An Oasis Where Many Trails Cross: The Improbable Cocitation of a Multidiscipline", *Journal of the American Society for Information Science*, vol. 41, No. 6 (1990), pp. 459-468.

Salton, G. et al., "Improving Retrieval Performance by Relevance Feedback", *Journal of the American Society for Information Science*, vol. 41, No. 4 (1990), pp. 288-297.

Pausch, R. et al., "Node popularity as a hypertext browsing aid", *Electronic Publishing*, vol. 3, No. 4 (Nov. 1990), pp. 227-234.

(56) References Cited

OTHER PUBLICATIONS

Dumais, S.T., "Improving the retrieval of information from external sources", *Behavior Research Methods, Instruments, & Computers*, vol. 23, No. 2 (1991), pp. 229-236.
Seneta, E., "Sensitivity Analysis, Ergodicity Coefficients, and Rank-One Updates for Finite Markov Chains", *Probability: Pure and Applied—A Series of Textbooks and Reference Books/8*, William J. Stewart Ed., 1991, Marcel Dekker, Inc., New York, New York.
Fox, EA et al., "Integrating Search and Retrieval with Hypertext", *Hypertext/Hypermedia Handbook*, Emily Berk and Joseph Devlin Ed., 1991, Armadillo Associates, New York New York, pp. 329-355.
Shaw, Jr., WM, "Subject and Citation Indexing. Part I: The Clustering Structure of Composite Representations in the Cystic Fibrosis Document Collection", *Journal of the American Society for Information Science*, vol. 42, No. 9 (1991), pp. 669-675.
Shaw, Jr., W.M., "Subject and Citation Indexing. Part II: The Optimal Cluster-Based Retrieval Performance of Composite Representations", *Journal of the American Society for Information Science*, vol. 42, No. 9 (1991), pp. 676-684.
Turtle, H. and Croft WB, "Evaluation of an Inference Network-Based Retrieval Model", *ACM Transactions on Information Systems*, vol. 9, No. 3 Jul. 1991, pp. 187-222.
Wais, *SIGBIO Newsletter*, vol. 12, No. 3 (Sep. 1992), pp. 21-28.
Turtle, H. et al., "A Comparison of Text Retrieval Models", *The Computer Journal*, vol. 35, No. 3 (1992), pp. 279-290.
Croft, W.B. et al., "Text Retrieval and Inference", *Text-Based Intelligent Systems: Current Research and Practice in Information Extraction and Retrieval*, Paul S. Jacobs Ed., Lawrence Erlbaum Associates, Hillsdale, New Jersey, (1992), pp. 127-155.
Larson, R.R., "Evaluation of Advanced Retrieval Techniques in an Experimental Online Catalog", *Journal of the American Society for Information Science*, vol. 43, No. 1 (1992), pp. 34-53.
Pao, M.L., "Perusing the Literature via Citation Links", *Computers and Biomedical Research*, vol. 26 (1993), pp. 143-156.
Harman, D., "Relevance Feedback Revisited", Proceedings of the 15th Annual International ACM SIGIR Conference on Research and Development in Information Retrieval, Copenhagen, Denmark, ACM, (1992), pp. 1-10.
Shalini, R., "'Citation Profiles' to Improve Relevance in a Two-Stage Retrieval System: A Proposal", *Information Processing & Management*, vol. 29, No. 4 (1993), pp. 463-470.
Betrabet, S., "A Query Language for Information Graphs", Master of Science Thesis, Virginia Polytechnic Institute and State University, Blacksburg, VA, (1993), 115 pages.
Brueni, D.J. et al., "What If Three Were Desktop Access to the Computer Science Literature?", Proceedings of the 1993 ACM Conference on Computer Science, Indianapolis, Indiana, ACM, 1993, pp. 15-22.
Croft, B. and Turtle, H.R., "Retrieval Strategies for Hypertext", *Information Processing & Management*, vol. 29, No. 3 (1993), pp. 313-324.
Fox, E. et al., "Users, Interfaces, and Objects: Envision , a Digital Library", *Journal of the American Society for Information Science*, vol. 44, No. 8 (1993), pp. 480-491.
Barrett, R. et al., *Templates for the Solution of Linear Systems: Building Blocks for Iterative Methods*, SIAM, Philadelphia, Pennsylvania, 1993, 125 pages.
Doreian, P., "A Measure of Standing for Citation Networks within a Wider Environment", *Information Processing & Management*, vol. 30, No. 1 (1994), pp. 21-31.
Gey, F.C., "Inferring Probability of Relevance Using the Method of Logistic Regression", Proceedings of the ACM-SIGIR '94 Conference, Dublin, Ireland, (Jul. 1994), pp. 222-231.
Conrad, J.G. and Utt, M.H., "A System for Discovering Relationships by Feature Extraction from Text Databases", *Proceedings of the 17th ACM-SIGIR Conference*, 1994, pp. 260-270.
Garfield, E., "The Concept of Citation Indexing: A Unique and Innovative Tool for Navigating the Research Literature", [online], 1994, [retrieved on Feb. 19, 2008]. Retrieved from the Internet: <URL: http://scientific.thomson.com/free/essays/citationindexing/concept>. 4 pages.
Joachims, T. et al., "WebWatcher: Machine Learning and Hypertext", School of Computer Science, Carnegie Mellon University, May 29, 1995, 5 pages.
Berry, M. et al., "Using Linear Algebra for Intelligent Information Retrieval", *SIAM Review*, vol. 37, No. 4 (Dec. 1995), pp. 573-595.
Libertech, Inc., *V-Search™ Integration Toolkit for Folio VIEWS, Beta Release 2.0 User's Manual, Preliminary Draft*, Dec. 6, 1995, 79 pages.
Kleinberg, J.M., "Authoritative Sources in a Hyperlinked Environment", *Proceedings of the Ninth Annual ACM-SIAM Symposium on Discrete Algorithms*, Association for Computer Machinery, New York, NY, 1998, pp. 668-677 (Preliminary version) and *Journal of the ACM (JACM)*, vol. 46, No. 5 (Sep. 1999), pp. 1-33.
Leuski, A. et al., "The Best of Both Worlds: Combining Ranked List and Clustering", *CIIR Technical Report IR-172*, 1999, pp. 1-11.
de Solla Price, D.J., "Networks of Scientific Papers", *Science*, vol. 149, No. 3683 (Jul. 30, 1965), pp. 510-515.
Salton, G., *Automatic Information Organization and Retrieval*, McGraw-Hill Text, 1968, 536 pages.
Salton, G., *Automatic Content Analysis: Part 1 of Scientific Report No. ISR-18: Information Storage and Retrieval to The National Science Foundation and to The National Library of Medicine*, Cornell University, Ithaca New York, Oct. 1970, 170 pages.
Wong, S.K.M., et al., "On Modeling of Information Retrieval Concepts in Vector Spaces", *ACM Transactions on Database Systems*, vol. 12m, No. 2 (Jun. 1987), pp. 299-321.
Fox, EA et al., "Coefficient for Combining Concept Classes in a Collection", *ACM*, (1988), pp. 291-307.
Gey, F. et al., "Comparing Vector Space Retrieval with the RUBRIC Expert System", *SIGIR Forum*, ACM Press, vol. 23, No. 1-2 (Dec. 1988), pp. 5-15.
Keen, E.M., "Some aspects of proximity searching in text retrieval systems", *Journal of Information Science*, vol. 18 (1992), pp. 89-98.
Croft, W.B. and Turtle, H., "A Retrieval Model for Incorporating Hypertext Links", *Proceedings of the Second Annual ACM Conference on Hypertext*, Pittsburgh, PA, ACM, (Nov. 1989), pp. 213-224.
Crouch, D.B. et al., "The Use of Cluster Hierarchies in Hypertext Information Retrieval", *Proceedings of the Second Annual ACM Conference on Hypertext*, Pittsburgh, PA, ACM, (Nov. 1989), pp. 225-237.
Li, T. and Gey, F., "X-Window Interface to SMART, an Advanced Text Retrieval System", *SIGIR Forum*, ACM Press, vol. 26, No. 1 (1992), pp. 5-16.
Salton, G. and Buckley, C., "Automatic Text Structuring and Retrieval—Experiments in Automatic Encyclopedia Searching", *Proceedings of the 14th Annual International ACM SIGIR Conference on Research and Development in Information Retrieval*, Chicago, IL, ACM, (1991), pp. 21-30.
Savoy, J. et al., "Information retrieval in hypertext systems: an approach using Bayesian networks", *Electronic Publishing*, vol. 4, No. 2 (Jun. 1991), pp. 87-108.
Frei, H.P. et al., "Making Use of Hypertext Links when Retrieving Information", *Proceedings of the ACM ECHT Conference*, Milano, Italy, Nov. 30-Dec. 4, 1992, ACM, 1992, pp. 102-111.
Salton, G. et al., "Automatic structuring of text files", *Electronic Publishing*, vol. 5, No. 1 (Mar. 1992), pp. 1-17.
Savoy, J., "Bayesian Inference Networks and Spreading Activation in Hypertext Systems", *Information Processing & Management*, vol. 28, No. 3 (1992), pp. 389-406.
Salton, G. and Allan, J., "Selective Text Utilization and Text Traversal", *Hypertext '93 Proceedings*, ACM (Nov. 1993), pp. 1-14.
Gravano, L. et al., "The Effectiveness of *GlOSS* for the Text Database Discovery Problem", *Proceedings of the 1994 ACM SIGMOD International Conference on Management of Data*, May 24-27, 1994, Minneapolis, Minnesota, ACM (1994), pp. 126-137.
Pinkerton, B., "Finding What People Want: Experiences with the WebCrawler", Original WebCrawler paper, published and presented at the Second International WWW Conference in 1994, [online],

(56) References Cited

OTHER PUBLICATIONS

1994 [retrieved on Jan. 14, 2008]. Retrieved from the Internet: <URL: http://thinkpink.com/bp/webcrawler/www94.html>, 10 pages.
Weiss, R. et al., "HyPursuit: A Hierarchical network Search Engine that Exploits Content-Link Hypertext Clustering", *Proceedings of the Seventh ACM Conference on Hypertext*, Bethesda, MD, Mar. 16-20, 1996, ACM, pp. 180-193.
Boyan, J. et al., "A Machine Learning Architecture for Optimizing Web Search Engines", AAAI Workshop on 'Internet-based Information Systems, Portland, Oregon, 1996, pp. 1-8.
Brin, S. et al., "The Anatomy of a Large-Scale Hypertextual Web Search Engine", *Proceedings of the Seventh International Conference on World Wide Web*, Apr. 1998, Brisbane, Australia, p. 107-117.
Lindsey, CR et al., "An Empirical Analysis of Retailer Participation Decisions in a Downtown Parking Coupon Program", *Journal of Regional Science*, vol. 38, No. 1 (1998), pp. 1-22.
Lucarella, D. et al., "Information Retrieval From Hypertext: An Approach Using Plausible Inference", *Information Processing & Management*, vol. 29, No. 3 (1993), pp. 299-312.
Mani, I. et al., "Summarizing Similarities and Differences Among Related Documents", *Information Retrieval*, vol. 1 (1999), pp. 35-67.
Melucci, M., "An Evaluation of Automatically Constructed Hypertexts for Information Retrieval", *Information Retrieval*, vol. 1 (1999), pp. 91-114.
Truran, M. et al., "Autonomous Authoring Tools for Hypertext", *ACM Computing Surveys*, vol. 39, No. 3, Article 8 (Aug. 2007), 30 pages.
Agosti, M. et al., "Automatic authoring and construction of hypermedia for information retrieval", *Multimedia Systems*, vol. 3 (1995), pp. 15-24.
Korfhage, R., "Book Reviews: Information Storage and Retrieval Systems", John Wiley and Sons, 1997, 2 pages.
Salton, G., "A Blueprint for Automatic Boolean Query Processing", *Proceedings of the SIGIR Session at the ACM '82 Conference*, Dallas, TX, Oct. 16, 1983, pp. 6-24.
Salton, G., "Gerard Salton Publications", *ACM SIGIR Forum Archive*, vol. 31, Issue 1 (1997), pp. 43-56.
Faloutsos, C., "Access Methods for Text", *Computing Surveys*, vol. 17, No. 1 (Mar. 1985), pp. 49-74.
Salton, G. et al., "Automatic Text Decomposition Using Text Segments and Text Themes", *Hypertext '96*, Washington DC, ACM, 1996, pp. 53-65.
Salton, G. et al., "Automatic Assignment of Soft Boolean Operators", ACM, 1985, pp. 54-69.
Lee, D.L. et al., "Document Ranking and the Vector-Space Model", *IEEE*, Mar./Apr. 1997, pp. 67-75.
Giles, C.L. et al., "CiteSeer: An Automatic Citation Indexing System", ACM (1998), pp. 89-98.
Salton, G. et al., "Automatic Structuring and Retrieval of Large Text Files", *Communication of the ACM*, vol. 34, No. 2 (Feb. 1994), pp. 97-108.
Korfhage, R.R. et al., "A Cautionary Tale", *ACM SIGIR Forum*, vol. 25, Issue 2 (Fall 1991), pp. 104-105.
Korfhage, R.R., "Query Enhancement by User Profile", Proceedings of the 7th Annual International ACM SIGIR Conference on Research and Development in Information Retrieval, Cambridge, England, ACM (1984), pp. 111-121.
Can and Ozkarahan, "A Clustering Scheme", Proceedings of the 6th Annual International ACM SIGIR Conference on Research and Development in Information Retrieval, Bethesda, MD, Session: Session 6: Statistical Techniques 2, 1983, ACM, pp. 115-121.
Salton, G., "On the Representation of Query Term Relations by Soft Boolean Operators", *Proceedings of the Second Conference on European Chapter of the Association for Computational Linguistics*, Geneva, Switzerland, 1985, pp. 116-122.
Can, F. and Ozkarahan, E.A., "A Dynamic Cluster Maintenance System for Information Retrieval", *Proceedings of the 10th Annual International ACM SIGIR Conference on Research and Development in Information Retrieval*, New Orleans, LA, ACM, 1987, pp. 123-131.
Kellogg, R.B. et al., "Text to Hypertext: Can Clustering Solve the Problem in Digital Libraries?", ACM, 1996, pp. 144-150.
Kleinberg, J. et al., "Applications of linear algebra in information retrieval and hypertext analysis", *Proceedings of the Eighteenth ACM SIGMOD-SIGACT-SIGART Symposium on Principles of Database Systems*, Philadelphia, PA, ACM, 1999, pp. 185-193.
Can, F. et al., "Concepts of the Cover Coefficient-Based Clustering Methodology", ACM, 1985, pp. 204-211.
Gibson, D. et al., "Clustering categorical data: an approach based on dynamical systems", *The VLDB Journal*, vol. 8 (2000), pp. 222-236.
Hemmje, M. et al., "LyberWorld—A Visualization User Interface Supporting Fulltext Retrieval", *Proceedings of the 17th Annual International ACM SIGIR Conference on Research and Development in Information Retrieval*, Dublin, Ireland, ACM, (1994), pp. 249-259.
Salton, G., "The Use of Extended Boolean Logic in Information Retrieval", ACM, 1984, pp. 277-285.
Can, F. et al., "Concepts and Effectiveness of the Cover-Coefficient-Based Clustering Methodology for Text Databases", *ACM Transactions on Database Systems*, vol. 15, No. 4 (Dec. 1990), pp. 483-517.
Can, F. et al., "HypIR: A Hypertext-based Approach to Information Retrieval", ACM, 1993, pp. 729-736.
Agosti, M. et al., "A Methodology for the Automatic Construction of a Hypertext for Information Retrieval", ACM, 1993, pp. 745-753.
Korfhage, RR, "Information Retrieval: A Note on a Relevance Estimate and Its Improvement", *Communications of the ACM*, vol. 11, No. 11 (Nov. 1968), p. 756.
Salton, G. et al., "Extended Boolean Information Retrieval", *Communications of the ACM*, vol. 26, No. 12 (Dec. 1983), pp. 1022-1036.
Raghavan, VV et al., "A Critical Analysis of Vector Space Model for Information Retrieval", *Journal of the American Society for Information Science*, vol. 37, No. 5 (1986), pp. 279-287.
Buckley, C., "Implementation of the SMART Information Retrieval System", Technical Report 85-686, Department of Computer Science, Cornell University, Ithaca, New York, May 1985.
Buckley, Chris & Thieberger Ed, *SMART Programmers Manual*, Jun. 3, 1985, 17 pages.
Fox, EA, "Implementing SMART for Minicomputers Via Relational Processing with Abstract Data Types", *Proceedings of the 1981 ACM SIGSMALL Symposium on Small Systems and SIGMOD Workshop on Small Database Systems*, Orlando, FL, Oct. 13-15, 1981, p. 119-129.
Fritsche, M., *Automatic Clustering Techniques in Information Retrieval*, Luxembourg: Commission of the European Communities, (1974), 142 pages.
Gloor, PA, "CYBERMAP Yet Another Way of Navigating in Hyperspace", *Hypertext '91 Proceedings*, ACM, Dec. 1991, pp. 107-121.
Kessler, MM, "The MIT: Technical Information Project", *Physics Today*, (Mar. 1965), pp. 28-36.
McNeill, JW et al., *Bibliographic Data as an Aid to Document Retrieval*, Scientific Report No. ISR-16 to the National Science Foundation, Section III. Cornell University, Sep. 1969, 15 pages.
Parunak, HVD, "Don't Link Me In: Set Based Hypermedia for Taxonomic Reasoning", *Hypertext '91 Proceedings*, ACM, Dec. 1991, pp. 233-242.
Salton, G. et al., *On the Automatic Generation of Content Links in Hypertext*, Technical Report: TR 89-993, Department of Computer Science, Cornell University, Ithaca, NY, (Apr. 1898), 15 pages.
Skriptor, F., Citation Index and Measures of Association in Mechanized Document Retrieval, Rapport Nr 2 (Report No. 2), Stockholm, Sweden, 1967, 14 pages.
Buckley, Chris & Thieberger Ed, *SMART Programmers Manual*, Jun. 3, 1985, 29 pages.
Brown, P.J., "Linking and searching within hypertext", *Electronic Publishing*, vol. 1, No. 1 (Apr. 1988), pp. 45-53.
Griffith, BC, et al., "The Structure of Scientific Literatures II: Toward a Macro- and Microstructure for Science", *Science Studies*, vol. 4 (1974), pp. 339-365.

(56) References Cited

OTHER PUBLICATIONS

Kessler, M.M., "An Experimental Study of Bibliographic Coupling Between Technical Papers", *IEEE Transactions on Information Theory*, (Jan. 1963), pp. 49-51.
Botafogo, R.A., "Cluster Analysis for Hypertext Systems", *ACM SIGIR '93*, Pittsburg. Pennsylvania, ACM, 1993, pp. 116-125.
Kambayashi, Y. et al., "Dynamic Clustering Procedures for Bibliographic Data", *ACM SIGIR Forum Archive*, vol. 16, Issue 1, (1981), pp. 90-99.
Pao, M.L., "Term and Citation Retrieval: A Field Study", *Information Processing & Management*, vol. 29, No. 1 (1993), pp. 95-112.
Pao, M.L. and Worthen, D.B., "Retrieval Effectiveness by Semantic and Citation Searching", *Journal of the American Society for Information Science*, vol. 40, No. 4 (1989), pp. 226-235.
Salton, G. et al., *Automatic Text Theme Generation and the Analysis of Text Structure*, Technical Report 94/1438, Department of Computer Science, Cornell University, Ithaca, NY, Jul. 1994, 28 pages.
Salton, G. et al., *Text Linking and Retrieval Experiments for Textbook Components*, Technical Report 90-1125, Department of Computer Science, Cornell University, Ithaca, NY, May 1990, 13 pages.
Schatz, BR et al., "NCSA Mosaic and the World Wide Web: Global Hypermedia Protocols for the Internet", *Science*, vol. 265 (Aug. 12, 1994), pp. 895-901.
Thurstone, L.L., *The Vectors of Mind*, University of Chicago, Chicago, IL, 1935, 281 pages (whole document).
Xhignesse, L.V. and Osgood, C.E., "Bibliographical Citation Characteristics of the Psychological Journal Network in 1950 and in 1960", *American Psychologist*, vol. 22 (1967), pp. 778-791.
Minsky, M. and Papert, S., *Perceptrons: An Introduction to Computational Geometry*, Massachusetts Institute of Technology, 1969, pp. 188-227.
Brachman, R.J. and McGuinness, D.L., "Knowledge Representation, Connectionism, and Conceptual Retrieval", *Proceedings of the 11th Annual International ACM SIGIR Conference on Research and Development in Information Retrieval*, May 1988, Grenoble, France, pp. 161-174.
Cove, J.F. and Walsh, B.C., "Online Text Retrieval via Browsing", *Information Processing & Management*, vol. 24, No. 1 (1988), pp. 31-37.
Fox, E.A. and Koll, M.B., "Practical Enhanced Boolean Retrieval: Experiences with the Smart and Sire Systems", *Information Processing & Management*, vol. 24, No. 3 (1988), pp. 257-267.
Wellman, B., Ed., *Connections*, vol. XI, No. 1 (1988), 87 pages, ISBN 0226-1776.
Crochet, Y. and Paget, G., "ZZENN (Zig Zag Epigenetic Neural Networks), a New Approach to Connectionist Machine Learning", *Proceedings of the International Computer Science Conference '88, Artificial Intelligence: Theory and Applications*, Dec. 19-21, 1988, Hong Kong, IEEE, pp. 377-380.
Wasserman, S. et al., "Correspondence and Canonical Analysis of Relational Data", *Journal of Mathematical Sociology*, vol. 1. No. 1 (1989), pp. 11-64.
Berners-Lee, T. and McCahill, M., "Uniform Resource Locators (URL)", Dec. 1994, 21 pages.
Smeaton, A.F. and Morrissey, P.J., "Experiments on the Automatic Construction of Hypertext from Texts", *The New Review of Hypermedia and Multimedia: Applications and Research*, vol. 1, 1995, 17 pages.
Yan, T.W. and Garcia-Molina, H., "SIFT—A Tool for Wide-Area Information Dissemination", *Proceeding of the 1995 USENIX Technical Conference*, New Orleans, LA, Jan. 16-20, 1995, pp. 177-186.
Yuwono, B., et al., "A World Wide Web Resource Discovery System", Proceedings of the Fourth International World-Wide Conference, Darmstadt, Germany, Apr. 1995 [online], 1995 [retrieved on Jul. 5, 2006]. Retrieved from the Internet: <URL: http://www.w3.org/Conferences/WWW4/Papers/66/>, 17 pages.
Bowman, C.M. et al., "Harvest: A Scalable, Customizable, Discovery and Access System", Technical Report CU-Cs-732-94, Department of Computer Science, University of Colorado, Boulder, CO, Aug. 1994, revised Mar. 1995, pp. 1-29.
Heath, L.S. et al., "Envision: A User-Centered Database of Computer Science Literature", *Communications of the ACM*, vol. 38, No. 4 (Apr. 1995), pp. 52-53.
Dubin, D., "Document Analysis for Visualization", *Proceedings of the 18th Annual International ACM SIGIR Conference on Research and Development in Information Retrieval*, Seattle, WA, 1995, ACM, New York, NY, pp. 199-204.
Wood, A. et al., "HyperSpace: A World-Wide Web Visualiser and its Implications for Collaborative Browsing and Software Agents", *Proceedings of the Third International World-Wide Web Conference*, Apr. 1995, 11 pages.
Hendley, R.J. et al., "Narcissus: Visualising Information", Paper presented at the Information Visualization '95 Symposium, Atlanta, GA, IEEE, pp. 90-96 (7 pages).
Berners-Lee, T., and Connelly, D., "Hypertext Markup Language—2.0", Nov. 1995, 65 pages.
Aimar, A. et al., "WebLinker: a tool for managing Www cross-reference", *Proceedings of Second International WWW Conference*, Chicago, IL, Oct. 17-20, 1994, pp. 773-784.
Hawking, D. and Thistlewaite, P., "Proximity Operators—So Near and Yet So Far", *Proceedings of Fourth Text REtrieval Conference (TREC-4)*, 1995, 13 pages.
Baeza-Yates, R., "Visualization of Large Answers in Text Databases", *Proceedings of the Workshop on Advanced Visual Interfaces*, Gubbio, Italy , Session: Interfaces to Databases, 1996, ACM, New York, NY, pp. 101-107.
Carriere, J. and Kazman, R., "WebQuery: Searching and Visualizing the Web through Connectivity", *Selected papers from the Sixth International Conference on World Wide Web*, Santa Clara, CA, Sep. 1997, [online], 1997 [retrieved on Nov. 23, 1999]. Retrieved from the Internet: <URL: http://www.scope.gmd.de/info/www6/technical/paper096/paper96.html>, 14 pages.
Chiaramella, Y. and Kheirbek, A., "An Integrated Model for Hypermedia and Information Retrieval", *Information Retrieval and Hypertext*, Maristella Agosti and Alan F. Smeaton, Eds, Kluwer Academic Publishers, Norwell, MA, 1996, pp. 139-178.
Hearst, M.A. and Pedersen, J.O., "Reexamining the Cluster Hypothesis: Scatter/Gather on Retrieval Results", *Proceedings of the 19th Annual International ACM SIGIR Conference on Research and Development in Information Retrieval*, Zurich, Switzerland, ACM, 1996, pp. 76-84.
Kurlander, D. et al., "Comic Chat", *Proceedings of the 23rd Annual Conference on Computer Graphics and Interactive Techniques*, ACM, 1996, pp. 225-236.
Rissland, E.L. et al., "BankXX: Supporting Legal Arguments through Heuristic Retrieval", *Artificial Intelligence and Law*, vol. 4 (1996), pp. 1-71.
Savoy, J., "Citation Schemes in Hypertext Information Retrieval", *Information Retrieval and Hypertext*, Maristella Agosti and Alan F. Smeaton, Eds, Kluwer Academic Publishers, Norwell, MA, 1996, pp. 99-120.
Wolf, W. et al., "A Digital Video Library on the World Wide Web", *Proceedings of the Fourth ACM International Conference on Multimedia*, Boston, MA, Nov. 18-22, 1996, pp. 433-434.
Yuwono, B and Lee, D.L., "Search and Ranking Algorithms for Locating Resources on the World Wide Web", *IEEE*, 1996, pp. 164-171.
NetCarta, WebMap, "A Trip to Hawaii with CyberPilot Pro", Feb. 1996, NetCarta Corporation, 30 pages.
Berners-Lee, T. et al., "Hypertext Transfer Protocol—HTTP/1.0", May 1996, 60 pages.
Bray, T., "Measuring the Web", Open Text Corporation, Vancouver, B.C., Canada, 1996, 18 pages.
Ramer, A. and Yu, H., "Similarity, Probability and Database Organisation: Extended Abstract", *IEEE*, 1996, pp. 272-277.
Wang, Z. and Crowcroft, J., "Prefetching in World Wide Web", *IEEE*, 1996, pp. 28-32.
Singh, A. and Lidsky, D., "All-Out-Search", *PC Magazine*, vol. 15, No. 22 (Dec. 3, 1996), pp. 213-249.
Arocena, G.O. et al., "Applications of a Web query language", *Computer Networks and ISDN Systems*, vol. 29 (1997), pp. 1305-1316.
Catarci, T. et al., "Graphical interaction with heterogeneous databases", *The VLDB Journal*, vol. 6 (1997), pp. 97-120.

(56) References Cited

OTHER PUBLICATIONS

Marchiori, M., "The quest for correct information on the Web: hyper search engines", *Computer Networks and ISDN Systems*, vol. 29 (1997), pp. 1225-1235.

Veerasamy, A and Heikes, R., "Effectiveness of a graphical display of retrieval results", *Proceedings of the 20th Annual International ACM SIGIR Conference on Research and Development in Information Retrieval*, Philadelphia, PA, 1997, ACM, pp. 236-245.

Cunha, C.R. and Jaccoud, C.F.B., "Determining WWW User's Next Access and Its Application to Pre-fetching", *IEEE*, 1997, pp. 6-11.

Chakrabarti, S. et al., "Automatic resource compilation by analyzing hyperlink structure and associated text", *Computer Networks and ISDN Systems*, vol. 30 (1998), pp. 65-74.

Lagoze, C. et al., "Making Global Digital Libraries Work: Collection Services, Connectivity Regions, and Collection Views", *Proceedings of the Third ACM Conference on Digital Libraries*, Pittsburgh, PA, 1998, ACM, pp. 134-143.

Panko, R., Lessons from the First Hypertext Digital Library, The NLS Augment Journal System, A Hypertext Management of System (HMS), *Proceedings of the Thirty-First Annual Hawaii International Conference on System Sciences*—vol. 2, IEEE Computer Society, 1998, pp. 168-172.

Chalmers, M. et al, "The Order of Things: Activity-Centered Information Access", *Proceedings of the 7th International Conference on the World Wide Web*, Brisbane, Australia, Apr. 1998, pp. 359-367.

Blake, M. and Van de Sompel, H., "Just-in-case linking vs. Just-in-time-linking—the Library Without Walls experience", *Proceedings of the Fourth ACM Conference on Digital Libraries*, Berkeley, CA, 1999, ACM, pp. 217-218.

Henzinger, M.R. et al., "Measuring Index Quality using Random Walks on the Web", *Proceeding of the Eighth International Conference on World Wide Web*, May 1999, Toronto, Canada, Elsevier North-Holland, Inc., New York, NY, 1999, 16 pages.

The Clever Project (Chakrabarti, S. et al.), "Hypersearching the Web", *Scientific American*, Jun. 1999, pp. 54-60.

Lim, S-J and Ng, Y-K, "WebView: A Tool for Retrieving Internal Structures and Extracting Information from HTML Documents", *Proceedings of the Sixth International Conference on Database Systems for Advanced Applications*, IEEE Computer Society, Washington, DC, 1999, pp. 71-80.

Garfield, E. et al., "Algorithm Citation-Linked Historiography—Mapping the Literature of Science", Presentation at the ASIS & T 2002: Information, Connections and Community, 65th Annual Meeting of ASIST in Philadelphia, PA, Nov. 18-21, 2002, 19 pages.

Berkhin, P., "A Survey on PageRank Computing", *Internet Mathematics*, vol. 2, No. 1 (2005), pp. 73-120.

Newcomb, S.R. et al., The 'HyTime' Hypermedia/Time-based Document Structuring Language, *Communication of the ACM*, vol. 34, No. 11 (Nov. 1991), pp. 67-83.

Boyle, C., "To link or not to link: An empirical comparison of Hypertext linking strategies", *Proceedings of the 10th Annual International Conference on Systems Documentation*, Ottawa, Ontario, Canada, 1992, ACM, pp. 221-231.

Emtage, A., "Archie—An Electronic Directory Service for the Internet", *Proceedings of the Winter 1992 USENIX Conference*, San Francisco, CA, Jan. 20-24, 1992, USENIX, pp. 93-110.

Keim, D.A. and Lum, V., "Visual Query Specification in a Multimedia Database System", *Proceedings of the 3rd Conference on Visualization '92*, Boston, MA, Session: Visual Programming, 1992, pp. 194-201.

Lin, X., "Visualization for the Document Space", *Proceedings of the 3rd Conference on Visualization '92*, Boston, MA, Sesssion: Visualization Techniques, 1992, pp. 274-281.

Cutting, D.R., et al., "Scatter/Gather: A Cluster-based Approach to Browsing Large Document Collections", *Proceedings of the 15th Annual International ACM SIGIR Conference on Research and Development in Information Retrieval*, Copenhagen, Denmark, 1992, ACM, pp. 318-329.

Miceli, K.D., *A Framework for the Design of Effective Graphics for Scientific Visualization*, Report RNR-92-035, Doctoral dissertation proposal presented to Department of Computer Science, University of Colorado, Boulder, CO, Nov. 20, 1992, 32 pages.

Pinkerton, B., "Finding What People Want: Experiences with the WebCrawler,", *Proceedings of the Second International World Wide Web Conference*, Elsevier Science, 1994, pp. 821-829.

Braden, R., Ed., "Requirement for Internet Hosts—Application and Support", Internet Engineering Task Force, Oct. 1989, 87 pages.

Ashley, K.D., *Modeling Legal Argument: Reasoning with cases and Hypotheticals*, Massachusetts Institute of Technology, Boston, MA, 1990, 331 pages.

Doszkocs, T.E. et al., "Connectionist Models and Information Retrieval", *Annual Review of Information Science and Technology (ARTIST)*, vol. 25 (1990), pp. 209-260.

Prawel, D.A., "Real-World Applications of Visualization Solutions", *Proceedings of the First IEEE Conference on Visualization '90*, San Francisco, CA, Oct. 23-26, 1990, IEEE, pp. 440-442.

Turtle, H. and Croft, W.B., "Inference Networks for Document Retrieval", *Proceedings of the 13th Annual International ACM SIGIR Conference on Research and Development in Information Retrieval*, Sep. 5-7, 1990, Brussels, Belgium, ACM, pp. 1-24.

Agosti, M. et al., "A Two-Level Hypertext Retrieval Model for Legal Data", *Proceedings of the 14th Annual International ACM SIGIR Conference on Research and Development in Information Retrieval*, Oct. 13-16, 1991, Chicago, IL, ACM, pp. 316-325.

Al-Hawamdeh, S. and Loke, C.J.C., "Compound Document Processing System", *Proceedings of the Fifteenth International Computer Software and Applications Conference*, Tokyo, Sep. 1991, pp. 640-644.

Alpern, B. and Carter, L., "The Hyperbox", *Proceedings of the 2nd Conference on Visualization '91*, San Diego, CA, Session: Techniques and methodologies, 1991, IEEE, pp. 133-139.

Blattner, M.M. et al., "Multimedia Environments for Scientists", *Proceedings of the 2nd Conference on Visualization '91*, Oct. 22-25, 1991, San Diego, CA, Panel Session: Panels, IEEE, pp. 348-353.

Burnetti, J. et al., "Visualizing Environmental Data for Program Decision Support", *Proceedings of the 2nd Conference on Visualization '91*, San Diego, CA, Session: Case studies 1991, IEEE, pp. 398-404.

Fowler, R.H. et al, "Integrating Query, Thesaurus, and Documents through a Common Visual Representation", *Proceedings of the 14th Annual International ACM SIGIR Conference on Research and Development in Information Retrieval*, Chicago, IL, 1991, ACM, pp. 142-151.

Gelbart, D. and Smith, J.C., "Beyond Boolean Search: FLEXICON, A Legal Text-Based Intelligent System", *Proceedings of the 3rd International Conference on Artificial Intelligence and Law*, Oxford, England, 1991, ACM, pp. 225-234.

Kochhar, S. et al., "Cooperative, Computer-Aided Design of Scientific Visualization", *Proceedings of the 2nd Conference on Visualization '91*, San Diego, CA, Session: Visualization paradigms and structures, 1991, IEEE, pp. 306-313.

Levkowitz, H., "Color Icons: Merging Color and Texture Perception for Integrated Visualization of Multiple Parameters", *Proceedings of the 2nd Conference on Visualization '91*, San Diego, CA, Session: Multivariate, 1991, IEEE, pp. 164-178.

Mihalisin, T. et al., "Visualization and Analysis of Multi-variate Data: A Technique for All Fields", *Proceedings of the 2nd Conference on Visualization '91*, Oct. 22-25, 1991, San Diego, CA, 1991, IEEE, pp. 171-178.

Lelu, A. and Francois, C., "Hypertext paradigm in the field of information retrieval: a neural approach", ECHT '92, *Proceedings of the 4th ACM Conference on Hypertext*, New York, NY, 1992, ACM, pp. 112-120.

Tufte, E.R., "Statistical Graphics and Self-Publishing", *CC/Social & Behavioral Sciences*, No. 50 (Dec. 14, 1992), p. 8.

Maes, P. and Kozierok, R., "Learning Interface Agents", *Proceedings of the Eleventh National Conference on Artificial Intelligence, American Association for Artificial Intelligence*, Menlo Park, CA, 1993, pp. 459-465.

Obraczka, K. et al., "Internet Resource Discovery Services", *IEEE Computer*, 1993, pp. 8-22.

O'Day, V. and Jeffries, R., "Orienteering in an Information Landscape: How Information Seekers Get From Here to There", *Proceed-*

(56) References Cited

OTHER PUBLICATIONS ings of the INTERCHI '93 Conference on Human Factors in Computing Systems, Amsterdam, The Netherlands, Apr. 24-29, 1993, ACM, pp. 438-445.
Richards, J.R.., W.D. and Barnett, G.A., Eds., *Progress in Communication Sciences*, vol. XII, 1993, Ablex Publishing Corporation, Norwood, NJ, 294 pages.
Rissland, E.L. et al., "BankXX: A Program to Generate Argument through Case-Base Search", *Proceedings of the 4th International Conference on Artificial Intelligence and Law*, Amsterdam, The Netherlands, 1993, ACM, pp. 117-124.
Golovchinsky, G. and Chignell, M., "Queries-R-Links: Graphical Markup for Text Navigation", *Proceedings of the INTERACT '93 and CHI '93 Conference on Human Factors in Computing Systems*, Amsterdam, The Netherlands, Apr. 24-29, 1993, ACM, pp. 454-460.
Pedersen, G.S., "A Browser for Bibliographic Information Retrieval, Based on an Application of Lattice Theory", *Proceedings of the 16th Annual International ACM SIGIR Conference on Research and Development in Information Retrieval*, Jun. 27-Jul. 1, 1993, Pittsburgh, PA, pp. 270-279.
Lashicari, Y. et al., "Collaborative Interface Agents", *Proceedings of the $12^{th}$ National Conference on Artificial Intelligence*, 1993, AAAI Press, Menlo Park, CA, vol. 1, pp. 444-449.
Rao, R. and Card, S.K., "The Table Lens: Merging Graphical and Symbolic Representations in an Interactive Focus+Context Visualization for Tabular Information", Abstracts in CHI '94—Celebrating Interdependence Conference Companion, 1994, p. 222.
Koster, M., "ALIWEB—Archie-Like Indexing in the WEB", *Proceedings of the First International Conference on the World Wide Web*, Mar. 28, 1994, 10 pages.
Rao, R. and Card, S.K., "The Table Lens: Merging Graphical and Symbolic Representations in an Interactive Focus+Context Visualization for Tabular Information", *Proceedings of the ACM SIGCHI Conference on Human Factors in Computing Systems*, Boston, MA, Apr. 1994, ACM, pp. 1-7.
Berners-Lee, T., "Universal Resource Identifiers in WWW", Jun. 1994, 24 pages.
Bowman, C.M. et al., "Scalable Internet Resource Discovery: Research Problems and Approach", *Communications of the ACM*, vol. 37, No. 8 (Aug. 1994), pp. 98-114.
Guting, R.H., "An Introduction to Spatial Database Systems", *VLDB Journal*, vol. 3 (1994), pp. 357-399.
December, J., "New Spiders Roam the Web", *Computer-Mediated Communication Magazine*, vol. 1, No. 5 (Sep. 1, 1994), [online], 1994, [retrieved on Apr. 30, 2008]. Retrieved from the Internet: <URL: http://www.december.com/cmc/mag/1994/sep/spiders.html>, 3 pages.
Stevens, S. et al., "Improving Access to Digital Video", *Interactions*, Oct. 1994, pp. 67-71.
Harary, F. et al., *Structural Models: An Introduction to the Theory of Directed Graphs*, John Wiley & Sons, New York, NY, 1965, 216 pages.
*The SMART Retrieval System: Experiments in Automatic Document Processing*, Gerard Salton, Ed., Prentice Hall, Eaglewood Cliffs, New Jersey, 1971, 579 pages.
Salton, G. et al., "A Vector Space Model for Automatic Indexing", *Communications of the ACM*, vol. 18, No. 11 (Nov. 1975), pp. 613-620.
Kochtanek, T.R., "Bibliographic Compilation Using Reference and Citation Links", *Information Processing & Management*, vol. 18, No. 1 (1982), pp. 33-39.
Tapper, C., "The Use of Citation Vectors for Legal Information Retrieval", *Journal of Law and Information Science*, vol. 1 No. 2 (1982), pp. 131-161.
Fox, EA, *Extending the Boolean and Vector Space Models of Information Retrieval with P-Norm Queries and Multiple Concept Types*, U.M.I, Ann Arbor, Michigan, 1983, 390 pages.
Salton, G. and McGill, M.J., *Introduction to Modern Information Retrieval*, McGraw-Hill Book Company, New York, New York, 1983, 472 pages.

Fox, E.A., "Combining Information in an Extended Automatic Information Retrieval System for Agriculture", *The Infrastructure of an Information Society*, Proceedings of the First International Information Conference in Cairo, Egypt, Dec. 13-15, 1982, North-Holland, Amsterdam, The Netherlands, 1984, pp. 449-466.
Belew, R.K., *Adaptive Information Retrieval: Machine Learning in Associative Network*, University of Michigan, Ann Arbor, MI, 1986, 329 pages.
Conklin, J. and Begeman, M.L., "gIBIS: A Hypertext Tool for Exploratory Policy Discussion", *Proceedings of the 1988 ACM Conference on Computer-Supported Cooperative Work*, Portland, OR, Sep. 26-28, 1988, ACM, (1988), pp. 140-152.
Croft, W.B. et al., "Retrieving Documents by Plausible Inference: A Preliminary Study", *Proceedings of the $11^{th}$ Annual SIGIR Conference on Research and Development in Information Retrieval*, Grenoble, France, Jun. 1988, ACM, pp. 481-494.
Berners-Lee, "Information Management: A Proposal", Mar. 1989 and May 1990, 11 pages.
Consens, M.P. and Mendelzon, A.O., "Expressing Structural Hypertext Queries in GraphLog", *Proceedings of the Second Annual ACM Conference on Hypertext*, Pittsburgh, PA, ACM, 1989, 269-292.
Parunak, H.V.D., "Hypermedia Topologies and User Navigation", *Proceedings of the Second Annual ACM Conference on Hypertext*, Pittsburgh, PA, ACM, 1989, pp. 43-50.
*Hypertext: Concepts, Systems and Applications*, Proceedings of the European Conference on Hypertext, INRIA, France, Nov. 1990, Rizk, A. et al., Ed., Cambridge University Press, Cambridge, UK, 1990, 386 pages.
Nielsen, J., "The Art of Navigating through Hypertext", *Communications of the ACM*, vol. 33, No. 3 (Mar. 1990), pp. 296-310.
Nielson, J., *Hypertext & Hypermedia*, Academic Press, Inc., San Diego, California, 1990, 279 pages.
Shepherd, M.A. et al., "Transient Hypergraphs for Citation Networks", *Information Processing & Management*, vol. 26, No. 3 (1990), pp. 395-412.
Lucarella, D., "A Model for Hypertext-Based Information Retrieval", *Hypertext: concepts, systems and applications*, Cambridge University Press, New York, New York, 1992, pp. 81-94.
Burt, R.S., *Structure Reference Manual*, Version 4.2, Columbia University, NY, 1991, 236 pages.
Korfhage, R.R., "To See, or Not to See—Is that the Query?", *Proceedings of the 14th Annual International ACM SIGIR Conference on Research and Development in Information Retrieval*, Oct. 13-16, 1991, Chicago, IL, ACM, 1991, pp. 134-141.
Lin, X. et al., "A Self-organizing Semantic Map for Information Retrieval", *Proceedings of the 14th annual International ACM SIGIR Conference on Research and Development in Information Retrieval*, Chicago, IL, Oct. 13-16, 1991, ACM, 1991, pp. 262-269.
Rose, DE, *A Symbolic and Connectionist Approach to Legal Information Retrieval*, A dissertation for the degree of Doctor of Philosophy in Cognitive Science and Computer Science, University of California, San Diego, 1991, 314 pages.
Turtle, H.W., *Inference Networks for Document Retrieval*, A Dissertation submitted to the Graduate School of the University of Massachusetts for the degree of Doctor of Philosophy, Department of Computer and Information Science, Feb. 1991, 211 pages.
Agosti, M et al., "A Hypertext Environment for Interacting with Large Textual Databases", *Information Processing & Management*, vol. 28, No. 3 (1992), pp. 371-387.
Berners-Lee, T. et al., "World-Wide Web: The Information Universe", *Electronic Networking: Research, Applications and Policy*, vol. 1, No. 2 (1992), pp. 74-82.
Guinan, C. and Smeaton, AF, "Information Retrieval from Hypertext Using Dynamically Planned Guided Tours", *Proceedings of the ACM Conference on Hypertext*, Milan, Italy, ACM, 1993, pp. 122-130.
Analytic Technologies, "UciNet IV: Network Analysis Software", Analytic Technologies, Columbia, SC, 1992, 2 pages.
Lelu, A. and Francois, C., "Hypertext paradigm in the field of information retrieval: a neural approach", *Proceedings of the ACM Conference on Hypertext*, Milan, Italy, ACM, 1993, pp. 112-121.

(56) References Cited

OTHER PUBLICATIONS

Garfield, E., *Citation Indexing: Its Theory and Application in Science, Technology, and Humanities*, Robert M. Hayes & Joseph Becker, Eds., John Wiley & Sons, Inc., New York, NY, 1979, 296 pages.
*Manual of Online Search Strategies*, CJ Armstrong & JA Large, Eds, Gower Publishing Company Limited, Hants, England, 1988, 851 pages.
Jain, AK and Dubes, RC, *Algorithms for Clustering Data*, Prentice Hall, Englewood Cliffs, NJ, 1988, 336 pages.
Kaufman, L., Rousseeuw, PJ, *Finding Groups in Data: An Introduction to Cluster Analysis*, John Wiley & Sons, Inc., 1990, 369 pages.
Rada, R., *Hypertext: from Text to Expertext*, McGraw-Hill Book Company (UK) Limited, Berkshire, England, 1991, 248 pages.
Chen, Q.F., "LEND Pattern Language Syntax Specification: VER 1.3", Oct. 12, 1992, 8 pages.
Chen, Q.F., *An Object-Oriented Database System for Efficient Information Retrieval Applications*, Dissertation submitted to the faculty of Virginia Polytechnic Institute and State University for Doctor of Philosophy in Computer Science, Mar. 1992, Blacksburg, VA, 260 pages.
*Multimedia/Hypermedia in Open Distributed Environments*, Wolfgang Herzner, Frank Kappe, Eds, *Proceedings of the Eurographics Symposium in Graz*, Austria, Jun. 6-9, 1974, Springer-Verlag/Wien, New York, NY, 1994, 327 pages.
Krol, E., *The Hole Internet User's Guide & Catalog*, Second Edition, O'Reilly and Associate, Inc., Sebastopol, CA, 1994, 589 pages.
France, R.K. et al., *MARIAN Design v5 (MARIAN v.1.2)*, Blacksburg, VA, Feb. 14, 1995, 40 pages.
Bourne, CP and Hahn, TB, *A History of Online Information Services, 1963-1976*, The MIT Press, Cambridge, MA, 2003, 589 pages.
*Hypertext/Hypermedia Handbook*, Emily Berk and Joseph Devlin Ed., Armadillo Associates, New Yor, NY, 1991, 607pages.
Dunlop, M.D. and Van Rijsbergen, C.J., "Hypermedia and Free Text Retrieval", *Information Processing and Management: an International Journal*, vol. 29, Issue 3 (May-Jun. 1993), pp. 287-298.
Van Rijsbergen C.J., *Information Retrieval*, London, Butterworths, 1975 and 1979, Department of Computing Science, University of Glasgow, 151 pages.
Betrabet, S.C. et al., "A Query Language for Information Graphs", Technical Report: TR-93-03, Virginia Polytechnic Institute and State University, Blacksburg, VA, 1993, 8 pages.
Dalal, K.R., *Database Manger for Envision*, Project Report for Master of Science in Computer Science, Virginia Polytechnic Institute and State University, Blacksburg, VA, Aug. 1994, 65 pages.
National Institute of Standards and Technology (NIST), *Hypertext Standardization Workshop*, Workshop Documents, Gaithersburg, MD, Jan. 16-18, 1990, 363 pages.
Nunn, GL, *Regression Analysis of Extended Vectors to Obtain Coefficients for Use in Probabilistic Information Retrieval Systems*, Project for Master of Science in Computer Science and Applications, Virginia Polytechnic Institute and State University, Blacksburg, VA, Jan. 5, 1988, 55 pages.
Chen, Q.F., *LEND Pattern Language Syntax Specification*, Nov. 18, 1991, 5 pages.
Chen, Q.F., *LEND Installation Instructions*, HaL Computer Systems Inc., Austin, TX, Feb. 1, 1993, 3 pages.
Heath, L.S., *ENVISION Query/Result Language*, Apr. 4, 1994, 15 pages.
France, R, *Envision Back-End Design Narrative Draft 1.1*, Mar. 15, 1994, 25 pages.
Nowell, L.T. et al., "Visualizing Search Results: Some Alternatives to Query-Document Similarity", *Proceedings of SIGIR '96*, Zurich, Germany on Aug. 1-21, 1996, ACM, 1996, pp. 67-75.
France, R, *Processing VTLS Extracts into MARIAN, Draft 0.2*, Feb. 23, 1996, 11 pages.
Averboch, G.A. and Heath, L.S., *DELTO—A System for Document Analysis, Translation, and Automatic Hypertext Linking: Prospectus*, Virginia Tech, Blacksburg, VA, Jun. 22, 1995, 4 pages.

Fox, E.A. and France, R.K., *Architecture of an Object-Oriented Expert System for Composite Document Analysis, Representation, and Retrieval*, Virginia Tech, Blacksburg, VA, TR-86-10, Apr. 1986, pp. 1-13.
Fox, E.A., "Development of the CODER System: A Test-bed for Artificial Intelligence Methods in Information Retrieval", *Information Processing and Management*, vol. 23, No. 4 (1987), pp. 341-366.
Kessler, M.M., *TIP User's Manual: A guide for on-line search and retrieval of the current literature in physics*, Massachusetts Institute of Technology, Technical Information Program and Project MAC, Oct. 1967, pp. 1-23.
Kessler, M.M., *TIP System Applications: A description of TIP operations and a preliminary analysis of system experience*, Massachusetts Institute of Technology, Technical Information Program, Oct. 1967, 2 pages.
Kessler, M.M., *TIP User's Manual: A guide for on-line search and retrieval of the current literature in physics, First Edition*, Massachusetts Institute of Technology, Technical Information Program and Project MAC, Dec. 1, 1965, 2 pages.
Kessler, M.M., *An Experimental Communication Center for Scientific and Technical Information*, Massachusetts Institute of Technology, Lexington, MA, Mar. 31, 1960, pp. 1-35.
Mathews, W.D., *TIP Program Description*, Massachusetts Institute of Technology, Cambridge, MA, Jan. 1, 1996.
Mathews, W.D., *TIP Reference Manual*, Technical Information Program, Massachusetts Institute of Technology, Cambridge, MA, TIP-TM-104, Aug. 5, 1968, 2 pages.
Brandhorst, W.T. and Eckert, P.F., "Document Retrieval and Dissemination Systems", *Annual Review of Information Science and Technology*, vol. 7. Carlos Cuadra, Ed., Chicago: Encyclopedia Britannica, Inc. (1972), 382, pp. 402-403.
Kessler, M.M., "Search Strategies of the M.I.T. Technical Information Program", *Information Retrieval with special references to the Biomedical Sciences*, Paper presented at the Second Institute on Information Retrieval, Nov. 10-13, 1965, University of Minnesota, Minneapolis, MN, 1966, pp. 23-27.
Fox, E.A. et al., "Development of a Modern OPAC: From REVTOLC to MARIAN", TR 93-06, Virginia Polytechnic Institute and State University, Blacksburg, VA, Feb. 17, 1993, pp. 1-17.
Weaver, M.T. et al., "A Frame-Based Language in Information Retrieval", TR 88-25, Virginal Polytechnic Institute and State University, Blacksburg, VA, 1988, pp. 1-47.
Fox, E.A. et al., "Project ENVISION Final Report", A User-Centered Database from the Computer Science Literature, NSF Grant IRI-9116991, Virginia Polytechnic Institute and State University, Blacksburg, VA, May 29, 1995, pp. 1-8.
Wohlwend, R.C. and Fox, E.A., *Creation of a Prolog Fact Base from the Collins English Dictionary*, TR 88-24, Virginia Polytechnic Institute and State University, Blacksburg, VA, 1988, pp. 1-183.
Barnette, N.D. et al., "NSF CISE Institutional Infrastructure (Education) Grant Overview", NSF Award No. CDA-9312611, Aug. 15, 1993-Jul. 31, 1998, Virginia Polytechnic Institute and State University, Blacksburg, VA, pp. 1-19.
Fox, E.A. and Barnette, N.D., "Improving Education through a Computer Science Digital Library with Three Types of WWW Servers", Virginia Polytechnic Institute and State University, Blacksburg, VA [online], [retrieved on Jan. 22, 2009]. Retrieved from the Internet: <URL: http://xml.coverpages.org/fox-improv.html>, 9 pages.
France, R.K. and Fox, E.A., *An Artificial Intelligence Environment for Information Retrieval Research*, TR 88-10, Virginia Polytechnic Institute and State University, Blacksburg, VA, 1988, 164 pages.
Bar-Hillel, Y., "A Logician's Reaction to Recent Theorizing on Information Search Systems", *American Documentation*, vol. 8, No. 2 (Apr. 1957), pp. 103-113.
Salton, G. et al., "Approaches to Passage Retrieval in Full Text Information Systems", *Proceedings of the 16th Annual International ACM SIGIR Conference on Research and Development in Information Retrieval*, Pittsburgh, PA, ACM, 1993, pp. 49-58.
Salton, G. et al., "Automatic Analysis, Theme Generation, and Summarization of Machine-Readable Texts", *Science*, vol. 264 (Jun. 3, 1994), pp. 1421-1426.

(56) References Cited

OTHER PUBLICATIONS

Seeley, J.R., "The Net of Reciprocal Influence: A Problem in Treating Sociometric Data", *Canadian Journal of Psychiatry.*, III, 4 (1949), pp. 234-240.
Agosti, M and Marchetti, P.G., "User Navigation in the IRS Conceptual Structure through a Semantic Association Function", *The Computer Journal*, vol. 35, No. 3 (1992), pp. 194-199.
Salton, G. and Bergmark, D., *A Citation Study of the Computer Science Literature*, TR 79-364, Cornell University, Ithaca, New York, Jan. 1979, 46 pages.
Golub, G.H. and Van Loan, C.F., *Matrix Computations*, The Johns Hopkins University Press, Baltimore, MD, 1983, 492 pages.
Richards, W.D., *NEGOPY 4.30 Manual and User's Guide*, Simon Fraser University, Burnaby, BC, Canada, 1995, 179 pages.
Hearst, M.A. and Plaunt, C., "Subtopic Structuring for Full-Length Document Access", *Proceedings of the 16th Annual International ACM SIGIR Conference on Research and Development in Information Retrieval*, Pittsburgh, PA, ACM, 1993, pp. 59-68.
Aho, A.V. et al., *The Design and Analysis of Computer Algorithms*, Bell Telephone Laboratories, Inc., Philippines, 1974, Third Printing, Jun. 1976, pp. 171-223.
Aho, A.V. et al., "Chapter 6: Directed Graphs", *Data Structures and Algorithms*, Michael A. Harris, Ed., Bell Telephone Laboratories, Inc., 1983, pp. 198-229.
Fox, et al., "Development of a Modern OPAC: From REVTOLC to MARIAN," Department of Computer Science and Computing Center, Virginia Polytechnic Institute and State University, pp. 248-258, Jun.-Jul. 1993.
France, R.K. and Fox, EA, "Knowledge Structures for Information Retrieval: Representation in the Coder Project," Department of Computer Science, Virginia Tech, Blacksburg, VA, 19 pages, Oct. 1986.
Defendants' claim chart filed in *Software Rights Archive, LLC v. Google Inc. et al*, E.D. Tex., docket number: 2:07-cv-00511-CE; EA A 44, Invalidity Claim Chart for U.S. Pat. No. 5,544,352 Based on "Subject and Citation Indexing. Part II: The Optimal Cluster-Based Retrieval Performance of Composite Representations," W.M. Shaw, 1991 ("Shaw/Part II, 1992"), 27 pages.
Defendants' claim chart filed in *Software Rights Archive, LLC v. Google Inc. et al*, E.D. Tex., docket number: 2:07-cv-00511-CE; EX A 56, Invalidity Claim Chart for U.S. Pat. No. 5,544,352 Based on U.S. Pat. No. 5,446,891 (Kaplan) ("U.S. Pat. No. 5,446,891"), pp. 44.
Defendants' claim chart filed in *Software Rights Archive, LLC v. Google Inc. et al*, E.D. Tex., docket number: 2:07-cv-00511-CE; EX B 01, Invalidity Claim Chart for U.S. Pat. No. 5,544,352 Based on Tip, pp. 17.
Defendants' claim chart filed in *Software Rights Archive, LLC v. Google Inc. et al*, E.D. Tex., docket number: 2:07-cv-00511-CE; EX B 02, Invalidity Claim Chart for U.S. Pat. No. 5,544,352 Based on Envision, pp. 15.
Defendants' claim chart filed in *Software Rights Archive, LLC v. Google Inc. et al*, E.D. Tex., docket number: 2:07-cv-00511-CE; EX B 03, Invalidity Claim Chart for U.S. Pat. No. 5,544,352 Based on Smart, pp. 9.
Defendants' claim chart filed in *Software Rights Archive, LLC v. Google Inc. et al*, E.D. Tex., docket number: 2:07-cv-00511-CE; EX B 04, Invalidity Claim Chart for U.S. Pat. No. 5,544,352 Based on Intermedia, pp. 10.
Defendants' claim chart filed in *Software Rights Archive, LLC v. Google Inc. et al*, E.D. Tex., docket number: 2:07-cv-00511-CE; EX C 01, Invalidity Claim Chart for U.S. Pat. No. 5,544,352 of Certain Exemplary Combinations, pp. 17.
Defendants' claim chart filed in *Software Rights Archive, LLC v. Google Inc. et al*, E.D. Tex., docket number: 2:07-cv-00511-CE; EX D 73, Invalidity Claim Chart for U.S. Pat. No. 5,832,494 Based on U.S. Pat. No. 4,953,106 (Gansner et al.) ("U.S. Pat. No. 4,953,106"), pp. 26.
Defendants' claim chart filed in *Software Rights Archive, LLC v. Google Inc. et al*, E.D. Tex., docket number: 2:07-cv-00511-CE; EX D 74, Invalidity Claim Chart for U.S. Pat. No. 5,832,494 Based on U.S. Pat. No. 5,446,891 (Kaplan) ("U.S. Pat. No. 5,446,891"), pp. 39.
Defendants' claim chart filed in *Software Rights Archive, LLC v. Google Inc. et al*, E.D. Tex., docket number: 2:07-cv-00511-CE; EX D 75, Invalidity Claim Chart for U.S. Patent No. 5,83:2,494 Based on U.S. Pat. No. 5,748,954 ("Maudlin"), pp. 71.
Defendants' claim chart filed in *Software Rights Archive, LLC v. Google Inc. et al*, E.D. Tex., docket number: 2:07-cv-00511-CE; EX D 76, Invalidity Claim Chart for U.S. Pat. No. 5,832,494 Based on U.S. Pat. No. 5,855,015 (Shoham) ("U.S. Pat. No. 5,855,015"), pp. 50.
Defendants' claim chart filed in *Software Rights Archive, LLC v. Google Inc. et al*, E.D. Tex., docket number: 2:07-cv-00511-CE; EX D 77, Invalidity Claim Chart for U.S. Pat. No. 5,832,494 Based on U.S. Pat. No. 5,838,906 (Doyle) ("U.S. Pat. No. 5,838,906"), pp. 8.
Defendants' claim chart filed in *Software Rights Archive, LLC v. Google Inc. et al*, E.D. Tex., docket number: 2:07-cv-00511-CE; EX E 02 Invalidity Claim Chart for U.S. Pat. No. 5,832,494 Based on Envision, pp. 15.
Defendants' claim chart filed in *Software Rights Archive, LLC v. Google Inc. et al*, E.D. Tex., docket number: 2:07-cv-00511-CE; EX E 03 Invalidity Claim Chart for U.S. Pat. No. 5,832,494 Based on Smart, pp. 8.
Defendants' claim chart filed in *Software Rights Archive, LLC v. Google Inc. et al*, E.D. Tex., docket number: 2:07-cv-00511-CE; EX E 04 Invalidity Claim Chart for U.S. Pat. No. 5,832,494 Based on Intermedia, pp. 9.
Defendants' claim chart filed in *Software Rights Archive, LLC v. Google Inc. et al*, E.D. Tex., docket number: 2:07-cv-00511-CE; EX E 05 Invalidity Claim Chart for U.S. Pat. No. 5,832,494 Based on Tip, pp. 16.
Defendants' claim chart filed in *Software Rights Archive, LLC v. Google Inc. et al*, E.D. Tex., docket number: 2:07-cv-00511-CE; EX F 01 Invalidity Claim Chart for U.S. Pat. No. 5,832,494 of Certain Exemplary Combinations, pp. 19.
Defendants' claim chart filed in *Software Rights Archive, LLC v. Google Inc. et al*, E.D. Tex., docket number: 2:07-cv-00511-CE; EX G 26 Invalidity Claim Chart for U.S. Pat. No. 6,233,571 Based on Croft and Turtle, "A Retrieval Model for Incorporating Hypertext Links" ("Croft and Turtle"), pp. 9.
Defendants' claim chart filed in *Software Rights Archive, LLC v. Google Inc. et al*, E.D. Tex., docket number: 2:07-cv-00511-CE; EX G 40 Invalidity Claim Chart for U.S. Pat. No. 6,233,571BASED on M.D. Dunlop & C.J. Van Rijsbergen, "Hypermedia and Free Text Retrieval" ("Dunlop"), pp. 34.
Defendants' claim chart filed in *Software Rights Archive, LLC v. Google Inc. et al*, E.D. Tex., docket number: 2:07-cv-00511-CE; EX G 63 Invalidity Claim Chart for U.S. Pat. No. 6,233,571 Based on U.S. Pat. No. 5,855,015 (Shoham) ("U.S. Pat. No. 5,855,015"), pp. 55.
Defendants' claim chart filed in *Software Rights Archive, LLC v. Google Inc. et al*, E.D. Tex., docket number: 2:07-cv-00511-CE; EX G 67 Invalidity Claim Chart for U.S. Pat. No. 6,233,571 Based on U.S. Pat. No. 5,748,954 ("Maudlin"), pp. 88.
Defendants' claim chart filed in *Software Rights Archive, LLC v. Google Inc. et al*, E.D. Tex., docket number: 2:07-cv-00511-CE; EX G 69 Invalidity Claim Chart for U.S. Pat. No. 6,233,571 Based on Tip, pp. 17.
Defendants' claim chart filed in *Software Rights Archive, LLC v. Google Inc. et al*, E.D. Tex., docket number: 2:07-cv-00511-CE; EX G 70 Invalidity Claim Chart for U.S. Pat. No. 6,233,571 Based on Smart, pp. 8.
Defendants' claim chart filed in *Software Rights Archive, LLC v. Google Inc. et al*, E.D. Tex., docket number: 2:07-cv-00511-CE; EX G 80 Invalidity Claim Chart for U.S. Pat. No. 6,233,571 Based on U.S. Pat. No. 5,838,906 (Doyle) ("U.S. Pat. No. 5,838,906"), pp. 19.
Defendants' claim chart filed in *Software Rights Archive, LLC v. Google Inc. et al*, E.D. Tex., docket number: 2:07-cv-00511-CE; EX H 02 Invalidity Claim Chart for U.S. Pat. No. 6,233,571 Based on Envision, pp. 12.
Defendants' claim chart filed in *Software Rights Archive, LLC v. Google Inc. et al*, E.D. Tex., docket number: 2:07-cv-00511-CE; EX I 01 Invalidity Claim Chart for U.S. Pat. No. 6,233,571 of Certain Exemplary Combinations, pp. 15.

* cited by examiner

PRODUCING A RANKING FOR PAGES USING DISTANCES IN A WEB-LINK GRAPH

BACKGROUND

1. Field of the Invention

The present invention generally relates to techniques for ranking pages on the web. More specifically, the present invention relates to a method for producing a ranking for pages on the web by computing shortest distances from a set of seed pages to each of the pages to be ranked, wherein the seed pages and the pages to be ranked are interconnected with links.

2. Related Art

The relentless growth of the Internet has been largely fueled by the development of sophisticated search engines, which enable users to comb through billions of web pages looking for specific pages of interest. Because a given query can return millions of search results it is important to be able to rank these search results to present high-quality results to the user.

A popular search engine developed by Google Inc. of Mountain View, Calif. uses PageRank® as a page-quality metric for efficiently guiding the processes of web crawling, index selection, and web page ranking. Generally, the PageRank technique computes and assigns a PageRank score to each web page it encounters on the web, wherein the PageRank score serves as a measure of the relative quality of a given web page with respect to other web pages. PageRank generally ensures that important and high-quality web pages receive high PageRank scores, which enables a search engine to efficiently rank the search results based on their associated PageRank scores.

PageRank scores are computed based on the web link-graph structure, wherein the web pages are the nodes of the link-graph which are interconnected with hyperlinks. In this model, PageRank R for a given web page p can be computed as:

$$\forall p \in P, R(p) = (1-d) + d \sum_{q \to p} \frac{R(q)}{|q|_{out}}, \quad (1)$$

wherein P is the set of all the web pages, $|q|_{out}$ is the out-degree of a specific page q in the set P, and $0 \leq d \leq 1$ is a damping factor.

However, the simple formulation of Equation (1) for computing the PageRank is vulnerable to manipulations. Some web pages (called "spam pages") can be designed to use various techniques to obtain artificially inflated PageRanks, for example, by forming "link farms" or creating "loops."

One possible variation of PageRank that would reduce the effect of these techniques is to select a few "trusted" pages (also referred to as the seed pages) and discovers other pages which are likely to be good by following the links from the trusted pages. For example, the technique can use a set of high quality seed pages $(s_1, s_2, s_n)$, and for each seed page i=1, 2, ..., n, the system can iteratively compute the PageRank scores for the set of the web pages P using the formulae:

$$\forall s_i \neq p \in P, R_i(p) = d \sum_{q \to p} \frac{R_i(q)}{|q|_{out}} w(q \to p), \quad (2)$$

where $R_i(s_i)=1$, and $w(q \to p)$ is an optional weight given to the link $q \to p$ based on its properties (with the default weight of 1).

Generally, it is desirable to use large number of seed pages to accommodate the different languages and a wide range of fields which are contained in the fast growing web contents. Unfortunately, this variation of PageRank requires solving the entire system for each seed separately. Hence, as the number of seed pages increases, the complexity of computation increases linearly, thereby limiting the number of seeds that can be practically used.

Hence, what is needed is a method and an apparatus for producing a ranking for pages on the web using a large number of diversified seed pages without the problems of the above-described techniques.

SUMMARY

One embodiment of the present invention provides a system that produces a ranking for pages on the web. During operation, the system receives a set of pages to be ranked, wherein the set of pages are interconnected with links. The system also receives a set of seed pages which include outgoing links to the set of pages. The system then assigns lengths to the links based on properties of the links and properties of the pages attached to the links. The system next computes shortest distances from the set of seed pages to each page in the set of pages based on the lengths of the links between the pages. Next, the system determines a ranking score for each page in the set of pages based on the computed shortest distances. The system then produces a ranking for the set of pages based on the ranking scores for the set of pages.

In a variation on this embodiment, the system assigns a length to a link by computing a function of the number of outgoing links from the source page of the link.

In a further variation on this embodiment, the function is a monotonic non-decreasing function of the number of outgoing links from the source page, so that the length of the link increases as the number of outgoing links from the source page increases.

In a variation on this embodiment, the system computes a shortest distance from a seed page to a given page by summing lengths of individual links along a shortest path from the seed page to the given page.

In a further variation on this embodiment, the system computes the length of a link $q \to p$ by adding a term $(\alpha + \log(|q|_{out}))$ to the length of the link, wherein $\alpha$ is a non-negative value, and wherein $|q|_{out}$ is the number of outgoing links from the source page q.

In a further variation on this embodiment, $\alpha = -\log(d)$, wherein d is a damping factor.

In a variation on this embodiment, a seed page $s_i$ in the set of seed pages is associated with a predetermined weight wherein $0 < w_i \leq 1$. Furthermore, the seed page $s_i$ is associated with an initial distance $d_i$ wherein $d_i = -\log(w_i)$.

In a further variation on this embodiment, the computed shortest distance from the seed page $s_i$ to a given page includes the initial distance $d_i$.

In a variation on this embodiment, the system determines the ranking score for a given page based on the computed shortest distances by using k shortest distances from the k nearest seed pages to each page, wherein k is a predetermined positive integer.

In a further variation on this embodiment, the system determines the ranking score for a given page based on the computed shortest distances by using the kth shortest distance among the computed shortest distances.

In a further variation on this embodiment, the ranking score for the given page can be proportional to $e^{-D(p)}$, wherein $D(p)$ is the kth shortest distance.

In a further variation on this embodiment, the function for the length of the link includes a weight of the link.

In a variation on this embodiment, the links associated with the computed shortest distances constitute a reduced link-graph.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Overview

One embodiment of the present invention provides a system that ranks pages on the web based on distances between the pages, wherein the pages are interconnected with links to form a link-graph. More specifically, a set of high-quality seed pages are chosen as references for ranking the pages in the link-graph, and shortest distances from the set of seed pages to each given page in the link-graph are computed. Each of the shortest distances is obtained by summing lengths of a set of links which follows the shortest path from a seed page to a given page, wherein the length of a given link is assigned to the link based on properties of the link and properties of the page attached to the link. The computed shortest distances are then used to determine the ranking scores of the associated pages.

a Link-Graph and Seed Pages

Figure 1:
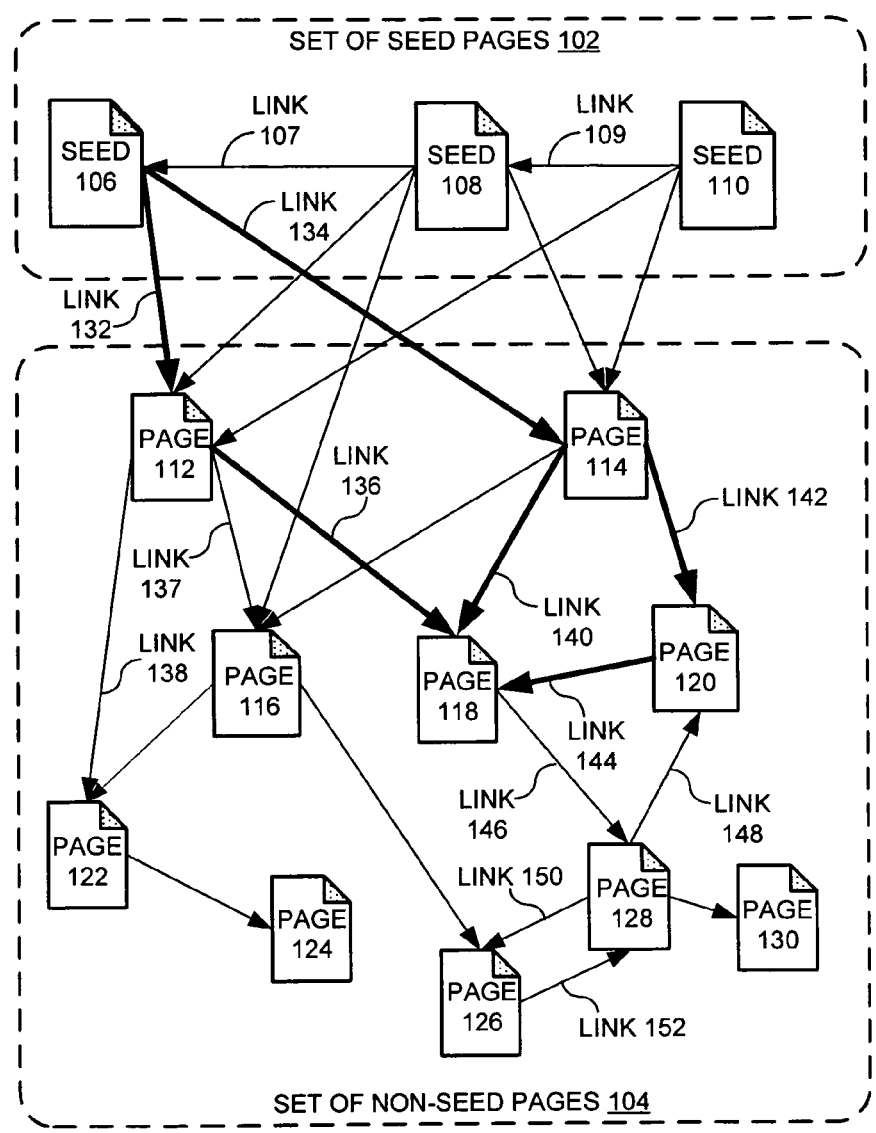
FIG. 1 graphically illustrates a link-graph structure of a set of pages on the web in accordance with an embodiment of the present invention.

FIG. 1 graphically illustrates a link-graph structure 100 of a set of pages on the web in accordance with an embodiment of the present invention. Link-graph 100 comprises a collection of pages which correspond to the nodes of the link-graph, and a collection of directed links between the pages, wherein these directed links correspond to the arcs of the link-graph. Note that each link is a directed connection from a "source" page to a "destination" page.

As illustrated in FIG. 1, the collection of pages is classified into two subsets of pages: a set of seed pages 102, and a set of non-seed pages 104. Seed pages (hereinafter referred to as "seeds") 102 form the "root" nodes of link-graph 100, which comprise: seed 106, seed 108, and seed 110. Although for simplicity FIG. 1 is described in the context of three seeds, generally the present invention can use much more than three seeds. Note that seeds 102 are interconnected with link 107 and link 109.

Non-seed pages 104 include pages 112-130, wherein each page is either directly or indirectly connected to one or more seeds through the links in the link-graph. In one embodiment of the present invention, seeds 102 are specially selected high-quality pages which provide good web connectivity to other non-seed pages.

More specifically, to ensure that other high-quality pages are easily reachable from seeds 102, seeds in seeds 102 need to be reliable, diverse to cover a wide range of fields of public interests, as well as well-connected with other pages (i.e., having a large number of outgoing links). For example, Google Directory and The New York Times are both good seeds which possess such properties. It is typically assumed that these seeds are also "closer" to other high-quality pages on the web. In addition, seeds with large number of useful outgoing links facilitate identifying other useful and high-quality pages, thereby acting as "hubs" on the web.

One approach for choosing seeds involves selecting a diverse set of trusted seeds. Choosing a more diverse set of seeds can shorten the paths from the seeds to a given page. Hence, it would be desirable to have a largest possible set of seeds that include as many different types of seeds as possible. However, because selecting the seeds involves a human manually identifying these high-quality pages, the total number of the seeds is typically limited. Moreover, having too many seeds can make the selected seeds vulnerable to manipulation. Consequently, the actual number of the selected set of seeds is limited.

As illustrated in FIG. 1, a link from a seed to a page is represented by an arrow pointing from the seed to the page. For example, seed 106 links to page 112 and page 114 through links 132 and 134, respectively. Such links assert a "support" from the seed to the linked pages.

The set of non-seed pages 104 are also interconnected with links. For example, page 112 has three outgoing links 136, 137, and 138, which target at pages 118, 116 and 122, respectively. Furthermore, page 114 has two outgoing links 140 and 142, which connect to pages 118 and 120, respectively. Additionally, page 120 links to page 118 through link 144 as shown.

Note that pages 118, 120 and 128 form a loop, wherein these pages point to each other in a circular manner though links 144, 146, and 148. Furthermore, page 126 and page 128 also form a loop in which they point to each other through links 150 and 152.

Note that even though there is no direct link from seed 106 to page 118, page 118 is reachable from seed 106 via three distinct paths which are highlighted: (1) seed 106 <link 132> page 112 <link 136> page 118; (2) seed 106 <link 134> page 114 <link 140> page 118; and (3) seed 106 <link 134> page 114 <link 142> page 120 <link 144> page 118. We are interested in determining a "shortest" path from seed 102 to page 118 among all of these possible paths, wherein the shortest path will be subsequently used to determine a ranking score for page 118. Note however that, the illustrated lengths of the links in FIG. 1 are not related to the metric which is used to determine the "lengths" of the links in computing the shortest path. We will discuss how to compute the lengths of the links below.

Using a Large Number of Seeds

In one embodiment of the present invention, a large number of reliable international seed pages $s_1, s_2, \ldots, s_n$ are used to compute the PageRank scores. For each i=1, 2, . . . , n, we would like to calculate PageRank $R_i$ based on Equation (2), and set the final PageRank for a page p in the set of pages P to be:

$$R(p)=k\_\max_{i=1,\ldots,n} R_i(p), \quad (3)$$

where k is a positive integer between 1 and n, and k_max represents the $k^{th}$ largest value.

With a large set of seeds, one may want to promote some seeds and demote others. This can be done by assigning each seed $s_1$ an optional positive weight $w_i$ (which has a default value of 1), and modifying (3) by:

$$R(p)=k\_\max_{i=1,\ldots,n} w_i R_i(p) \quad (4)$$

Note that using the $k^{th}$ largest ranking score facilitates suppressing unfairly high scores due to lack of proportionality at the vicinity of the seeds. In practice, it is sufficient to choose k to be a small integer, for example, 3, 4, 5, or 6.

So far, we have ignored the complexity issues from using the large set of seeds. Next, we will discuss how to reduce the complexity of Equation (3), or (4).

Converting Weight to Length and Distance

To compute distances between pages in link-graph 100, we need to assign a "length" to every link. The length of a link can be a function of any set of properties of the link and the source of the link. These properties can include, but are not limited to, the link's position, the link's font, and the source page's out-degree.

Referring to Equation (2), for each link q→p, the contribution of page q to page p with respect to seed $s_i$ can be expressed as:

$$C_i(q, p) = d \frac{R_i(q)}{|q|_{out}} w(q \to p). \quad (5)$$

In practice, it is found that the incoming contributions for a page have a significantly skewed distribution such that the sum of the all the incoming contributions is dominated by one or very few terms. Hence, one can make an approximation of the PageRank score for page p with respect to seed $s_i$ by replacing Equation (2) with the dominant term in (2), that is:

$$\forall s_i \neq p \in P, R_i(p) = \max_{q \to p} C_i(q, p) = d\max_{q \to p} \frac{R_i(q)}{|q|_{out}} w(q \to p). \quad (6)$$

Note that Equation (6) provides a reasonable approximation of the PageRank for p.

Let $s_1, s_2, \ldots, s_n$ be a set of seed pages, and for every 1≤i≤n, let $w_i$ be an optional positive weight (with default value of 1), we can approximate the PageRank of page p in the set of pages P with respect to the set of seeds s as:

$$\forall 1 \le i \le n, R_i(s_i) = w_i; \quad (7)$$

$$\forall\ 1 \le i \le n, s_i \ne p \in P, R_i(p) = d\max_{q \to p} \frac{R_i(q)}{|q|_{out}} w(q \to p); \quad (8)$$

$$\forall p \in P, R(p) = k\_\max_{i=1,\ldots,n} R_i(p). \quad (9)$$

Next, for each link q→p, we define the length of the link to be:

$$L(q \to p) = -\log(d) + \log\left(\frac{|q|_{out}}{w(q \to p)}\right). \quad (10)$$

Note that the length equation (10) includes a term log $(|q|_{out})$, so that the length of the link increases as the number of outgoing links from the source page q increases. More generally, the length is a monotonic non-decreasing function of the number of outgoing links from the source. This definition is related to the PageRank computation in a sense that a higher ranking score is corresponding to a smaller out-degree $|q|_{out}$, wherein the smaller out-degree results in a shorter length of the link. We will provide other length models for computing the length of a given link below.

For any given pair of pages u and v, let D(u, v) be the distance of the shortest path from u to v (if no such path exists, D(u, v)=∞). We define a distance system including the "shortest distances" $D_i(p)$ from the set of seeds s to page p according to:

$$\forall 1 \le i \le n, D_i(s_i) = d_i^0; \quad (11)$$

$$\forall\ 1 \le i \le n, s_i \ne p \in P, D_i(p) = \min_{q \to p}(D_i(q) + L(q \to p)); \quad (12)$$

$$\forall p \in P, D(p) = k\_\min_{i=1,\ldots,n} D_i(p), \quad (13)$$

wherein $d_i^0 = -\log(w_i)$, with the default value of $d_i^0 = 0$ when $w_i = 1$.

Note that similar to assigning the $k^{th}$ largest value of $R_i(p)$ as the final PageRank R(p), we have set the final "shortest distance" for page p as the $k^{th}$ shortest distance among the set of shortest distances $D_i(p)$, for the same reason as mentioned above.

The relation $R^*(p) = e^{-D_i(p)}$ defines a transformation from Equations (7), (8), and (9) to Equations (11), (12), and (13) such that:

$$\forall\ 1 \le i \le n, p \in P, D_i(p) = d_i^0 + D(s_i, p); \quad (14)$$

$$\forall 1 \le i \le n, p \in P, R_i(p) = e^{-D_i(p)}; \quad (15)$$

$$\forall p \in P, R(p) = e^{-D(p)}. \quad (16)$$

From observing Equation (15), one would appreciate that a larger PageRank score for page p is corresponding to a shorter distance from seed $s_i$ to page p. The meaning of Equation (16) is that instead of calculating the PageRank score R(p), one can alternatively calculate D(p), which is the distance from the $k^{th}$ nearest seed top (where the distance from seed $s_i$ can include an optional initial distance $d_i^0$). Hence, the goal of the ranking computation is translated into findings the shortest distances to any given page from the nearest k seeds. This computation can be preformed together for all the pages and seeds.

Other Length Models

Referring back to Equation (10), if we ignore the weights that can be assigned to a link, we can rewrite the length of the link to be:

$$L(q \to p) = \alpha + \log(|q|_{out}), \quad (17)$$

wherein $0 \le \alpha = -\log(d)$.

We then examine the conditions where a monotonic non-decreasing function $0 \le f: N \to R$ can be used for defining the lengths of the links given the out-degrees of the source pages: $L(q \to p) = f(|q|_{out})$.

We then consider the two following scenarios:
1. The page q directly links to n pages;
2. The page q' is a root of a directed tree with n leaves.

We expect that the distance between q and any of the pages it links to will not be greater than the maximum distance between q' and its leaves. In particular, for the case where q' links to $n_1$ pages which each additionally links to $n_2$ pages, we get:

$$f(n_1 n_2) \le f(n_1) + f(n_2). \quad (18)$$

As expected, $f(d) = \alpha + \log(d)$ satisfies this condition, and so does $f \equiv 1$. More generally, every function $f(x) = g(\log(x))$, where g is a concave non-negative real function on $[0, \infty)$, will satisfy condition (19), because for every $0 \le n_1, n_2$, $$g(\log(n_1 n_2)) - g(\log(n_2)) = g(\log(n_1) + \log(n_2)) - g(\log(n_2)) \le g(\log(n_1)) - g(0) \le g(\log(n_i))). \quad (20)$$

General Process of Ranking Based on a Shortest Distance

Figure 2:
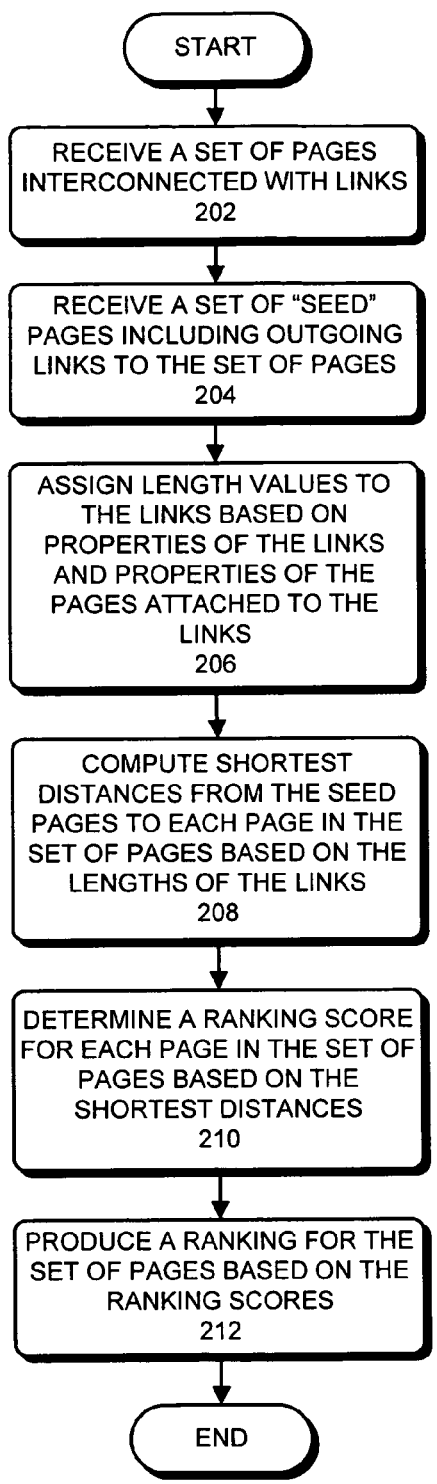
FIG. 2 presents a flowchart illustrating the process of ranking pages on the web based on shortest distances in accordance with an embodiment of the present invention.

FIG. 2 presents a flowchart illustrating the process of ranking pages on the web based on shortest distances in accordance with an embodiment of the present invention. During this process, the system first receives a set of pages to be ranked, wherein the set of pages are interconnected with links (step 202). Next, the system receives a set of n seed pages or "seeds", wherein the seeds include outgoing links reaching out to the set of pages to be ranked (step 204). Hence, the set of pages, the seeds, and the links form a directed link-graph similar to the one illustrated in FIG. 1 (wherein n=3). The system then assigns length values to the links based on properties of the links and properties of the pages attached to the links (step 206). In one embodiment of the present invention, the length of a given link is computed using Equation (10), wherein the length is a function of the number of outgoing links from the source page of the link.

Next, the system computes shortest distances from the set of seeds to each page in the set of pages based on the lengths of the links between the pages (step 208). More specifically, for each given page in the set of pages, the system identifies k "nearest" seeds among the set of seeds, wherein k<n. In other words, these k nearest seeds produce the k shortest distances to the given page among the set of n seeds. For example in FIG. 1, we can choose k to be 1.

Note that it is possible for a selected seed to comprise more than one page. In such cases, the shortest path from the seed to any target page will be defined as the shortest path from any of the seed's pages to the target page.

The system next determines a ranking score for each page in the set of pages based on the computed shortest distances (step 210). In one embodiment of the present invention, for each given page, the system first identifies the kth nearest seed in the computed shorted distances for the give page, and subsequently computes a ranking score for the given page based on Equation (16). Finally, the system produces a ranking for the set of pages based on the ranking scores for the set of pages (step 212). Note that however, not all the pages in the set of pages receive ranking scores through this process. For example, a page that cannot be reached by any of the seed pages will not be ranked.

Note that the results from above ranking process can be used for seed tuning. Specifically, the ranking process produces lists of the nearest seeds and the lengths of the shortest paths for all the ranked pages. The system can process these results to extract information for each of the seeds with respect to the ranked pages. Next, the system can use this information to evaluate the quality and the contribution of the seeds, and then modify the list of seeds and/or the weights of the seeds based on this information.

A Reduced Link-Graph

Note that the links participating in the k shortest paths from the seeds to the pages constitute a sub-graph that includes all the links that are "flow" ranked from the seeds. Although this sub-graph includes much less links than the original link-graph, the k shortest paths from the seeds to each page in this sub-graph have the same lengths as the paths in the original graph. For each page p, the maximum number of links to page p in this sub-graph is at most k. Furthermore, the rank flow to each page can be backtracked to the nearest k seeds through the paths in this sub-graph.

Crawling Ranking and Searching Processes

Figure 3:
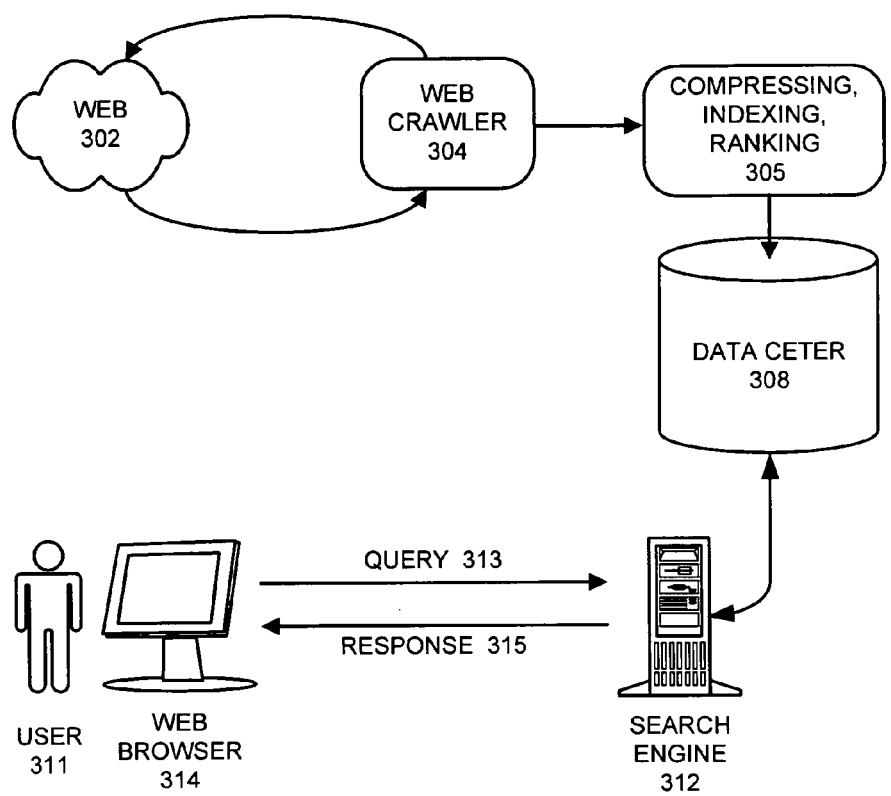
FIG. 3 illustrates the crawling, ranking and searching processes in accordance with an embodiment of the present invention.

FIG. 3 illustrates the crawling, ranking and searching processes in accordance with an embodiment of the present invention. During the crawling process, web crawler 304 crawls or otherwise searches through websites on web 302 to select web pages to be stored in indexed form in data center 308. In particular, web crawler 304 can prioritize the crawling process by using the page rank scores. The selected web pages are then compressed, indexed and ranked in 305 (using the ranking process described above) before being stored in data center 308.

During a subsequent search process, a search engine 312 receives a query 313 from a user 311 through a web browser 314. This query 313 specifies a number of terms to be searched for in the set of documents. In response to query 313, search engine 312 uses the ranking information to identify highly-ranked documents that satisfy the query. Search engine 312 then returns a response 315 through web browser 314, wherein the response 315 contains matching pages along with ranking information and references to the identified documents.

Note that the application of the present invention is not limited to the web and web pages. The general technique of producing ranking scores can be expanded to any hyperlinked database, which can include, but is not limited to, hyperlinked documents of an enterprise.

The foregoing descriptions of embodiments of the present invention have been presented only for purposes of illustration and description.

They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for producing a ranking for pages on the web, comprising:
   receiving a plurality of web pages, wherein the plurality of web pages are inter-linked with page links;
   receiving n seed pages, each seed page including at least one outgoing link to a respective web page in the plurality of web pages, wherein n is an integer greater than one;
   assigning, by one or more computers, a respective length to each page link and each outgoing link;
   identifying, by the one or more computers and from among the n seed pages, a kth-closest seed page to a first web page in the plurality of web pages according to the lengths of the links, wherein k is greater than one and less than n;
   determining a ranking score for the first web page from a shortest distance from the kth-closest seed page to the first web page; and
   producing a ranking for the first web page from the ranking score.

2. The method of claim 1, wherein assigning a length to each page link and each outgoing link comprises calculating a result of a function of the number of outgoing links from a respective source page of the link, and assigning a length equal to the result of the function to the link.

3. The method of claim 2, wherein the function is a monotonic non-decreasing function of the number of outgoing links from the source page.

4. The method of claim 1, further comprising computing the shortest distance from the kth-closest seed page to the first web page, including summing lengths of individual links along a shortest linked path from the kth-closest seed page to the first web page.

5. The method of claim 2, wherein the function for the length of a link from page q to page p includes a term $(\alpha+\log(|q|_{out}))$, wherein $\alpha$ is a non-negative value, and wherein $|q|_{out}$ is the number of outgoing links from the source page q.

6. The method of claim 5, wherein $\alpha=-\log(d)$, wherein d is a pre-determined damping factor.

7. The method of claim 1, wherein:
   each seed page in the n seed pages has an associated predetermined weight; and
   each seed page has an associated initial distance derived from the predetermined weight for the seed page.

8. The method of claim 7, further comprising computing the shortest distance from the kth-closest seed page to the first web page based, at least in part, on the initial distance for the kth-closest seed page.

9. The method of claim 1, wherein determining the ranking score using the shortest distance from the kth-closest seed page comprises calculating a ranking score that is proportional to $e^{-D(p)}$, wherein $D(p)$ is the shortest distance from the kth-closest seed page.

10. The method of claim 2, wherein the function for the length of the link includes a weight of the link.

11. The method of claim 1, further comprising including each link in a shortest path from the kth-closest seed page to the first web page in a reduced link graph, wherein the shortest path is a path having the shortest distance from the kth-closest seed page to the first web page.

12. A non-transitory computer-readable storage medium storing instructions that when executed by a computer cause the computer to perform operations comprising:
   receiving a plurality of web pages, wherein the plurality of web pages are inter-linked with page links;
   receiving n seed pages, each seed page including at least one outgoing link to a respective web page in the plurality of web pages, wherein n is an integer greater than one;
   assigning a respective length to each page link and each outgoing link;
   identifying, from among the n seed pages, a kth-closest seed page to a first web page in the plurality of web pages according to the lengths of the links, wherein k is greater than one less than n;
   determining a ranking score for the first web page from a shortest distance from the kth-closest seed page to the first web page; and
   producing a ranking for the first web page from the ranking score.

13. The computer-readable storage medium of claim 12, wherein assigning a length to each page link and each outgoing link comprises calculating a result of a function of the number of outgoing links from a respective source page of the link, and assigning a length equal to the result of the function to the link.

14. The computer-readable storage medium of claim 13, wherein the function is a monotonic non-decreasing function of the number of outgoing links from the source page.

15. The computer-readable storage medium of claim 12, the operations further comprising computing the shortest distance from the kth-closest seed page to the first web page, including summing lengths of individual links along a shortest linked path from the kth-closest seed page to the first web page.

16. The computer-readable storage medium of claim 13, wherein the function for the length of a link from page q to page p includes a term $\alpha+\log(|q|_{out})$, wherein $\alpha$ is a non-negative constant value, and wherein $|q|_{out}$ is the number of outgoing links from the source page q.

17. The computer-readable storage medium of claim 16, wherein $\alpha=-\log(d)$, wherein d is a pre-determined damping factor.

18. The computer-readable storage medium of claim 12, wherein:
   each seed page in the n seed pages has an associated predetermined weight; and
   each seed page has an associated initial distance derived from the predetermined weight for the seed page.

19. The computer-readable storage medium of claim 18, the operations further comprising computing the shortest distance from the kth-closest seed page to the first web page, based, at least in part, on the initial distance for the kth-closest seed page.

20. The computer-readable storage medium of claim 12, wherein determining the ranking score using the shortest distance from the kth-closest seed page comprises calculating a ranking score that is proportional to $e^{-D(p)}$, wherein $D(p)$ is the shortest distance from the kth-closest seed page.

21. The computer-readable storage medium of claim 14, wherein the function for the length of the link includes a weight of the link.

22. The computer-readable storage medium of claim 12, the operations further comprising including each link in a shortest path from the kth-closest seed page to the first web page in a reduced link graph, wherein the shortest path is a path having the shortest distance from the kth-closest seed page to the first web page.

23. A system, comprising:
one or more computers coupled to one or more storage devices storing instructions that when executed by the one or more computers cause the one or more computers to perform operations comprising:
receiving a plurality of web pages to be ranked, wherein the plurality of web pages are inter-linked with page links;
receiving n seed pages, each seed page including at least one outgoing link to a respective web page in the plurality of web pages, wherein n is an integer greater than one;
assigning a respective length to each page link;
identifying, from among the n seed pages, a kth-closest seed page to a first web page in the plurality of web pages according to the lengths of the links, wherein k is an integer greater than one and less than n;
determining a ranking score for the first web page from a shortest distance from the kth-closest seed page to the first web page; and
producing a ranking for the first web page from the ranking score.

24. The system of claim 23, wherein assigning a length to each page link and each outgoing link comprises calculating a result of a function of the number of outgoing links from a respective source page of the link, and assigning a length equal to the result of the function to the link.

25. The system of claim 24, wherein the function for the length of the link includes a weight of the link.

26. The system of claim 24, wherein the function for the length of a link from page q to page p includes a term ($\alpha+\log(|q|_{out})$), wherein $\alpha$ is a non-negative value, and wherein $|q|_{out}$ is the number of outgoing links from the source page q.

27. The system of claim 26, wherein $\alpha=-\log(d)$, wherein d is a pre-determined damping factor.

28. The system of claim 23, the operations further comprising computing the shortest distance from the kth-closest seed page to the first web page, including summing lengths of individual links along a shortest linked path from the kth-closest seed page to the first web page.

29. The system of claim 23, wherein:
each seed page in the n seed pages has an associated pre-determined weight; and
each seed page has an associated initial distance derived from the predetermined weight for the seed page.

30. The system of claim 29, the operations further comprising computing the shortest distance from the kth-closest seed page to the first web page based, at least in part, on the initial distance for the kth-closest seed page.

31. The system of claim 23, wherein determining the ranking score using the shortest distance from the kth-closest seed page comprises calculating a ranking score that is proportional to $e^{-D(p)}$, wherein $D(p)$ is the shortest distance from the kth-closest seed page.

32. The system of claim 23, the operations further comprising:
identifying, from among the n seed pages, a respective kth-closest seed page for each of the web pages in the plurality of web pages according to the assigned lengths of the links; and
determining a ranking score for each of the web pages in the plurality of web pages, wherein the ranking score for each web page is determined from a respective shortest distance from the respective kth-closest seed page for the web page.

33. The method of claim 1, wherein assigning a respective length to each page link and each outgoing link comprises assigning a length to each link according to one or more properties of the links and one or more properties of pages associated with the links.

34. The method of claim 1, wherein the plurality of web pages includes at least one web page that is not a seed page.

\* \* \* \* \*